US008727783B2

(12) United States Patent
Chen

(10) Patent No.: US 8,727,783 B2
(45) Date of Patent: May 20, 2014

(54) DISTRIBUTED DRILLING SIMULATION SYSTEM

(75) Inventor: Lixue Chen, Chengdu (CN)

(73) Assignee: Chengdu Esimtech Petroleum Equipment Simulation Technology Exploitation Co., Ltd., Chengdu, Sichuan (CN)

(*) Notice: Subject to any disclaimer, the term of this patent is extended or adjusted under 35 U.S.C. 154(b) by 51 days.

(21) Appl. No.: 13/505,740

(22) PCT Filed: Jul. 1, 2010

(86) PCT No.: PCT/CN2010/074891
§ 371 (c)(1),
(2), (4) Date: May 2, 2012

(87) PCT Pub. No.: WO2011/054216
PCT Pub. Date: May 12, 2011

(65) Prior Publication Data
US 2012/0219933 A1  Aug. 30, 2012

(30) Foreign Application Priority Data
Nov. 3, 2009  (CN) .......................... 2009 1 0216125

(51) Int. Cl.
*G09B 9/00* (2006.01)
*G09B 19/00* (2006.01)
*G09B 9/24* (2006.01)
*G09B 9/40* (2006.01)
*E21B 47/00* (2012.01)
*E21B 44/00* (2006.01)

(52) U.S. Cl.
CPC . *G09B 9/00* (2013.01); *G09B 19/00* (2013.01); *G09B 9/24* (2013.01); *G09B 9/40* (2013.01); *E21B 47/00* (2013.01); *E21B 44/00* (2013.01)
USPC ...... 434/219; 703/10; 702/6; 702/9; 324/303; 175/24; 175/40; 175/57

(58) Field of Classification Search
CPC ............ G09B 19/00; G09B 9/00; G09B 9/24; G09B 9/40; E21B 47/00; E21B 44/00
USPC ................. 175/40, 57, 24; 324/303; 434/247, 434/307 R, 365, 219, 257, 258; 702/9, 6; 703/10
See application file for complete search history.

(56) References Cited

U.S. PATENT DOCUMENTS 4,290,759 A * 9/1981 Seabourn et al. ............. 434/370
5,551,881 A * 9/1996 Henderson et al. ........... 434/299

(Continued)

*Primary Examiner* — Jack Yip
*Assistant Examiner* — Michael Humphrey
(74) *Attorney, Agent, or Firm* — Raymond Y. Chan; David and Raymond Patent Firm

(57) ABSTRACT

A distributed drilling simulation system includes a choke manifold, a high pressure manifold, a blowout preventer console, a choke console, a remote console, a driller console, a teacher console and a graphic projecting unit, wherein the driller console, the remote console, the blowout preventer console, the choke console, the choke manifold, and the high pressure manifold are interconnected through a PPI (processor/peripheral interface) protocol. The teacher console is connected with the PPI protocol through a PPI interface. A communication program and a main control program run on a main control computer and a graphic processing program runs on a graphic computer. The invention has the advantages of realizing high-degree top driving drilling simulation, enhancing the field sense for teaching and training, shortening the training period and reducing the training cost.

9 Claims, 40 Drawing Sheets

(56) References Cited

U.S. PATENT DOCUMENTS

| | | | |
|---|---|---|---|
| 7,027,968 B2* | 4/2006 | Choe et al. | 703/10 |
| 7,472,022 B2* | 12/2008 | Birchwood | 702/9 |
| 7,597,559 B2* | 10/2009 | Shteinberg | 434/299 |
| 8,145,464 B2* | 3/2012 | Arnegaard et al. | 703/10 |
| 2008/0103743 A1* | 5/2008 | Howell et al. | 703/10 |
| 2008/0319726 A1* | 12/2008 | Berge et al. | 703/10 |
| 2009/0006058 A1* | 1/2009 | King | 703/10 |
| 2010/0133008 A1* | 6/2010 | Gawski et al. | 175/45 |
| 2011/0087474 A1* | 4/2011 | Paulsen et al. | 703/7 |
| 2012/0285744 A1* | 11/2012 | Bernard | 175/57 |
| 2013/0192841 A1* | 8/2013 | Feasey et al. | 166/336 |

* cited by examiner

DISTRIBUTED DRILLING SIMULATION SYSTEM

BACKGROUND OF THE PRESENT INVENTION

1. Field of Invention

The invention relates to a drilling simulation system, more particularly to a distributed drilling simulation system.

2. Description of Related Arts

At present, a centralized system structure with low reliability and robustness is employed for the current oversea and domestic drilling simulators typically. Moreover, the adoption of common animation technique could lead to fuzzy and non-smooth graphic display and lack of sense of reality. Besides, a screen with common size is used as the display screen for displaying the drilling process, and thus there is a shortage of indispensable impact and immersion in graphic display. In addition, the majority of oversea and domestic novel drilling machines are equipped with top drive drilling device. However, the majority of current drilling simulators implement simulation based upon rotary table drive. In this case, even if the top drive mode is utilized, the simulation is still relatively rough and the simulation for drilling accidents and complex underground situations is not complete and detailed enough. Therefore, practical significance is not accomplished.

SUMMARY OF THE PRESENT INVENTION

The objective of the invention is to overcome the defects in existing drilling simulators and provide a distributed drilling simulation system. The drilling simulator is based upon advanced computer network and distributed system structure. Embedded system design is used for front-end trainee console operating system, system design, manufacture and test are performed per industrial standards, and the system operates stably and reliably. Graphic animation is realized by full three-dimensional real-time animation technology. An operator can perform drilling operation in accordance with the position and state reflected by graphics, so that excellent sense of reality is brought to the operation. Large circular-screen graphic display technology is adopted in graphic display, and all the pictures in the process of drilling have larger display size, wider vision, more display contents, and the visual effect with better impact and immersion. Highly simulative top drive simulation is adopted as the drilling drive mode, which offers better suitability for technical change and meets the market demands. The event drive-based drilling accident and underground complex situation handling technology is capable of simulative training for training employees in advance so as to improve safety.

The objective of the invention is implemented through the technical proposal as follows. The distributed drilling simulation system comprises a choke manifold, a high pressure manifold, a blowout preventer console, a choke console, a remote console, a driller console, a teacher console, and a graphic projecting unit, wherein the driller console is used for controlling the lifting of winch, the rotating speed of rotary table and the speed regulation of mud pump in a simulative manner, acquiring winch clutch position, winch gear, rotary table clutch position, rotary table gear, pump regulator position, diesel engine power regulator position and the like, and monitoring parameters such as suspending weight, weight on bit, driller gas source pressure, mud density, mud viscosity and mud fluid loss. The blowout preventer controller has the basic functions including the on/off control of components in blowout preventer and monitoring vertical tube pressure, sleeve pressure, driller gas source and the like. The choke console has the basic functions including monitoring vertical tube pressure and sleeve pressure after shutting in and during killing, controlling vertical tube pressure and sleeve pressure during killing, and calculating discharge quantity (replacement quantity) during killing. The remote console drives handles by means of PLC control stepping motor to complete on/off control of the components in the blowout preventer. The high pressure manifold is used for simulatively controlling drilling fluid flow path. The choke manifold is used for simulatively controlling drilling fluid flow path and controlling vertical tube pressure and sleeve pressure at wellhead via hydraulic valve. The teacher console comprises two high-performance computers, which are the main control computer and the graphic processing computer respectively. The main control computer has the basic functions of storing and setting simulative parameters, running main control program, graphic control, calculating and drawing parameter curves, scoring and trainee management, acquiring parameters of front end equipment and controlling all controlled instruments, and executing mechanisms at the front end. The graphic processing computer is connected with the main control computer via an Ethernet, adopts TCP/IP communication protocol, and has the basic functions of displaying static background picture, controlled dynamic pictures, such as drill pipe motion and formation layering, automatic animation, and recording curves. The graphic projecting unit, which comprises a high-performance projector with higher resolution and brightness and a large-size screen, is connected with the graphic processing computer to project all the pictures onto a large screen curtain. The driller console, the remote console, the blowout preventer console and the choke console are interconnected via a PPI protocol. The teacher console is connected with the PPI protocol via a PPI interface. The choke manifold is connected with the choke console. The high pressure manifold is connected with the blowout preventer console.

A driller console comprises a chassis and an internal control plate. The front face of the chassis is provided with a driller console front face control panel. The side face of the chassis is provided with a driller console side face control panel, wherein the driller console front face control panel is provided with a pressure gauge set, a weight indicator, a rotary table torque indicator, a backup gauge, a switch set, a button set A, a display set, a winch speed adjusting handle, and a brake handle. The pressure gauge set comprises a gas source pressure gauge, a cooling water pressure gauge, a winch oil pressure gauge, a rotary table oil pressure gauge, a cathead pressure gauge, a pump pressure gauge, a tongs pressure gauge, a left tongs pressure gauge, a right tongs pressure gauge, and a safety tongs pressure gauge. The switch set comprises a left cathead switch, a right cathead switch, a hydraulic station unloading switch, a protective reset switch, an air horn switch, a rotary table inertial brake switch, a pneumatic inching switch, a backup switch, an emergency brake switch, and a parking brake switch. The button set A comprises a No. 1 button, a No. 2 button, a No. 3 button, a No. 4 button, a No. 5 button, a No. 6 button, a No. 7 button, a No. 8 button, a No. 9 button, a No. 10 button, a No. 11 button, a No. 12 button, a No. 13 button, and a No. 14 button. The display set comprises a parameter display, a mud density display, a mud viscosity display, and a mud fluid loss display. The internal control plate comprises a driller console programmable logic controller PLC1 and a driller console programmable logic controller PLC2. A CPU module of the driller console programmable logic controller PLC1 is connected with the winch speed adjusting handle and the brake handle respectively via an AD module. The CPU module of the driller console programmable logic controller PLC1 is also connected with the gas source pressure gauge, the cooling water pressure gauge, the winch oil pressure gauge, the rotary table oil pressure gauge, the cathead pressure gauge, the rotary table torque indicator, the pump pressure gauge, the tongs pressure gauge, the backup gauge, the left tongs pressure gauge, the right tongs pressure gauge, and the safety tongs pressure gauge via a DA module The CPU module of the driller console programmable logic controller PLC1 is also connected with the weight indicator, the emergency brake switch and the parking brake switch via a digital input/output (DIO) extension module The CPU module of the driller console programmable logic controller PLC1 is also connected, via a switch quantity output port thereof, with the input end of a weight indicator controller the output end of which is connected with the weight indicator The CPU module of the driller console programmable logic controller PLC1 is also connected with the left cathead switch, the right cathead switch, the hydraulic station unloading switch, the protective reset switch, the air horn switch, the rotary table inertial brake switch, the pneumatic inching switch, the backup switch, the No. 1 button, the No. 2 button, the No. 3 button, the No. 4 button, the No. 5 button, the No. 6 button, the No. 7 button, the No. 8 button, the No. 9 button, the No. 10 button, the No. 11 button, the No. 12 button, the No. 13 button, and the No. 14 button via a switch quantity input port thereof, and simultaneously connected with the No. 1 button, the No. 2 button, the No. 3 button, the No. 4 button, the No. 5 button, the No. 6 button, the No. 7 button, and the No. 8 button via the switch quantity output port. The CPU module of the driller console programmable logic controller PLC1 is further connected with a driller console data transmitting/receiving plate via a serial port. The driller console data transmitting/receiving plate is connected with the mud density display, the mud viscosity display and the mud fluid loss display via parallel ports. The driller console side face control panel comprises an indicator set, a selector valve set, a button set B, a regulating valve set, a torque indicator, and a tachometer. The indicator set comprises a programmable logic controller PLC1 indicator, a programmable logic controller PLC2 indicator, a power generator 1 indicator, a power generator 2 indicator, a power generator 3 indicator, a power generator 4 indicator, a mud pump A indicator, a mud pump B indicator, a mud pump C indicator, a winch A indicator, a winch B indicator, a drill table indicator, a constant-speed drilling or constant-pressure drilling indicator, an internal blowout preventer indicator, a hydraulic pump operation indicator, a rotary head locking indicator, a brake indicator, a fault alarm indicator, and an in-position indicator. The selector valve set comprises a PLC working selector valve, a motor working selector valve, a winch working selector valve, a mud pump A working selector valve, a mud pump B working selector valve, a mud pump C working selector valve, a rotary table working selector valve, a winch constant-speed drilling or constant-pressure drilling working selector valve, an elevator link rotation selector valve, an internal blowout preventer working selector valve, a hydraulic pump selector valve, a rotary head locking selector valve, a backup tongs working selector valve, an elevator link inclination selector valve, a brake working mode selector valve, an auxiliary operation selector valve, a fan working selector valve, a motor selector valve, an operating mode selector valve, and a rotating direction selector valve. The button set B comprises a machine emergency stop button, a variable-frequency emergency stop button, a drill table torque adjusting knob, a mud pump A adjusting knob, a mud pump B regulating knob, a mud pump C regulating knob, a rotary table rotating speed adjusting knob, a constant-pressure drilling weight-on-bit adjusting knob, an elevator link middle position button, a mute button, and an emergency stop button. The regulating valve set comprises a makeup torque limiting regulating valve, a drilling well torque limiting regulating valve and a rotating speed setting regulating valve. A CPU module of the driller console programmable logic controller PLC2 is connected with the drill table torque adjusting knob, the mud pump A adjusting knob, the mud pump B regulating knob, the mud pump C regulating knob, the rotary table rotating speed adjusting knob, the constant-pressure drilling weight-on-bit adjusting knob, the makeup torque limiting regulating valve, the drilling well torque limiting regulating valve, and the rotating speed setting regulating valve via the AD module respectively. The CPU module of the driller console programmable logic controller PLC2 is also connected with the torque indicator and the tachometer via the DA module, connected with the brake indicator, the fault alarm indicator, the in-position indicator, the mute button, the emergency stop button, the brake working mode selector valve, the auxiliary operation selector valve, the fan working selector valve, the motor selector valve, the operating mode selector valve, and the rotating direction selector valve via the DIO extension module. The CPU module of the driller console programmable logic controller PLC2 is also connected with the PLC1 indicator, the PLC2 indicator, the power generator 1 indicator, the power generator 2 indicator, the power generator 3 indicator, the power generator 4 indicator, the mud pump A indicator, the mud pump B indicator, the mud pump C indicator, the winch A indicator, the winch B indicator, the drill table indicator, the constant-speed drilling or constant-pressure drilling indicator, the internal blowout preventer indicator, the hydraulic pump operation indicator, and the rotary head locking indicator via the switch quantity output port thereof. The CPU module of the driller console programmable logic controller PLC2 is further connected with the PLC working selector valve, the motor working selector valve, the winch working selector valve, the machine emergency stop button, the variable-frequency emergency stop button, the mud pump A working selector valve, the mud pump B working selector valve, the mud pump C working selector valve, the rotary table working selector valve, the winch constant-speed drilling or constant-pressure drilling working selector valve, the elevator link rotation selector valve, the elevator link middle position button, the internal blowout preventer working selector valve, the hydraulic pump selector valve, the rotary head locking selector valve, the backup tongs working selector valve, and the elevator link inclination selector valve via the switch input port thereof.

The objective of the invention is implemented through the technical proposal as follows. The distributed drilling simulation system comprises a choke manifold, a high pressure manifold, a blowout preventer console, a choke console, a remote console, a driller console, a teacher console, and a graphic projecting unit, wherein the driller console is used for controlling the lifting of winch, the rotating speed of rotary table and the speed regulation of mud pump in a simulative manner, acquiring winch clutch position, winch gear, rotary table clutch position, rotary table gear, pump regulator position, diesel engine power regulator position and the like, and monitoring parameters such as suspending weight, weight on bit, driller gas source pressure, mud density, mud viscosity and mud fluid loss. The blowout preventer controller has the basic functions including the on/off control of components in blowout preventer and monitoring vertical tube pressure, sleeve pressure, driller gas source and the like. The choke console has the basic functions including monitoring vertical tube pressure and sleeve pressure after shutting in and during killing, controlling vertical tube pressure and sleeve pressure during killing, and calculating discharge quantity (replacement quantity) during killing. The remote console drives handles by means of PLC control stepping motor to complete on/off control of the components in the blowout preventer. The high pressure manifold is used for simulatively controlling drilling fluid flow path. The choke manifold is used for simulatively controlling drilling fluid flow path and controlling vertical tube pressure and sleeve pressure at wellhead via hydraulic valve. The teacher console comprises two high-performance computers, which are the main control computer and the graphic processing computer respectively. The main control computer has the basic functions of storing and setting simulative parameters, running main control program, graphic control, calculating and drawing parameter curves, scoring and trainee management, acquiring parameters of front end equipment and controlling all controlled instruments, and executing mechanisms at the front end. The graphic processing computer is connected with the main control computer via an Ethernet, adopts TCP/IP communication protocol (Transmission Control Protocol/Internet Protocol), and has the basic functions of displaying static background picture, controlled dynamic pictures, such as drill pipe motion and formation layering, automatic animation, and recording curves. The graphic projecting unit, which comprises a high-performance projector with higher resolution and brightness and a large-size screen, is connected with the graphic processing computer to project all the pictures onto a large screen curtain. The driller console, the remote console, the blowout preventer console and the choke console are interconnected via a PPI protocol (point to point interface protocol). The teacher console is connected with the PPI protocol via a PPI interface (point to point interface). The choke manifold is connected with the choke console. The high pressure manifold is connected with the blowout preventer console.

A driller console comprises a chassis and an internal control plate. The front face of the chassis is provided with a driller console front face control panel. The side face of the chassis is provided with a driller console side face control panel, wherein the driller console front face control panel is provided with a pressure gauge set, a weight indicator, a rotary table torque indicator, a backup gauge, a switch set, a button set A, a display set, a winch speed adjusting handle, and a brake handle. The pressure gauge set comprises a gas source pressure gauge, a cooling water pressure gauge, a winch oil pressure gauge, a rotary table oil pressure gauge, a cathead pressure gauge, a pump pressure gauge, a tongs pressure gauge, a left tongs pressure gauge, a right tongs pressure gauge, and a safety tongs pressure gauge. The switch set comprises a left cathead switch, a right cathead switch, a hydraulic station unloading switch, a protective reset switch, an air horn switch, a rotary table inertial brake switch, a pneumatic inching switch, a backup switch, an emergency brake switch, and a parking brake switch. The button set A comprises a No. 1 button, a No. 2 button, a No. 3 button, a No. 4 button, a No. 5 button, a No. 6 button, a No. 7 button, a No. 8 button, a No. 9 button, a No. 10 button, a No. 11 button, a No. 12 button, a No. 13 button, and a No. 14 button. The display set comprises a parameter display, a mud density display, a mud viscosity display, and a mud fluid loss display. The internal control plate comprises a driller console programmable logic controller PLC1 and a driller console programmable logic controller PLC2. A CPU (central processing unit) module of the driller console programmable logic controller PLC1 is connected with the winch speed adjusting handle and the brake handle respectively via an AD module (analog to digital module). The CPU module of the driller console programmable logic controller PLC1 is also connected with the gas source pressure gauge, the cooling water pressure gauge, the winch oil pressure gauge, the rotary table oil pressure gauge, the cathead pressure gauge, the rotary table torque indicator, the pump pressure gauge, the tongs pressure gauge, the backup gauge, the left tongs pressure gauge, the right tongs pressure gauge, and the safety tongs pressure gauge via a DA module (digital to analog module) The CPU module of the driller console programmable logic controller PLC1 is also connected with the weight indicator, the emergency brake switch and the parking brake switch via a digital input/output (DIO) extension module The CPU module of the driller console programmable logic controller PLC1 is also connected, via a switch quantity output port thereof, with the input end of a weight indicator controller the output end of which is connected with the weight indicator The CPU module of the driller console programmable logic controller PLC1 is also connected with the left cathead switch, the right cathead switch, the hydraulic station unloading switch, the protective reset switch, the air horn switch, the rotary table inertial brake switch, the pneumatic inching switch, the backup switch, the No. 1 button, the No. 2 button, the No. 3 button, the No. 4 button, the No. 5 button, the No. 6 button, the No. 7 button, the No. 8 button, the No. 9 button, the No. 10 button, the No. 11 button, the No. 12 button, the No. 13 button, and the No. 14 button via a switch quantity input port thereof, and simultaneously connected with the No. 1 button, the No. 2 button, the No. 3 button, the No. 4 button, the No. 5 button, the No. 6 button, the No. 7 button, and the No. 8 button via the switch quantity output port. The CPU module of the driller console programmable logic controller PLC1 is further connected with a driller console data transmitting/receiving plate via a serial port. The driller console data transmitting/receiving plate is connected with the mud density display, the mud viscosity display and the mud fluid loss display via parallel ports. The driller console side face control panel comprises an indicator set, a selector valve set, a button set B, a regulating valve set, a torque indicator, and a tachometer. The indicator set comprises a programmable logic controller PLC1 indicator, a programmable logic controller PLC2 indicator, a power generator 1 indicator, a power generator 2 indicator, a power generator 3 indicator, a power generator 4 indicator, a mud pump A indicator, a mud pump B indicator, a mud pump C indicator, a winch A indicator, a winch B indicator, a drill table indicator, a constant-speed drilling or constant-pressure drilling indicator, an internal blowout preventer indicator, a hydraulic pump operation indicator, a rotary head locking indicator, a brake indicator, a fault alarm indicator, and an in-position indicator. The selector valve set comprises a PLC working selector valve, a motor working selector valve, a winch working selector valve, a mud pump A working selector valve, a mud pump B working selector valve, a mud pump C working selector valve, a rotary table working selector valve, a winch constant-speed drilling or constant-pressure drilling working selector valve, an elevator link rotation selector valve, an internal blowout preventer working selector valve, a hydraulic pump selector valve, a rotary head locking selector valve, a backup tongs working selector valve, an elevator link inclination selector valve, a brake working mode selector valve, an auxiliary operation selector valve, a fan working selector valve, a motor selector valve, an operating mode selector valve, and a rotating direction selector valve. The button set B comprises a machine emergency stop button, a variable-frequency emergency stop button, a drill table torque adjusting knob, a mud pump A adjusting knob, a mud pump B regulating knob, a mud pump C regulating knob, a rotary table rotating speed adjusting knob, a constant-pressure drilling weight-on-bit adjusting knob, an elevator link middle position button, a mute button, and an emergency stop button. The regulating valve set comprises a makeup torque limiting regulating valve, a drilling well torque limiting regulating valve and a rotating speed setting regulating valve. A CPU module of the driller console programmable logic controller PLC2 is connected with the drill table torque adjusting knob, the mud pump A adjusting knob, the mud pump B regulating knob, the mud pump C regulating knob, the rotary table rotating speed adjusting knob, the constant-pressure drilling weight-on-bit adjusting knob, the makeup torque limiting regulating valve, the drilling well torque limiting regulating valve, and the rotating speed setting regulating valve via the AD module respectively. The CPU module of the driller console programmable logic controller PLC2 is also connected with the torque indicator and the tachometer via the DA module, connected with the brake indicator, the fault alarm indicator, the in-position indicator, the mute button, the emergency stop button, the brake working mode selector valve, the auxiliary operation selector valve, the fan working selector valve, the motor selector valve, the operating mode selector valve, and the rotating direction selector valve via the DIO extension module. The CPU module of the driller console programmable logic controller PLC2 is also connected with the PLC1 indicator, the PLC2 indicator, the power generator 1 indicator, the power generator 2 indicator, the power generator 3 indicator, the power generator 4 indicator, the mud pump A indicator, the mud, pump B indicator, the mud pump C indicator, the winch A indicator, the winch B indicator, the drill table indicator, the constant-speed drilling or constant-pressure drilling indicator, the internal blowout preventer indicator, the hydraulic pump operation indicator, and the rotary head locking indicator via the switch quantity output port thereof. The CPU module of the driller console programmable logic controller PLC2 is further connected with the PLC working selector valve, the motor working selector valve, the winch working selector valve, the machine emergency stop button, the variable-frequency emergency stop button, the mud pump A working selector valve, the mud pump B working selector valve, the mud pump C working selector valve, the rotary table working selector valve, the winch constant-speed drilling or constant-pressure drilling working selector valve, the elevator link rotation selector valve, the elevator link middle position button, the internal blowout preventer working selector valve, the hydraulic pump selector valve, the rotary head locking selector valve, the backup tongs working selector valve, and the elevator link inclination selector valve via the switch input port thereof.

The working flow of the driller console mud density regulation subprogram is approximately as follows. The subprogram begins running to read switch quantity in. Density value is increased by 0.01 if an increase button is pressed. Otherwise, whether a decrease button is pressed is judged. If so, the density value is decreased by 0.01 and then the beginning state of the subprogram is returned. If not, the beginning state of the subprogram is returned as well, and the above steps are cycled.

The driller console weight indicator control subprogram outputs the stepping pulse according to the weight value of the weight indicator to control the rotation of the stepping motor, so that the suspending weight pointer points at the corresponding value. Its working flow is approximately as follows. The subprogram begins running to read the suspending weight value of the weight indicator from a reception buffer zone. If the suspending weight value is 0 and the suspending weight pointer is located at the zero point, return is directly performed. If the suspending weight value is 0 and the suspending weight pointer is not located at the zero point, the stepping motor is controlled to rotate anticlockwise until the suspending weight pointer points at the zero point. When the suspending weight value is not 0, whether a change occurs is judged at first. If not, return is directly performed. If so, whether the suspending weight value becomes larger or smaller is judged. If the suspending weight value becomes larger, the direction control symbol of the stepping motor is set as 1 (clockwise rotation). If the suspending weight value becomes smaller, the direction control symbol of the stepping motor is set as 0 (anticlockwise rotation). Afterwards, the suspending weight variation difference is calculated, wherein 1 stepping pulse suspending weight difference is output, followed by subtracting 1 until 0 is obtained, and finally, return is performed.

The working flow of the driller consoler side face panel main control program is approximately as follows. The program begins, the in-position indicator is initialized. Switch quantity is read and stored in the transmission buffer zone. The A/D result is read and stored in the transmission buffer zone. Whether the internal blowout preventer is closed is judged. If so, the internal blowout preventer indicator is on. Then, whether the hydraulic pump operates is judged. If so, the hydraulic pump operation indicator is on. If not, the hydraulic pump operation indicator is off. Then, whether the rotary head is locked is judged. If so, the rotary head locking indicator is on. If not, the rotary head locking indicator is off. Then, a rotating speed setting subprogram and a torque setting subprogram are called. If the rotating speed setting symbol is 0 (this symbol value is set in the rotating speed setting subprogram), rotating speed data is read from the reception buffer zone and output to D/A. If not, the tachometer displays a rotating speed value transmitted from a host PC. Then, whether a torque setting symbol is 0 is judged. If so, torque data is read from the reception buffer zone and output to D/A. Then, return is performed, and otherwise, return is performed directly.

The working flow of the driller console drilling torque setting program is approximately as follows. The subprogram is initiated. The A/D result is read. Whether the setting knob is regulated is judged. If so, it means that an operator is setting a drilling torque upper limit. At this moment, a current regulation value is displayed in real-time by the instrument. In the case that no change occurs within 3 seconds, it is considered as being set. Afterwards, the instrument displays a drilling torque value transmitted from the host PC. Finally, the subprogram is returned.

The remote console comprises a chassis and an internal control plate. The front face of the chassis is provided with a remote console control panel. The remote console control panel is provided with a ring oil pressure regulating valve, a manifold pressure regulating valve, a manifold pressure gauge, an accumulator pressure gauge, a ring oil pressure gauge, a bypass valve, a blowout preventer valve, a pipe ram control valve, a blind ram control valve, a shear ram control valve, a ring ram control valve, an accumulator main switch, a left-path accumulator switch, and a right-path accumulator switch. The internal control plate comprises a remote console programmable logic controller PLC and a valve controller. A CPU module of the remote console programmable logic controller PLC is connected with the manifold pressure regulating valve and the ring oil pressure regulating valve via the AD module respectively. The CPU module of the remote console programmable logic controller PLC is also connected with the manifold pressure gauge and the accumulator pressure gauge via the DA module 1, connected with the ring oil pressure gauge via the DA module 2, and connected with the accumulator main switch, the left-path accumulator switch, and the right-path accumulator switch via the switch quantity input port thereof. The CPU module of the remote console programmable logic controller PLC is further connected with a control input end of the valve controller via twelve switch quantity outputs (the twelve switch quantity outputs are respectively used as a bypass valve startup control signal, a bypass on or off control signal, a blowout preventer valve startup control signal, a blowout preventer valve on or off control signal, a pipe ram control valve startup control signal, a pipe ram control valve on or off control signal, a blind ram control valve startup control signal, a blind ram control valve on or off control signal, a shear ram control valve startup control signal, a shear ram control valve on or off control signal, a ring ram control valve startup control signal, and a ring ram control valve on or off control signal). The output of the valve controller is connected with the bypass valve, the blowout preventer valve, the pipe ram control valve, the blind ram control valve, the shear ram control valve, and the ring ram control valve respectively. The bypass valve, the blowout preventer valve, the pipe ram control valve, the blind ram control valve, the shear ram control valve and the ring ram control valve are accessed to twelve switch quantity input ports (the twelve switch quantity inputs are respectively used as a bypass valve on/off feedback signal, a blowout preventer valve on/off feedback signal, a pipe ram control valve on/off feedback signal, a blind ram control valve on/off feedback signal, a shear valve control valve on/off feedback signal, and a ring ram control valve on/off feedback signal) of the remote console programmable logic controller PLC respectively via feedback signal wires.

In which, the manifold pressure regulating valve is used for regulating manifold pressure. The ring oil pressure regulating valve is used for regulating ring oil pressure. The manifold pressure gauge is used for displaying manifold pressure value, the accumulator pressure gauge is used for displaying accumulator pressure value. The ring oil pressure gauge is used for displaying ring oil pressure value. The bypass valve is used for opening or closing a bypass pipeline and feeding back the on/off state of a bypass ram. The blowout preventer valve is used for opening or closing blowout preventer pipelines and feeding back the on/off state of the blowout preventer valve. The accumulator main switch is used for opening or closing an accumulator main pipeline.

The working flow of the remote console control program is approximately as follows. When the control program is initiated, Port 1 of the PLC is initialized by the initialization port to realize point-to-point communication with the blowout preventer, and simultaneously, instrument initialization is displayed. Switch quantity is read and stored in an internal buffer zone for subsequent processing. The A/D result is then read and stored in the transmission buffer zone. NET_RW and the blowout preventer console are called for data transmission and reception. Ring, pipe ram, blowout prevention and shear control subprograms are called. The rotation of the stepping motor is controlled according to the operation of a blowout preventer handle in order to switch on the control oil path of the blowout preventer, so that the blowout preventer is controlled to be on or off. If the left and right oil path switches and the oil path main switch are switched on, a ring pressure regulating value is transmitted to a ring instrument display buffer zone. If a bypass is selected to be on, a manifold pressure regulating value is transmitted to a manifold pressure instrument display buffer zone. Otherwise, a 21 MPa display value is transmitted to the instrument display buffer zone. If the left and right oil path switches and the oil path main switch are not switched on, 0 value is transmitted to the instrument display buffer zone. Then, data are read from the instrument display buffer zone to the D/A. Finally, return is performed to read and store the switch quantity in the internal buffer zone, and the above steps are cycled.

The working flow of the remote console subprogram is approximately as follows. The subprogram begins running to read the state of the blowout preventer operation handle from the reception buffer zone in order to judge whether the blowout preventer operation handle operates. The stepping motor rotates only if the blowout preventer operation handle operates. If the stepping motor does not rotate, the beginning state is returned. Otherwise, the stepping motor rotation symbol is controlled to be set, the rotation direction of the stepping motor is selected based upon ON or OFF. In the case of ON, the direction control symbol is set as 0 (indicating left rotation). In the case of complete OFF, the stepping motor rotation symbol is controlled to be zeroed. Then, the beginning state is returned. In the case of incomplete OFF, return is also performed. In the case of OFF, the direction control symbol is set as 1 (indicating right rotation). In the case of complete ON, the stepping motor rotation symbol is controlled to be zeroed. Then, the beginning state is returned, and in the case of incomplete ON, return is also performed, and the above steps are cycled.

The choke manifold comprises a choke tube and a valve installed on the choke tube. The choke tube is installed on a choke manifold frame and is featured by vertical and crossed distribution of transverse tubes and vertical tubes. A plurality of flat valves is arranged on the transverse tubes and the vertical tubes. The transverse tubes comprise a choke manifold upper transverse tube and a choke manifold lower transverse tube. The two ends of the choke manifold upper transverse tube are fixedly connected to the choke manifold frame. One end of the choke manifold upper transverse tube is provided with a separator outlet while the other end thereof is provided with a backup outlet. The vertical tubs comprise an overflow inlet tube, a hydraulic choke tube and a manual choke tube. The lower ends of the overflow inlet tube, the hydraulic choke tube and the manual choke tube are provided with an overflow inlet, a hydraulic choke valve and a manual choke valve respectively. The upper end of the overflow inlet tube is fixedly connected to the choke manifold frame.

The overflow inlet tube is connected with the choke manifold upper transverse tube and with the choke manifold lower transverse tube respectively in a crosswise manner to form a crossing point a and a crossing point b. The flat valve A is installed on the overflow inlet tube at the upper part of the crossing point a. The flat valve b and the flat valve c are sequentially installed on the overflow inlet tube between the crossing point a and the crossing point b. The pressure gauge is arranged at the crossing point b. A blowout preventer valve ON/OFF indicator is installed on the overflow inlet tube at the lower part of the crossing point b. The two ends of the choke manifold lower transverse tube are fixedly connected to the hydraulic choke tube and the manual choke tube respectively to form a nodal point c and a nodal point d. The flat valve D and the flat valve E are installed on the choke manifold lower transverse tube between the crossing point b and the crossing point c. The flat valve F and the flat valve G are installed on the choke manifold lower transverse tube between the crossing point b and the crossing point d. The upper ends of the hydraulic choke tube and the manual choke tube are connected with the choke manifold upper transverse tube respectively to form a nodal point e and a nodal point f. The flat valve H is installed on the hydraulic choke tube between the nodal point c and the nodal point e. A hydraulic indicator is installed on the manual choke tube at the lower part of the nodal point c. The end part of the manual choke tube is provided with the hydraulic choke valve. The flat valve I is installed on the manual choke tube between the nodal point d and the nodal point f. The manual choke valve is arranged at the end part of the manual choke tube at the lower part of the nodal point d. The flat valve J is arranged on the choke manifold upper transverse tube between the nodal point e and the backup outlet. The flat valve K is arranged on the choke manifold upper transverse tube between the nodal point f and the separator outlet.

The high pressure manifold comprises a high pressure tube and a valve installed on the high pressure valve. The high pressure tube is installed on a high pressure manifold frame and is featured by vertical connection and distribution of transverse tubes and vertical tubes. A high pressure manifold upper transverse tube, a high pressure manifold lower transverse tube, a left vertical tube and a right vertical tube are jointed at the middle of the high pressure tube to form a rectangle. A plurality of flat valves is arranged on the transverse tubes and the vertical tubes. The transverse tubes further comprise a left mud inlet tube, a right mud inlet tube and a grouting outlet tube. The left end of the left mud inlet tube is fixedly connected to the high pressure manifold frame. The left end part of the left mud inlet tube is provided with a mud inlet I. The right end of the right mud inlet tube is fixedly connected to the high pressure manifold frame. The right end part of the right mud inlet tube is provided with a mud inlet II. The left end of the grouting outlet tube is fixedly connected to the high pressure manifold frame. The left end part of the grouting outlet tube is provided with a grouting outlet. The vertical tubes further comprise an upper vertical tube and a lower vertical tube. The upper end of the upper vertical tube is fixedly connected to the high pressure manifold frame. The upper end part of the upper vertical tube is provided with a backup inlet. The lower end of the lower vertical tube is fixedly connected to the high pressure manifold frame. The lower end part of the lower vertical tube is provided with a vertical tube outlet.

The left mud inlet tube and the right mud inlet tube are in T-shaped connection with the rectangular left vertical tube and the rectangular right vertical tube respectively to form a nodal point h and a nodal point i. The flat valve L is installed on the left vertical tube at the upper part of the nodal point h. The flat valve M is installed on the left vertical tube at the lower part of the nodal point h. The flat valve N is installed on the right vertical tube at the upper part of the nodal point i. The flat valve O is installed on the right vertical tube at the lower part of the nodal point i. The upper vertical tube and the lower vertical tube are in T-shaped connection with the rectangular high pressure manifold upper transverse tube and the rectangular high pressure manifold lower transverse tube respectively to form a nodal point g and a nodal point j. The grouting outlet tube is in T-shaped connection with the lower vertical tube to form a nodal point k. The flat valve P is installed on the grouting outlet tube. The flat valve Q is installed on the lower vertical tube at the lower part of the nodal point k.

The blowout preventer console comprises a chassis and an internal control plate. The front face of the chassis is provided with a blowout preventer control panel. The blowout preventer control panel is provided with an accumulator pressure gauge, a ring blowout preventer oil pressure gauge, a gas source pressure gauge, a manifold pressure gauge, a ring ram switch, a ring ram on indicator, a ring ram off indicator, a gas source switch, a bypass ram switch, an upper pipe ram switch, an upper pipe ram on indicator, an upper pipe ram off indicator, a blind ram switch, a blind ram on indicator, a blind ram off indicator, a kill manifold ram switch, a kill manifold on indicator, a kill manifold off indicator, a blowout preventer valve switch, a blowout preventer valve off indicator, a blowout preventer valve on indicator, a lower pipe ram switch, a lower pipe ram on indicator, and a lower pipe ram off indicator. The internal control plate comprises a blowout preventer programmable logic controller PLC. A CPU module of the blowout preventer programmable logic controller PLC is connected with the accumulator pressure gauge and the ring blowout preventer oil pressure gauge via the DA module 1 respectively. The CPU module of the blowout preventer programmable logic controller PLC is also connected with the gas source pressure gauge and the manifold pressure gauge via the DA module 2 respectively. The CPU module of the blowout preventer programmable logic controller PLC is further connected with the ring ram switch, the gas source switch, the bypass ram switch, the upper pipe ram switch, the blind ram switch, the kill manifold ram switch, the blowout preventer valve switch, and the lower pipe ram switch respectively via the switch quantity input port thereof. The CPU module of the blowout preventer programmable logic controller PLC is further connected with the ring ram on indicator, the ring ram off indicator, the upper pipe ram on indicator, the upper pipe ram off indicator, the blind ram on indicator, the blind ram off indicator, the kill manifold on indicator, the kill manifold off indicator, the blowout preventer valve off indicator, the blowout preventer valve on indicator, the lower pipe ram on indicator, and the lower pipe ram off indicator respectively via the switch quantity output port thereof. The CPU module of the blowout preventer programmable logic controller PLC is further connected, via the switch quantity input port thereof, with the flat valves L, M, N, O, P and Q installed on the high pressure tube in the high pressure manifold respectively. In which, the accumulator pressure gauge is used for displaying accumulator pressure value. The ring blowout preventer oil pressure gauge is used for displaying ring blowout preventer oil pressure value. The gas source pressure gauge is used for displaying gas source pressure value. The manifold pressure gauge is used for displaying manifold pressure value. The ring ram switch is used for opening or closing ring ram. The ring ram ON/OFF indicator is used for indicating the ON/OFF of ring ram.

The working flow of the blowout preventer control program is approximately as follows. When the control program is initiated. The Port 1 of the PLC is initialized by the initialization port to realize point-to-point communication with the remote console, and simultaneously, initialization is displayed by both indicators and the display instruments. Switch quantity is read and stored in the internal buffer zone for being directly read by PC. The NET_RW and the remote console are called for data transmission and reception. Ring, pipe ram, blowout prevention and shear control subprograms are called to control the indicators according to the blowout preventer operation handle and the on/off time in order to display whether the blowout preventers are completely opened/closed. Afterwards, the state of the indicator (for indicating on/off state of the blowout preventer) is stored in the transmission buffer zone. Then, an alarm control standard is read from the reception buffer zone. Alarm is switched on in the case of choosing to alarm and alarm is switched off in the case of choosing to not alarm. Finally, the step of reading and storing the switch quantity in the transmission buffer zone is returned, and the above steps are cycled.

The working flow of the ring blowout preventer control sub-program is approximately as follows. The subprogram begins running the ON/OFF states including the operation handle state of the blowout preventer and the operation handle state of the remote console are read. In the case that the remote console is connected, if the gas source on the blowout preventer is chosen to be on and the ring is on or the ring on the remote console is on, the time is set to be 8 seconds. The indicator is ON if the ring blowout preventer is on. The indicator is OFF if the ring blowout preventer is OFF. Then, the subprogram is returned. Otherwise, the subprogram is returned. If the gas source on the blowout preventer is chosen to be ON and the ring is OFF or the ring on the remote console is OFF, the time is set to be 8 seconds. The indicator is ON if the ring blowout preventer is OFF. The indicator is OFF if the ring blowout preventer is ON. Then, the subprogram is returned. Otherwise, the subprogram is returned. In the case that no remote console is connected, if the gas source on the blowout preventer is ON and the ring is ON, the time is set to be 8 seconds. The indicator is ON if the ring blowout preventer is ON. The indicator is OFF if the ring blowout preventer is OFF. Then, the subprogram is returned. If the time is not set to be 8 seconds, the subprogram is still returned. If the gas source on the blowout preventer is ON and the ring is OFF, the time is set to be 8 seconds. The indicator is ON if the ring blowout preventer is OFF. The indicator is OFF if the ring blowout preventer is ON. Then, subprogram is returned, and otherwise, the subprogram is returned.

The choke console comprises a chassis and an internal control plate. The front face of the chassis is provided with a choke control panel. The choke control panel is provided with a vertical tube pressure gauge, a pump speed gauge, a sleeve pressure gauge, a hydraulic choke valve selection indicator, a dual-pump selection switch, a choke valve selection switch, a pump stroke display, a choke valve opening gauge, a manual choke valve selection indicator, a reset button, a driller gas source switch, a choke control valve switch, and a choke valve speed adjusting knob. The internal control plate comprises a choke programmable logic controller PLC. A CPU module of the choke programmable logic controller PLC is connected with the choke valve speed adjusting knob (190) via the AD module. The CPU module of the choke programmable logic controller PLC is also connected with the vertical tube pressure gauge and the sleeve pressure gauge via the DA module 1. The CPU module of the choke programmable logic controller PLC is also connected with the pump speed gauge and the choke valve opening gauge via the DA module 2. The CPU module of the choke programmable logic controller PLC is further connected with a choke data transmitting/receiving plate via a serial port. The choke data transmitting/receiving plate is connected with a pump stroke display via a parallel port. The CPU module of the choke programmable logic controller PLC is further connected with the hydraulic choke valve selection indicator and the manual choke valve selection indicator via the switch quantity output port thereof respectively. The CPU module of the choke programmable logic controller PLC is further connected with the dual-pump selection switch, the choke valve selection switch, the reset button, the driller gas source switch and the choke control valve switch via the switch quantity input port thereof respectively. The CPU module of the choke programmable logic controller PLC is further connected, via the switch quantity input port thereof, with the flat valves A, B, C, D, E, F, G, H, I, J and K installed on the choke tube in the choke manifold respectively. The CPU module of the choke programmable logic controller PLC is connected with the manual choke valve in the choke manifold via the AD module and with a pressure gauge via the DA module 1. In which, the vertical tube pressure gauge is used for indicating vertical tube pressure. The sleeve pressure gauge is used for indicating sleeve pressure, the pump speed gauge is used for indicating pump speed. The choke valve opening gauge is used for indicating choke valve opening. The dual-pump selection switch is used for selecting No. 1 pump, No. 2 pump or the dual pumps. The pump stroke display is used for displaying accumulated pump strokes. The choke valve selection switch is used for selecting the manual choke valve or the hydraulic choke valve. The manual choke valve selection indicator is used for indicating the selection of the manual choke valve. The hydraulic choke valve selection indicator is used for indicating the selection of the hydraulic choke valve. The reset button is used for resetting pump stroke, the driller gas source switch is used for opening or closing driller gas source. The choke control valve switch is used for increasing or decreasing the opening of the choke regulating valve. The choke valve speed adjusting knob is used for increasing or decreasing the speed of the choke regulating valve.

The choke data transmitting/receiving plate comprises a serial port chip, a single chip microcomputer, a latch, and a bus buffer. The input end of the serial port chip is connected with the serial port of the choke programmable logic controller PLC via the serial port. The output end of the serial port chip is connected with the transmitting data line and the receiving data line of the single chip microcomputer respectively. The single chip microcomputer is further connected with the latch and the bus buffer via buses respectively. The output ports of the latch and the bus buffer are connected with the pump stroke display via the parallel ports.

The pump stroke display comprises an address buffer, a data buffer, a comparator, a decoder, a dip switch, a nixie tube drive chip, and a nixie tube. The input ports of the address buffer and the data buffer are both connected with the parallel port. The output port of the data buffer is connected with the nixie tube drive chip. The output port of the address buffer is connected with one input end of the comparator and the decoder respectively. The other input end of the comparator is connected with the dip switch. The output port is connected with the enabling end of the decoder. The output end of the decoder is connected with the nixie tube drive chip. The output end of the nixie tube drive chip is connected with the nixie tube.

The working flow of the choke control program is approximately as follows. When the control program is initiated, the port Port1 of the PLC is initialized by the initialization port to realize data communication with the LED display control plate. Then, switch quantities (including switch quantity inputs of the dual-pump selection switch, the choke valve selection switch, the reset switch, the driller gas source switch and the choke valve control switch) are read and stored in the transmission buffer zone for being directly read by PC communication. The A/D result I then read and stored in the transmission buffer zone for being directly read by PC communication. Whether a hydraulic mode or a manual mode is selected is judged. If the hydraulic mode is selected, the hydraulic indicator is turned ON. If the manual mode is selected, the manual indicator is turned ON. Afterwards, data is read from the reception buffer zone and output to the D/A in order to control the display of instruments for displaying vertical tube pressure, sleeve pressure, pumps speed and chokes speed. The data is then transmitted to the LED display control plate via the serial port. The switch quantities are read again and stored in the transmission buffer zone, and the above steps are cycled. In addition, the entire system is a bus-type network including one PC serving as a master station and a plurality of PLCs serving as a slave station. Every communication is initiated by the master station. The slave station monitors and judges whether transmission and reception requests about the slave station is present. Its working flow is approximately as follows: The master station transmits a signal. If the slave station monitors the transmission and reception requests about the slave station, the slave station agrees with the reception of the requests so that the data is received and stored in the reception buffer zone. Afterwards, the slave station returns to continue monitoring. If the slave station does not monitor the transmission and reception requests about the slave station and does not receive and transmit the requests, the slave station returns to monitor. If the slave station does not receive the request, but agrees with the reception of the requests, in this case, the data are read from the transmission buffer zone and transmitted. Then, the slave station returns to monitor, and the above steps are cycled.

The main control computer comprises one or more than one general computers as well as a communication program and a main control program running thereon. The graphic computer comprises one or more than one general computers as well as a graphic processing program running thereon. The communication program is connected with front end hardware via the PPI protocol. The main control program is connected with the communication program and the graphic processing program via the TCP/IP protocol respectively, wherein the front end hardware comprises the blowout preventer console, the choke console, the remote console, and the driller console.

The main control program comprises an operation training module, a system management module and a scoring module. The main control program is connected with front end hardware equipment via the communication program to obtain the state of the hardware equipment in real-time, for example parameters such as rotation number of drill table, brake state, mud discharging quantity and mud density, needed to be obtained in the simulation for drilling process. Then, a typical drilling process is simulated by means of relevant mathematical models to finish the following tasks. 1. A control command is sent to the graphic processing program via TCP/IP protocol, and thus the graphic processing program can be driven to generate an animation process that is synchronous with the operation of the hardware equipment. 2. An intelligent scoring system is realized. 3. A signal is fed back to the front end hardware, enabling the parameter display of front end instruments to accord with onsite situation.

System management module, which comprises hardware self-inspection, user management and killing scheme management, is mainly used for completing management and configuration for the distributed drilling simulation system. The functions like system self-inspection and user management can be completed using this module. Meanwhile, some parameters in the system are changed so as to change the operation mode of the main control program. In this way, different demands are met.

The scoring module is mainly used for automatically scoring the training process. Scoring is related mainly to two factors. (1) Operating Flow: all the operating flows of trainees are recorded in the system, wherein the operating flow of trainee is compared with a preset operating flow in the system upon the completion of trainee examination to evaluate the accordance of the two flows and score the operating flow of trainees on this basis. (2) Operating Level: In addition to the grasp of corrective operating flow by trainees, their operating flow shall be taken into consideration in comprehensively evaluating the technical level of trainees, e.g. whether the selection for weight on bit during drilling in is appropriate and whether drilling is even, wherein for the problem whether the control for pressure during killing meets the demand of killing constructor, the system determines the operating level score by adopting a method for recording relevant data curves in the operating flow and comparing the data curves with standard curves afterwards. The scoring process is as follows: a trainee logs in the system, begins examination and completes corresponding operations, wherein the system scores automatically based upon relevant standards to obtain a final score.

The graphic processing program comprises a scene initialization module, a process animation control module, a collision processing module and a render effect module. A vivid, virtual drilling environment is created by means of full three-dimensional animation so that trainees feel as if they were in a real drilling environment, and thus the mental resilience of trainees in accident handling is improved and better training effect is obtained. The four modules have the following functions:

Scene initialization: The current scene of every operation differs owing to the complexity of drilling process and the operability of virtual training. Before a new operation begins, the graphic program initializes the current scene after receiving an operation command sent from the control computer, for example the current number, state and position of operating components on a drilling platform.

Process animation control: In the process of completing the specified process operation, every action from drilling console is converted into a digital signal. The digital signal is transmitted to the main control computer. Protocol data are then sent to the graphic program by the main control computer and the graphic program gives a specific response after the acquisition of parameters. Motion parameters, specific motions and view selection (including aboveground visual angle, underground visual angle, blowout preventer visual angle, multi-view display, and etc.) of various control systems on drilling platform are reflected on a graphic machine.

Collision processing: The situation of 'wall through' is not allowed in the motion simulation process of three-dimensional graphics. Therefore, collision detection shall be performed on motion objects. To cause model motion to be realistic, a drilling simulator visual simulating system certainly includes collision detecting and processing parts.

Render effect: Simulation for flame, bubble, liquid jetting effects is realized. Movie-level illumination effect is accomplished using GLSL, and illumination modes like daylight, night and searchlight can be simulated respectively, thus greatly improving graphic effect and sense of reality.

The operation training module comprises an RIH sub-module, a POOH sub-module, a drill-in sub-module, an accident and complex situation handling sub-module, a shut in sub-module, and a killing sub-module. The operation training module provides the training about 23 common technological processes and event drive processes in the drilling process, and accordingly, is the most important module in the main control program. Event drive training has no limitation to trainees, who therefore can operate the simulator randomly, and the graphic system will reflect reasonable mechanical motions and simultaneously give a voice prompt with regard to erroneous operations. The module is mainly used for cognitive training of new trainees about drilling site and drilling machinery. In technical process training, trainees are required to operate the simulator per its technical process, in order to intensify the comprehension of trainees on the technical process and make trainees master the operation process of the simulator.

Among all the sub-modules, the top driving event drive sub-module is used for operation simulation based on real top driver, and the simulation includes control logic contents like internal blowout preventer, locking of rotary head, rotation of elevator links, inclination of elevator links, backup tongs, drilling well or rotary makeup or torque, reversal rotation or stoppage or positive rotation, and etc.

The RIH sub-module is used for simulating the RIH process and trainees are required to master the RIH process correctively to reach the purpose of steady RIH. Its actual flow is as follows:

(a) Normal RIH flow: Begin this operation, start up an elevator, then place and make up a stand, move the elevator away, drop a drill bit, take off elevator links, judge whether RIH is performed, wherein if so, return to start up the elevator, or otherwise, end this operation.

(b) Set weight flow: Begin this operation, perform RIH normally, perform punching and reaming in the event of set weight, end this operation, and return if set weight does not occur.

(c) Fluctuation pressure controlling RIH flow: Begin this operation, start up an elevator, then place and make up a stand, move the elevator away, drop a drill bit at low speed, press corresponding button to take off elevator links, judge whether RIH is continued, wherein if so, return to begin this operation, or otherwise, end this operation.

The POOH sub-module is used for simulating the POOH process and trainees are required to master the POOH process correctively to reach the purpose of steady POOH. Its actual operating flow is as follows:

(a) Normal POOH flow: Begin this operation, lift up a drill bit, unload a stand, pour mud, judge whether POOH is performed, wherein if so, return to begin this operation, or otherwise, end this operation.

(b) Getting overpull flow: Begin this operation, perform POOH normally, perform circulative freeing in the event of getting overpull, perform back reaming, end this operation, and return to normal POOH in the case of being unstuck.

(c) Suction pressure controlling POOH flow: Begin this operation, lift the drill bit at low speed, unload the stand, pour the mud, judge whether POOH is continued, wherein if so, return to lift the drill bit at low speed, or otherwise, end this operation.

The drill sub-module is used for simulating typical drilling well condition and trainees are required to master the drilling process correctively to reach the purpose of even drilling and simultaneously to master the drilling technology for complicated formation. Its actual operating flow is as follows:

(a) Normal drilling and stand makeup flow: Begin this operation, circulate mud, perform light press and running in, perform drilling normally, make up the stand, and drop by a certain depth to end this operation.

(b) Drilling flow under different formation drillabilities: Begin this operation, circulate mud, perform light press and running in, drill by 1 meter at a first formation, drill by 1 meter at a second formation, drill by 1 meter at a third formation, take out drilling pipe, and end this operation.

(c) Drilling flow under bouncing: Begin this operation, perform drilling normally if not bouncing occurs, lift up drilling pipe if bouncing occurs, change rotating speed and weight on bit, drop drilling pipe, judge whether bouncing is reduced, wherein return to lift up drilling pipe if bouncing is not reduced and circulate the operation until bouncing is reduced, then ream bouncing sections, and end this operation.

(d) High-pressure formation drilling flow: Begin this operation, circulate mud, perform drilling normally, judge whether overflowing occurs, perform drilling normally if not overflowing occurs, otherwise, increase mud density, continue drilling, make up the stand, and finally, end this operation.

(e) Low-pressure formation drilling flow: Begin this operation, circulate mud, perform drilling normally, judge whether leakage occurs, perform drilling normally if not leakage occurs, otherwise, increase mud density, continue drilling, make up the stand, and finally, end this operation.

The accident and complex situation handling sub-module is used for simulating common failures and complex situations in the drilling process. The simulating system creates an accident randomly and requires trainee to judge the type of this accident by means of the phenomenon (mainly changes of a variety of instruments) reflected by simulator and handle the accident properly. Its actual operating flow is as follows:

(a) Adhesion sticking judging and handling flow: Begin this operation, lift up the drilling pipe, judge whether there is a ground failure, continue lifting up the drilling pipe if there is no failure, drop the drill bit interruptedly if there is a failure, move the drill bit, circulate mud, free the moved drill bit, then judge whether the moved drill bit has been freed, wherein if not, return to continue freeing until freeing is completed, and end this operation.

(b) Solids settling sticking judging and handling flow: Begin this operation, perform POOH normally, judge whether there is solids settling sticking, if not, return to normal POOH, move the drill bit if there is solids settling sticking, circulate mud in small quantity, judge whether pump pressure is normal, wherein if not, return to circulate mud, and if so, circulate mud in large quantity, and finally, end this operation.

(c) Balling-up sticking judging and handling flow: Begin this operation, perform light press and running in, perform drilling, judge whether there is balling-up sticking, wherein if not, return to normal POOH, and if so, circulate mud in larger quantity, perform reaming at high speed, regulate mud performances, continue drilling, and finally, end this operation.

(d) Taper tap fishing flow: Begin this operation, wash top of fish, detect fallen fish downwards, judge whether the fallen fish is detected, wherein if not, return to continue downward detection, and if so, release thread, make thread, try to lift up the drill pipe, lift up the fallen fish, and finally, end this operation.

(e) Junk milling flow: Begin this operation, wash well bottom, mill twice, continue milling until the mill is broken, and end this operation.

The shut in sub-module is used for simulating four shut in conditions. Trainees are required to locate overflowing timely and to be able to shut in well safely and rapidly as required by the 'four, seven' motions.

(a) Operating flow of normal drilling and shutting in: Begin this operation, perform drilling normally, judge whether overflowing occurs, wherein if not, perform drilling normally, and if so, open the choke manifold and close ring blowout preventer, upper pipe ram blowout preventer, throttle valve and J2A flat valves, then log well and end this operation.

(b) Operating flow of POOH and shutting in: Begin this operation, unload a square drilling pipe, lift up a vertical pipe, judge whether overflowing occurs, wherein if not, return to lift up the vertical pipe, and if so, make up a drill bit blowout preventer in advance, shut in well, log well, and end this operation.

(c) Operating flow of drill collar lifting and shutting in: Begin this operation, lift up a drill collar, judge whether overflowing occurs, wherein if not, return to lift up the drill collar, and if so, make up a blowout preventing single pipe in advance, shut in well, log well, and end this operation.

(d) Operating flow of emptying and shutting in: Begin this operation, judge whether the overflowing quantity is large after the drill collar is lifted up, wherein if so, shut in well, log well and finally end this operation, and if not, make up the blowout preventing single pipe in advance, shut in well, log well, and finally end this operation.

The killing sub-module is used for simulating three conventional killing operations. Trainees are required to control wellhead pressure correctively to reach the purpose of succeeding in killing at a time. Its actual operating flow is as follows:

(a) Operating flow of killing by driller's method: Begin this operation, set mud pump stroke, discharge contaminated mud, judge whether the contaminated mud is completely discharged, wherein if not, return to discharge the contaminated mud completely, and if so, increase mud density, perform killing by weighted mud, judge whether killing is finished, wherein if not, return to continue killing, and if so, end this operation.

(b) Operating flow of killing by engineer's method: Begin this operation, set mud pump stroke, increase mud density, then perform killing by weighted mud, judge whether killing is finished, wherein if not, return to continue killing, and if so, end this operation.

(c) Operating flow of killing by overweight mud driller's method: Begin this operation, prepare overweight mud, pump the overweight mud in, judge whether circulation is finished, wherein if so, regulate mud density, perform killing by killing mud, and judge whether killing is finished, wherein if not, return to continue killing, and if so, end this operation.

The invention has the advantages of realizing high-degree top driving drilling simulation, enhancing the field sense for teaching and training, shortening the training period and reducing the training cost.

BRIEF DESCRIPTION OF THE DRAWINGS

FIG. 53 is a flow chart of normal drilling and shutting in.

FIG. 54 is a flow chart of POOH and shutting in.

FIG. 55 is a flow chart of drill collar lifting and shutting in.

FIG. 56 is a flow chart of emptying and shutting in.

Figure 1:
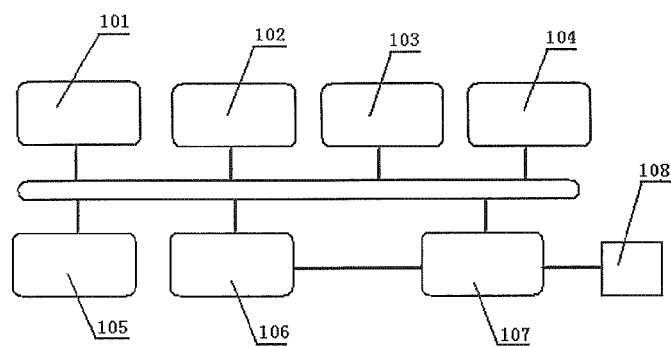
FIG. 1 is a structural schematic diagram of the distributed drilling simulator.

Wherein, 1—driller console front face control panel, 2—gas source pressure gauge, 3—cooling water pressure gauge, 4—winch oil pressure gauge, 5—rotary table oil pressure gauge, 6—weight indicator, 7—cathead pressure gauge, 8—parameter display, 9—rotary table torque indicator, 10—pump pressure gauge, 11—tongs pressure gauge, 12—backup gauge, 13—left tongs pressure gauge, 14—right tongs pressure gauge, 15—safety tongs pressure gauge, 16—left cathead switch, 17—right cathead switch, 18—hydraulic station unloading switch, 19—protective reset switch, 10—air horn switch, 21—rotary table inertial brake switch, 22—pneumatic inching switch, 23—backup switch, 24—winch speed regulating handle, 25—No. 1 button, 26—No. 2 button, 27—No. 3 button, 28—No. 4 button, 29—No. 5 button, 30—No. 6 button, 31—No. 7 button, 32—No. 8 button, 33—No. 9 button, 34—No. 10 button, 35—No. 11 button, 36—No. 12 button, 37—No. 13 button, 38—No. 14 button, 39—mud density display, 40—mud viscosity display, 41—mud fluid loss display, 42—brake handle, 43—emergency brake switch, 44—parking brake switch, 45—driller console side face control panel, 46—programmable controller PLC1 indicator, 47—programmable controller PLC2 indicator, 48—engine 1 indicator, 49—engine 2 indicator, 50—engine 3 indicator, 51—engine 4 indicator, 52—mud pump A indicator, 53—mud pump B indicator, 54—mud pump C indicator, 55—winch A indicator, 56—winch B indicator, 57—drill table indicator, 58—constant—speed drilling or constant—pressure drilling indicator, 59—PLC working selector valve, 60—motor working selector valve, 61—winch working selector valve, 62—machine emergency stop button, 63—variable—frequency emergency stop button, 64—drill table torque adjusting knob, 65—mud pump A working selector valve, 66—mud pump B working selector valve, 67—mud pump C working selector valve, 68—rotary table working selector valve, 69—winch constant—speed drilling or constant—pressure drilling working selector valve, 70—mud pump A adjusting knob, 71—mud pump B regulating knob, 72—mud pump C regulating knob, 73—rotary table rotating speed adjusting knob, 74—constant—pressure drilling weight—on—bit adjusting knob, 75—internal blowout preventer indicator, 76—hydraulic pump operation indicator, 77—rotary head locking indicator, 78—elevator link rotation selector valve, 79—elevator link middle position button, 80—brake indicator, 81—in—position indicator, 82—internal blowout preventer working selector valve, 83—hydraulic pump selector valve, 84—rotary head locking selector valve, 85—backup tongs working selector valve, 86—elevator link inclination selector valve, 87—brake working mode selector valve, 88—mute button, 89—emergency stop button, 90—auxiliary operation selector valve, 91—fan working selector valve, 92—motor selector valve, 93—operating mode selector valve, 94—rotating direction selector valve, 95—makeup torque limiting regulating valve, 96—torque indicator, 97—tachometer, 98—falut alarm indicator, 99—drilling well torque limiting regulating valve, 100—rotating speed setting regulating valve, 101—choke manifold, 102—high pressure manifold, 103—blowout preventer console, 104—choke console, 105—remote console, 106—driller console, 107—teacher console, 108—graphic projecting unit, 109—remote console control panel, 110—ring oil pressure regulating valve, 111—manifold pressure regulating valve, 112—manifold pressure gauge, 113—accumulator pressure gauge, 114—ring oil pressure gauge, 115—bypass valve, 116—blowout preventer valve, 117—pipe ram control valve, 118—blind ram control valve, 119—shear ram control valve, 120—ring ram control valve, 121—accumulator main switch, 122—left—path accumulator switch, 123—right—path accumulator switch, 124—choke manifold frame, 125—choke manifold upper transverse tube, 126—choke manifold lower transverse tube, 127—separator outlet, 128—backup outlet, 129—overflow inlet tube, 130—hydraulic choke tube, 131—manual choke tube, 132—overflow inlet, 133—blowout preventer valve on/off indicator, 134—hydraulic choke valve, 135—manual choke valve, 136—hydraulic indicator, A, B, C, D, E, F, G, H, I, J, K—flat valve, a, b—crossing point, c, d, e, f—nodal points, 137—high pressure manifold frame, 138—high pressure manifold upper transverse tube, 139—high pressure manifold lower transverse tube, 140—left vertical tube, 141—right vertical tube, 142—left mud inlet tube, 143—grouting outlet tube, 144—mud inlet I, 145—mud inlet H, 146—grouting outlet, 147—upper vertical tube, 148—lower vertical tube, 149—backup inlet, 150—vertical tube outlet, 151—right mud inlet tube, L, M, N, 0, P, Q—flat valves, g, h, i, j, k—nodal points, 152—blowout preventer control panel, 153—accumulator pressure gauge, 154—ring blowout preventer oil pressure gauge, 155—gas source pressure gauge 156—manifold pressure gauge 157—ring ram switch, 158—ring ram on indicator, 159—a ring ram off indicator, 160—gas source switch, 161—upper pipe ram switch, 162—upper pipe ram on indicator, 163—upper pipe ram off indicator, 164—bypass ram switch, 165—blind ram switch, 166—blind ram on indicator, 167—blind ram off indicator, 168—kill manifold ram switch, 169—kill manifold on indicator, 170—kill manifold off indicator, 171—blowout preventer valve switch, 172—blowout preventer valve off indicator, 173—blowout preventer valve on indicator, 174—lower pipe ram switch, 175—lower pipe ram on indicator, 176—lower pipe ram off indicator, 177—choke control panel, 178—vertical tube pressure gauge, 179—pump speed gauge, 180—sleeve pressure gauge, 181—hydraulic choke valve selection indicator, 182—dual—pump selection switch, 183—choke valve selection switch, 184—pump stroke display, 185—choke valve opening gauge, 186—manual choke valve selection indicator, 187—reset button, 188—driller gas source switch, 189—choke control valve switch, and 190—choke valve speed adjusting knob.

DETAILED DESCRIPTION OF THE PREFERRED EMBODIMENT

Further description is made below to the technical disclosure of the invention with reference to the drawings. As shown in FIG. 1, the distributed drilling simulator comprises a choke manifold 101, a high pressure manifold 102, a blowout preventer console 103, a choke console 104, a remote console 105, a driller console 106, a teacher console 107, and a graphic projecting unit 108. The graphic projecting unit 108 comprises two projectors and one large-size screen. The teacher console 107 is composed of a main control computer and a graphic computer. The driller console 106, the main control computer and the graphic processing computer are interconnected via a TCP/IP protocol. The driller console 106, the remote console 105, the blowout preventer console 103, and the choke console 104 are interconnected with a SIEMENS PPI protocol. The teacher console 107 is interconnected with the PPI protocol via a PPI interface. The PPI interface is a SIEMENS CP5611 card. The choke manifold 101 is connected with the choke console 104 and the high pressure manifold 102 is connected with the blowout preventer console 103.

Figure 2:
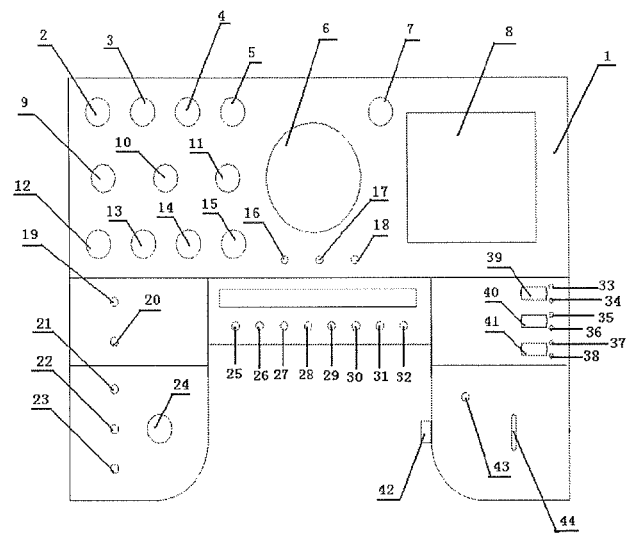
FIG. 2 is a structural schematic diagram of the front face of the driller console.
Figure 3:
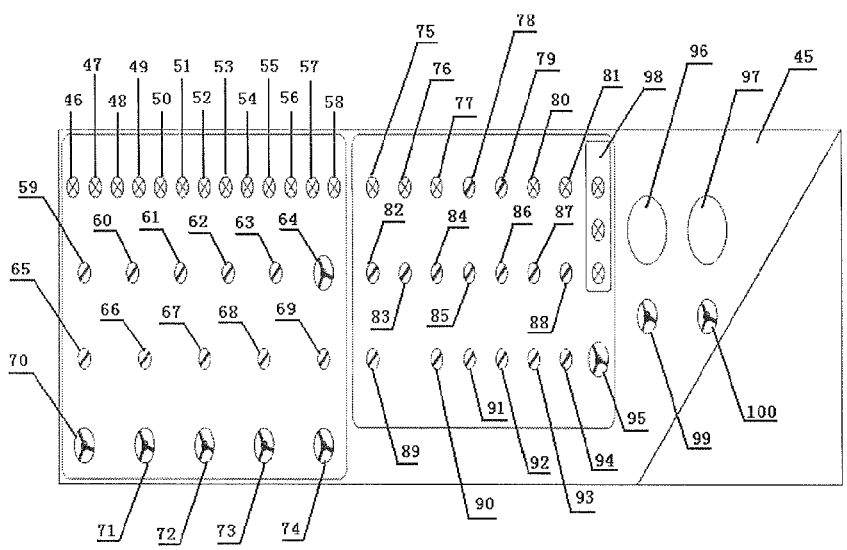
FIG. 3 is a structural schematic diagram of the side face of the driller console.
Figure 4:
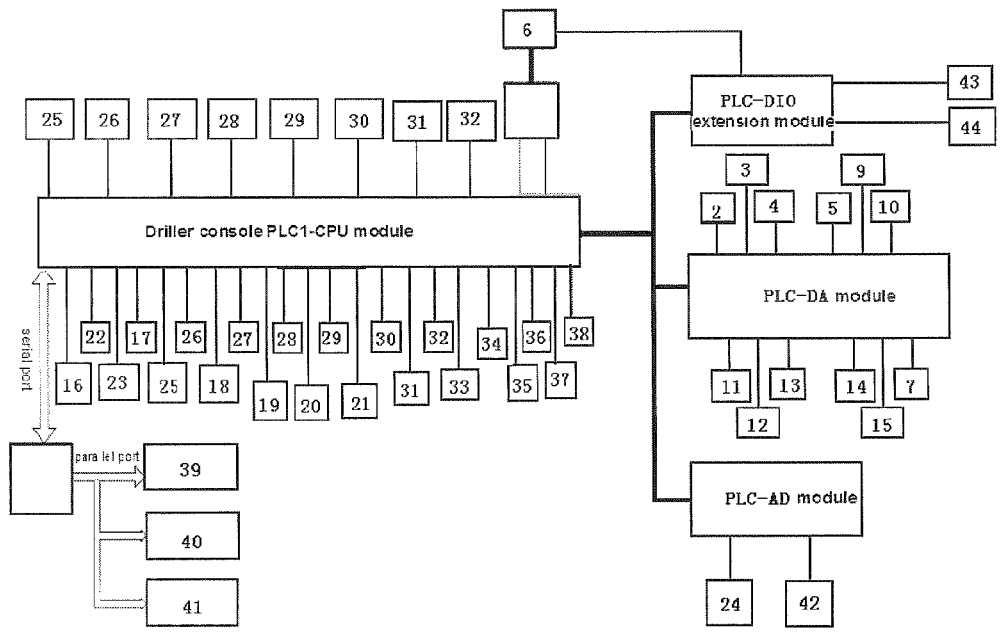
FIG. 4 is a diagram of the connection relationship between the internal control plate of the driller console and major components on the front face of the control panel.
Figure 5:
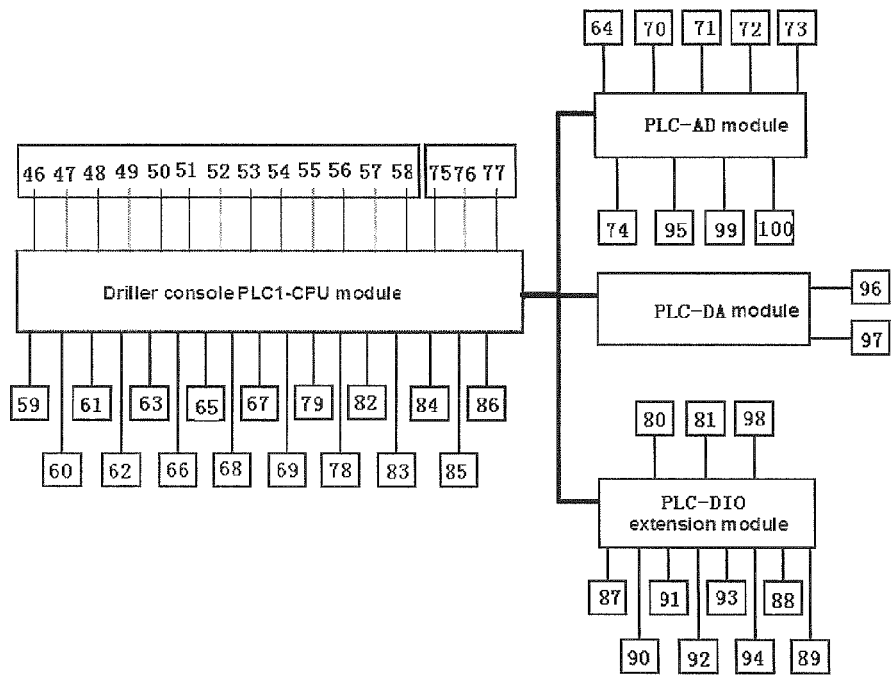
FIG. 5 is a diagram of the connection relationship between the internal control plate of the driller console and major components on the side face of the control panel.

As shown in FIG. 2, the driller console comprises a chassis and an internal control plate. The front face of the chassis is provided with a driller console front face control panel 1. The side face of the chassis is provided with a driller console side face control panel 45, wherein the driller console front face control panel 1 is provided with a pressure gauge set, a weight indicator 6, a rotary table torque indicator 9, a backup gauge 12, a switch set, a button set A, a display set, a winch speed adjusting handle 24, and a brake handle 42. The pressure gauge set comprises a gas source pressure gauge 2, a cooling water pressure gauge 3, a winch oil pressure gauge 4, a rotary table oil pressure gauge 5, a cathead pressure gauge 7, a pump pressure gauge 10, a tongs pressure gauge 11, a left tongs pressure gauge 13, a right tongs pressure gauge 14, and a safety tongs pressure gauge 15. The switch set comprises a left cathead switch 16, a right cathead switch 17, a hydraulic station unloading switch 18, a protective reset switch 19, an air horn switch 20, a rotary table inertial brake switch 21, a pneumatic inching switch 22, a backup switch 23, an emergency brake switch 43, and a parking brake switch 44. The button set A comprises a No. 1 button 25, a No. 2 button 26, a No. 3 button 27, a No. 4 button 28, a No. 5 button 29, a No. 6 button 30, a No. 7 button 31, a No. 8 button 32, a No. 9 button 33, a No. 10 button 34, a No. 11 button 35, a No. 12 button 36, a No. 13 button 37, and a No. 14 button 38. The display set comprises a parameter display 8, a mud density display 39, a mud viscosity display 40, and a mud fluid loss display 41. The internal control plate comprises a driller console programmable logic controller PLC1 and a driller console programmable logic controller PLC2. The driller console programmable logic controller PLC1 and the driller console programmable logic controller PLC2 are both SIEMENS S7-200. As shown in FIG. 4, a CPU module of the driller console programmable logic controller PLC1 is connected with the winch speed adjusting handle 24 and the brake handle 42 via an AD module respectively. The CPU module of the driller console programmable logic controller PLC1 is also connected with the gas source pressure gauge 2, the cooling water pressure gauge 3, the winch oil pressure gauge 4, the rotary table oil pressure gauge 5, the cathead pressure gauge 7, the rotary table torque indicator 9, the pump pressure gauge 10, the tongs pressure gauge 11, the backup gauge 12, the left tongs pressure gauge 13, the right tongs pressure gauge 14, and the safety tongs pressure gauge 15 via a DA module. The CPU module of the driller console programmable logic controller PLC1 is also connected with the weight indicator 6, the emergency brake switch 43 and the parking brake switch 44 via a digital input/output DIO extension module. The CPU module of the driller console programmable logic controller PLC1 is also connected, via a switch quantity output port thereof, with the input end of a weight indicator controller the output end of which is connected with the weight indicator. The CPU module of the driller console programmable logic controller PLC1 is further connected with the left cathead switch 16, the right cathead switch 17, the hydraulic station unloading switch 18, the protective reset switch 19, the air horn switch 20, the rotary table inertial brake switch 21, the pneumatic inching switch 22, the backup switch 23, the No. 1 button 25, the No. 2 button 26, the No. 3 button 27, the No. 4 button 28, the No. 5 button 29, the No. 6 button 30, the No. 7 button 31, the No. 8 button 32, the No. 9 button 33, the No. 10 button 34, the No. 11 button 35, the No. 12 button 36, the No. 13 button 37, and the No. 14 button 38 via a switch quantity input port thereof, and simultaneously connected with the No. 1 button 25, the No. 2 button 26, the No. 3 button 27, the No. 4 button 28, the No. 5 button 29, the No. 6 button 30, the No. 7 button 31 and the No. 8 button 32 via the switch quantity output port. The CPU module of the driller console programmable logic controller PLC1 is further connected with a driller console data transmitting/receiving plate via a serial port. The driller console data transmitting/receiving plate is connected with the mud density display 39, the mud viscosity display 40 and the mud fluid loss display 41 via parallel ports. As shown in FIG. 3, the driller console side face control panel 45 comprises an indicator set, a selector valve set, a button set B, a regulating valve set, a torque indicator 96 and a tachometer 97. The indicator set comprises a programmable logic controller PLC1 indicator 46, a programmable logic controller PLC2 indicator 47, a power generator 1 indicator 48, a power generator 2 indicator 49, a power generator 3 indicator 50, a power generator 4 indicator 51, a mud pump A indicator 52, a mud pump B indicator 53, a mud pump C indicator 54, a winch A indicator 55, a winch B indicator 56, a drill table indicator 57, a constant-speed drilling or constant-pressure drilling indicator 58, an internal blowout preventer indicator 75, a hydraulic pump operation indicator 76, a rotary head locking indicator 77, a brake indicator 80, a fault alarm indicator 98 and an in-position indicator 81. The selector valve set comprises a PLC working selector valve 59, a motor working selector valve 60, a winch working selector valve 61, a mud pump A working selector valve 65, a mud pump B working selector valve 66, a mud pump C working selector valve 67, a rotary table working selector valve 68, a winch constant-speed drilling or constant-pressure drilling working selector valve 69, an elevator link rotation selector valve 78, an internal blowout preventer working selector valve 82, a hydraulic pump selector valve 83, a rotary head locking selector valve 84, a backup tongs working selector valve 85, an elevator link inclination selector valve 86, a brake working mode selector valve 87, an auxiliary operation selector valve 90, a fan working selector valve 91, a motor selector valve 92, an operating mode selector valve 93, and a rotating direction selector valve 94. The button set B comprises a machine emergency stop button 62, a variable-frequency emergency stop button 63, a drill table torque adjusting knob 64, a mud pump A adjusting knob 70, a mud pump B regulating knob 71, a mud pump C regulating knob 72, a rotary table rotating speed adjusting knob 73, a constant-pressure drilling weight-on-bit adjusting knob 74, an elevator link middle position button 79, a mute button 88, and an emergency stop button 89. The regulating valve set comprises a makeup torque limiting regulating valve 95, a drilling well torque limiting regulating valve 99, and a rotating speed setting regulating valve 100. As shown in FIG. 5, a CPU module of the driller console programmable logic controller PLC2 is connected with the drill table torque adjusting knob 64, the mud pump A adjusting knob 70, the mud pump B regulating knob 71, the mud pump C regulating knob 72, the rotary table rotating speed adjusting knob 73, the constant-pressure drilling weight-on-bit adjusting knob 74, the makeup torque limiting regulating valve 95, the drilling well torque limiting regulating valve 99, and the rotating speed setting regulating valve 100 via the AD module respectively. The CPU module of the driller console programmable logic controller PLC2 is also connected with the torque indicator 96 and the tachometer 97 via the DA module. The CPU module of the driller console programmable logic controller PLC2 is also connected with the brake indicator 80, the fault alarm indicator 98, the in-position indicator 81, the mute button 88, the emergency stop button 89, the brake working mode selector valve 87, the auxiliary operation selector valve 90, the fan working selector valve 91, the motor selector valve 92, the operating mode selector valve 93, and the rotating direction selector valve 94 via the digital input/output extension module The CPU module of the driller console programmable logic controller PLC2 is further connected with the PLC1 indicator 46, the PLC2 indicator 47, the power generator 1 indicator 48, the power generator 2 indicator 49, the power generator 3 indicator 50, the power generator 4 indicator 51, the mud pump A indicator 52, the mud pump B indicator 53, the mud pump C indicator 54, the winch A indicator 55, the winch B indicator 56, the drill table indicator 57, the constant-speed drilling or constant-pressure drilling indicator 58, the internal blowout preventer indicator 75, the hydraulic pump operation indicator 76, and the rotary head locking indicator 77 via the switch quantity output port thereof. The CPU module of the driller console programmable logic controller PLC2 is further connected with the PLC working selector valve 59, the motor working selector valve 60, the winch working selector valve 61, the machine emergency stop button 62, the variable-frequency emergency stop button 63, the mud pump A working selector valve 65, the mud pump B working selector valve 66, the mud pump C working selector valve 67, the rotary table working selector valve 68, the winch constant-speed drilling or constant-pressure drilling working selector valve 69, the elevator link rotation selector valve 78, the elevator link middle position button 79, the internal blowout preventer working selector valve 82, the hydraulic pump selector valve 83, the rotary head locking selector valve 84, the backup tongs working selector valve 85, and the elevator link inclination selector valve 86 via the switch input port thereof.

Figure 14:
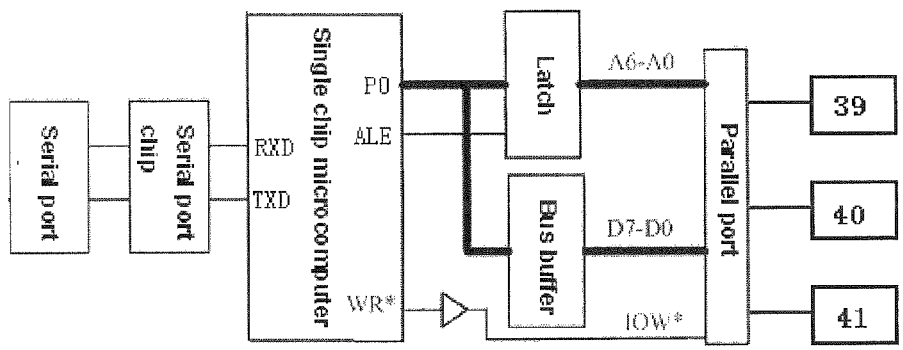
FIG. 14 is a schematic constitution diagram of the driller console data transmitting/receiving plate.

As shown in FIG. 14, the driller console data transmitting/receiving plate comprises a serial port chip, a single chip microcomputer, a latch and a bus buffer. The input end of the serial port chip is connected with the serial port of the driller console programmable logic controller PLC1 via the serial port. The output end of the serial port chip is connected with the transmitting data line and the receiving data line of the single chip microcomputer respectively. The single chip microcomputer is further connected with the latch and the bus buffer via buses respectively. The output ports of the latch and the bus buffer are connected with the mud density display 39, the mud viscosity display 40 and the mud fluid loss display 41 via the parallel ports.

Figure 15:
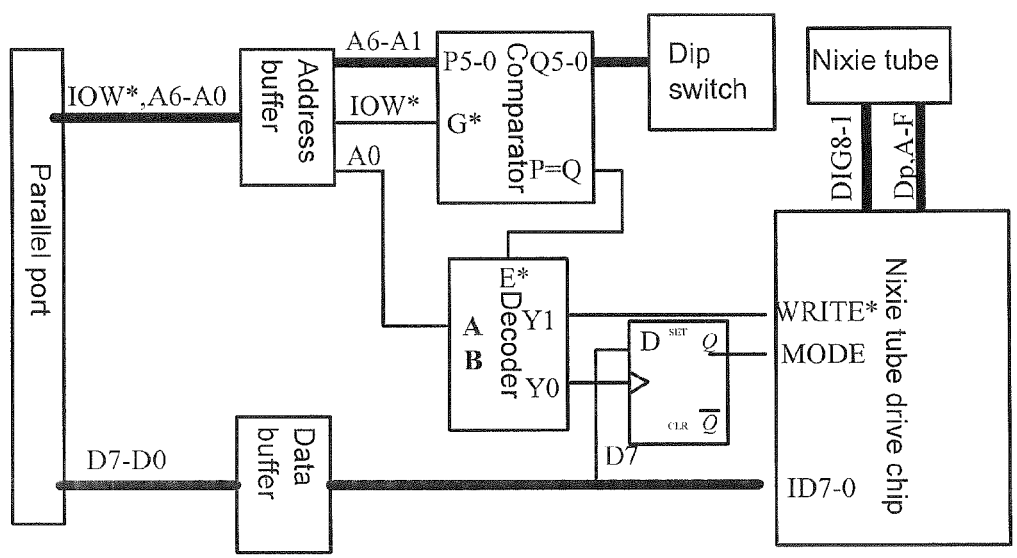
FIG. 15 is a schematic constitution diagram of the mud density display, the mud viscosity display and the mud fluid loss display in the driller console.

As shown in FIG. 15, each of the mud density display 39, the mud viscosity display 40 and the mud fluid loss display 41 comprises an address buffer, a data buffer, a comparator, a decoder, a dip switch, a nixie tube drive chip, and a nixie tube. The input ports of the address buffer and the data buffer are both connected with the parallel port. The output port of the data buffer is connected with the nixie tube drive chip. The output port of the address buffer is connected with one input end of the comparator and the decoder respectively. The other input end of the comparator is connected with the dip switch. The output port is connected with the enabling end of the decoder. The output end of the decoder is connected with the nixie tube drive chip. The output end of the nixie tube drive chip is connected with the nixie tube.

Figure 16:
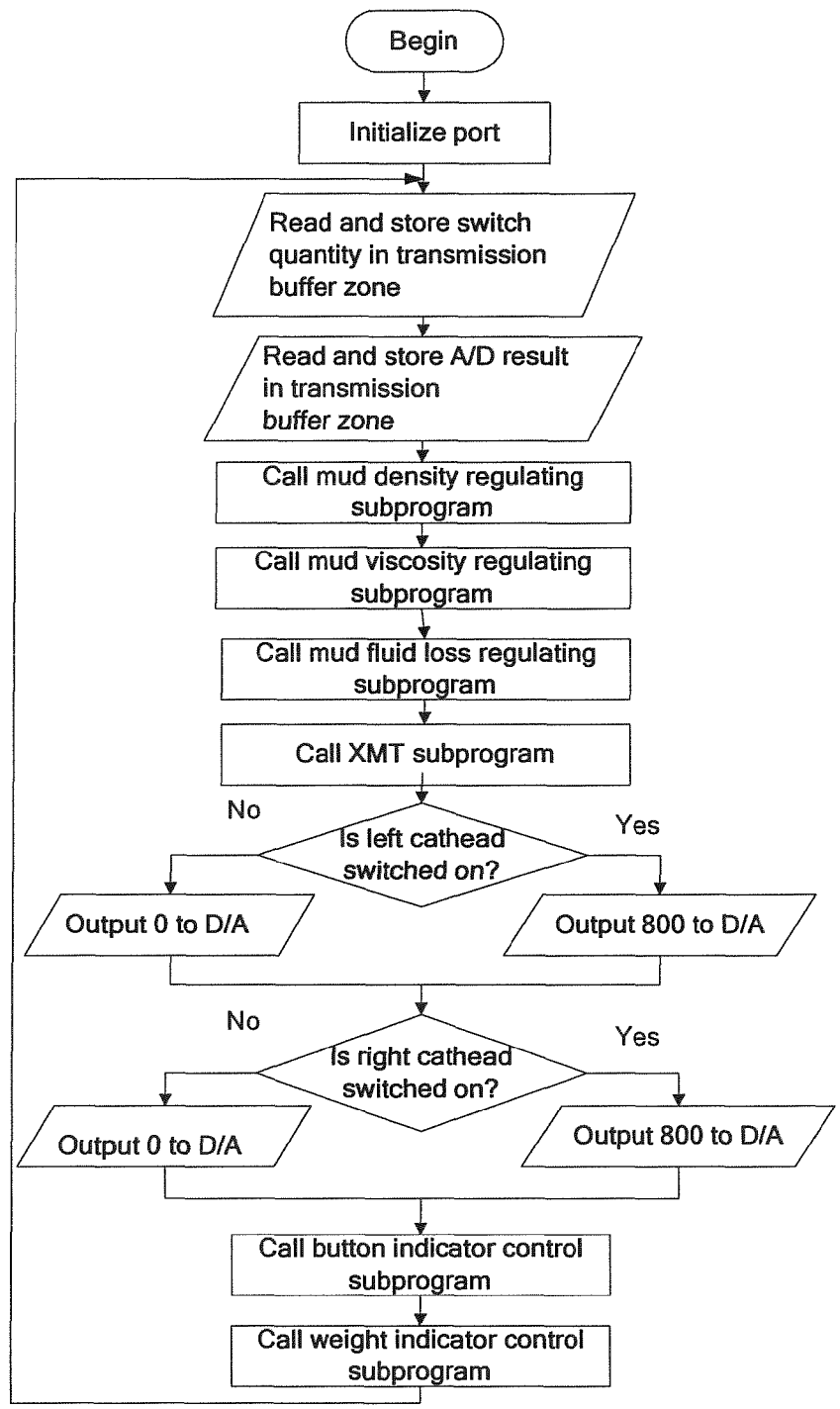
FIG. 16 is a working flow chart of the driller console control program.

FIG. 16 is a flow chart of the driller console control program. Its working flow is approximately as follows. When a control program is initiated, a port Port1 of the PLC is initialized by an initialization port to realize data communication with an LED display control plate. Then, switch quantity is read and stored in a transmission buffer zone. An A/D result is read and stored in the transmission buffer zone. Mud density, mud viscosity and mud fluid loss regulating subprograms are called and an XMT subprogram is then called. Data are transmitted to the LED display control plate. If a left cathead is switched on, 800 is output to D/A to make the left cathead display normal working pressure value. Otherwise, 0 is output to D/A. Then, whether a right cathead is switched on is judged, wherein if so, 800 is output to D/A to make the right cathead display normal working pressure value, or otherwise, 0 is output to D/A. A button indicator control subprogram is then called and a weight indicator control subprogram is called. Stepping pulse is output according to a suspending weight value of the weight indicator to control the rotation of the stepping motor, so that a suspending weight pointer points at a corresponding value. Finally, initialization is performed by returning to port, and the above steps are cycled.

Figure 17:
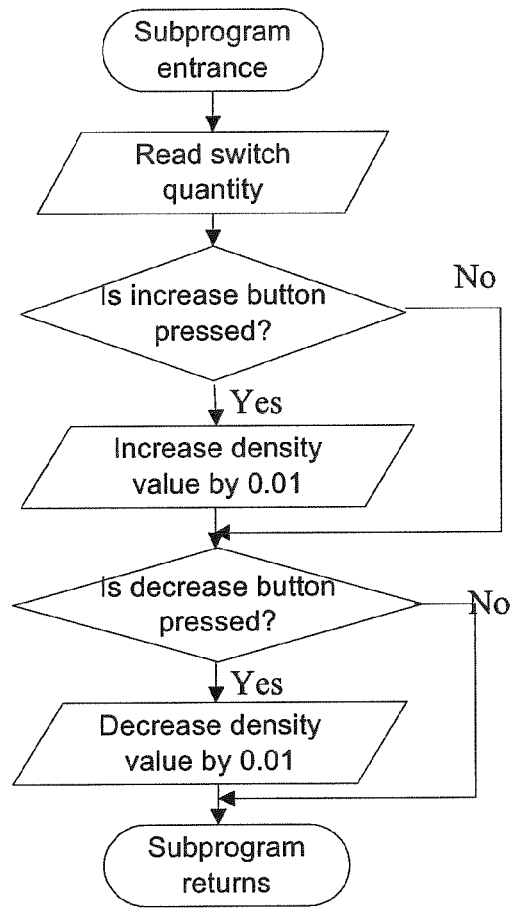
FIG. 17 is a working flow chart of the mud density regulating subprogram of the driller console.

FIG. 17 is a working flow chart of the mud density regulating subprogram of the driller console. Its working flow is approximately as follows. The sub-program begins running to read switch quantity in. Density value is increased by 0.01 if an increase button is pressed. Otherwise, whether a decrease button is pressed is judged, wherein if so, the density value is decreased by 0.01 and then the beginning state of the subprogram is returned, and if not, the beginning state of the subprogram is returned as well, and the above steps are cycled.

Figure 18:
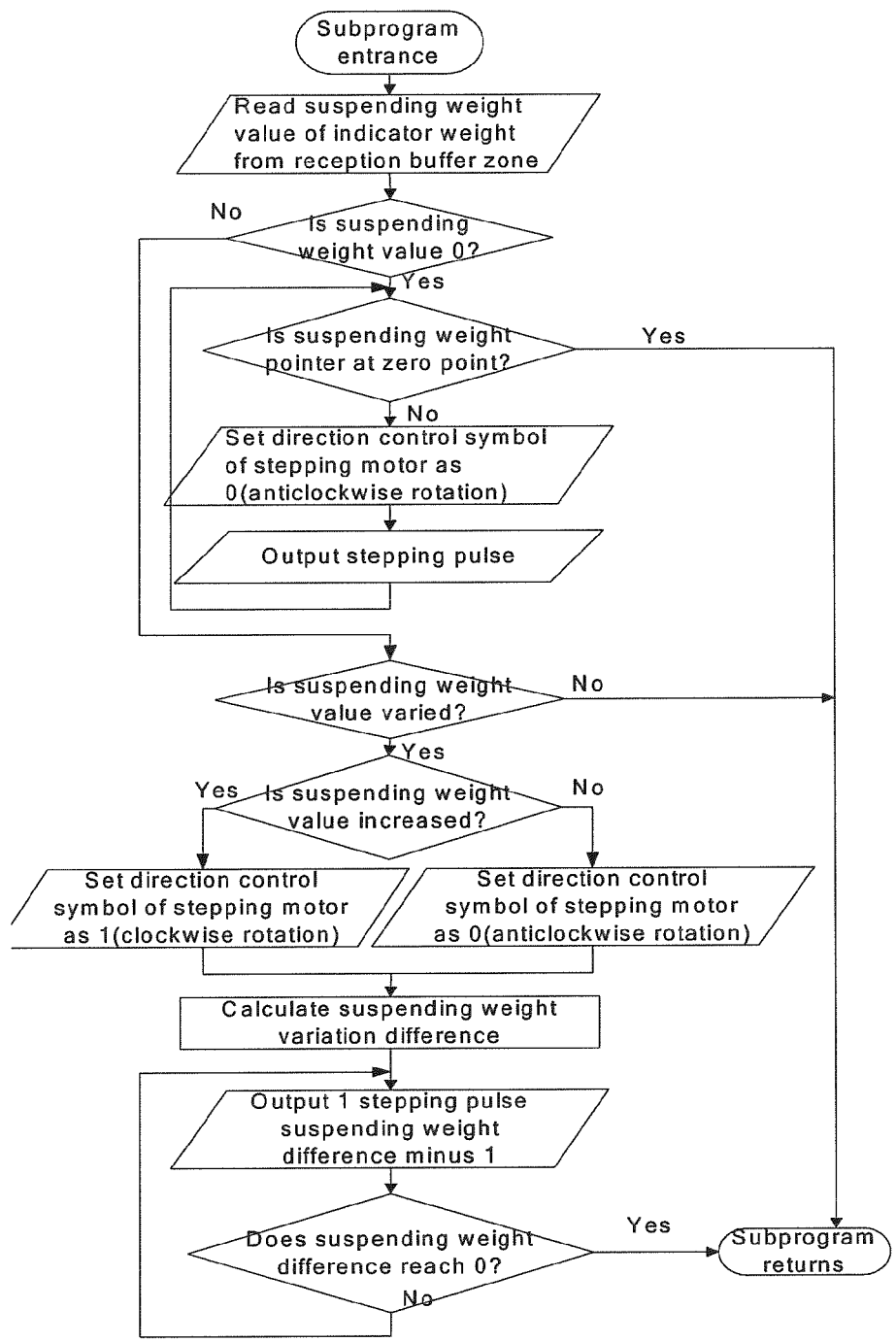
FIG. 18 is a working flow chart of the weight indicator control subprogram of the driller console.

FIG. 18 is a flow chart of the weight indicator control subprogram. The driller console weight indicator control subprogram outputs the stepping pulse according to the weight value of the weight indicator to control the rotation of the stepping motor, so that the suspending weight pointer points at the corresponding value. Its working flow is approximately as follows. The subprogram begins running to read the suspending weight value of the weight indicator from a reception buffer zone. If the suspending weight value is 0 and the suspending weight pointer is located at the zero point, return is directly performed. If the suspending weight value is 0 and the suspending weight pointer is not located at the zero point, the stepping motor is controlled to rotate anticlockwise until the suspending weight pointer points at the zero point. When the suspending weight value is not 0, whether a change occurs is judged at first, wherein if not, return is directly performed, and if so, whether the suspending weight value becomes larger or smaller is judged. If the suspending weight value becomes larger, the direction control symbol of the stepping motor is set as 1 (clockwise rotation). If the suspending weight value becomes smaller, the direction control symbol of the stepping motor is set as 0 (anticlockwise rotation). Afterwards, the suspending weight variation difference is calculated, wherein 1 stepping pulse suspending weight difference is output, and followed by subtracting 1 until 0 is obtained, and finally, return is performed.

Figure 19:
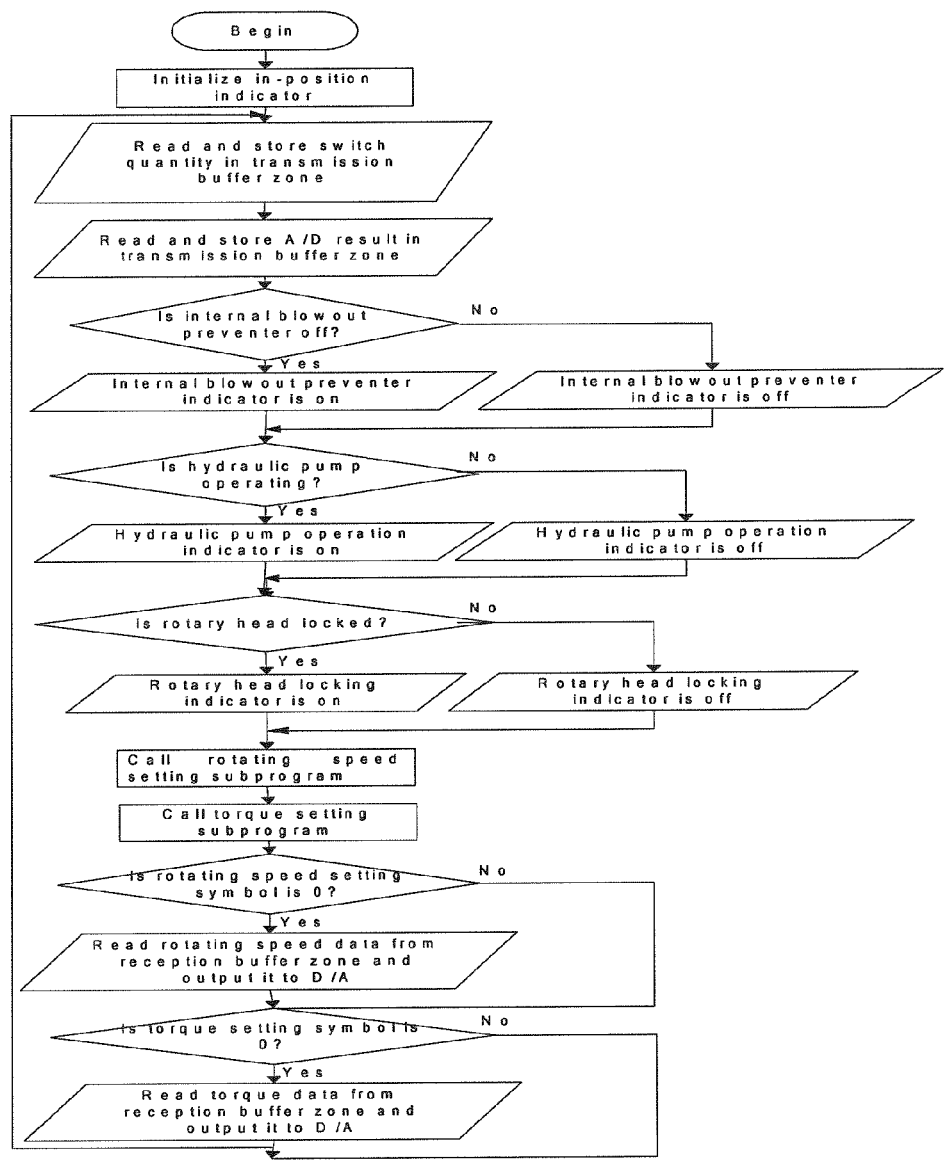
FIG. 19 is a working flow chart of the driller console side face control panel main control program.

FIG. 19 is a flow chart of the driller console side face control panel main control program. Its working flow is approximately as follows. The program begins, the in-position indicator is initialized. Switch quantity is read and stored in the transmission buffer zone. The A/D result is read and stored in the transmission buffer zone. Whether the internal blowout preventer is closed is judged, wherein if so, the internal blowout preventer indicator is on, and then whether the hydraulic pump operates is judged, wherein if so, the hydraulic pump operation indicator is on, and if not, the hydraulic pump operation indicator is off. Then, whether the rotary head is locked is judged, wherein if so, the rotary head locking indicator is on, and if not, the rotary head locking indicator is off. Then, a rotating speed setting subprogram and a torque setting subprogram are called, wherein if the rotating speed setting symbol is 0 (this symbol value is set in the rotating speed setting subprogram), rotating speed data is read from the reception buffer zone and output to D/A, and if not, the tachometer displays a rotating speed value transmitted from a host PC. Then, whether a torque setting symbol is 0 is judged, wherein if so, torque data is read from the reception buffer zone and output to D/A, and then return is performed. Otherwise, return is performed directly.

Figure 20:
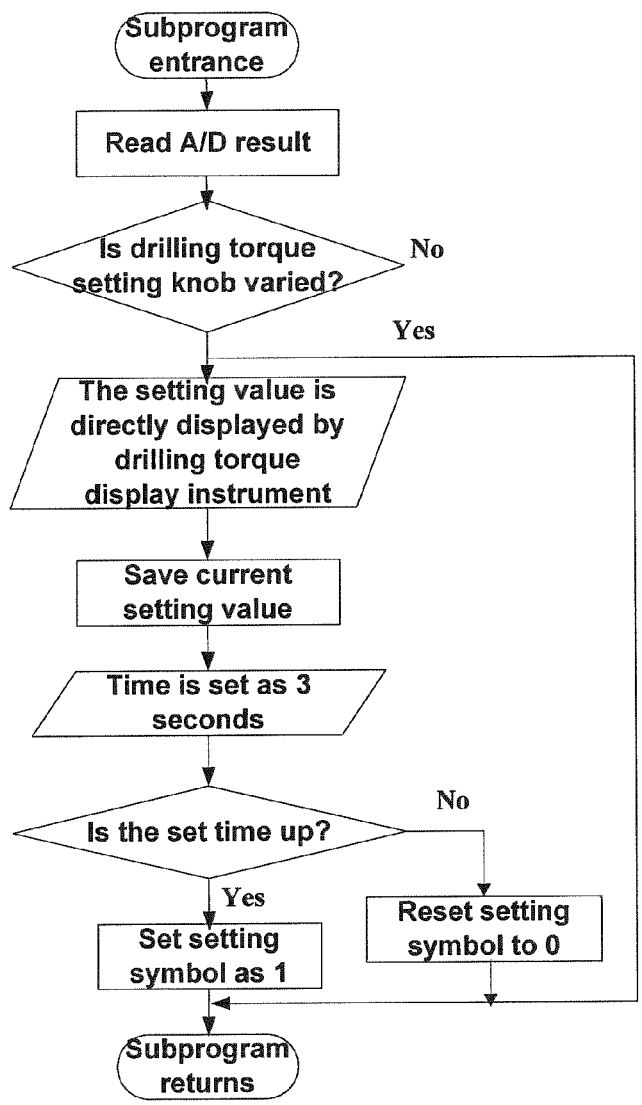
FIG. 20 is a working flow chart of the drilling torque setting program of the driller console.

FIG. 20 is a flow chart of the drilling torque setting program. Its working flow is approximately as follows. The sub-program is initiated, the A/D result is read. Whether the setting knob is regulated is judged, wherein if so, it means that an operator is setting a drilling torque upper limit. At this moment, a current regulation value is displayed in real-time by the instrument, and in the case that no change occurs within 3 seconds, it is considered as being set. Afterwards, the instrument displays a drilling torque value transmitted from the host PC, and finally, the subprogram is returned.

Figure 6:
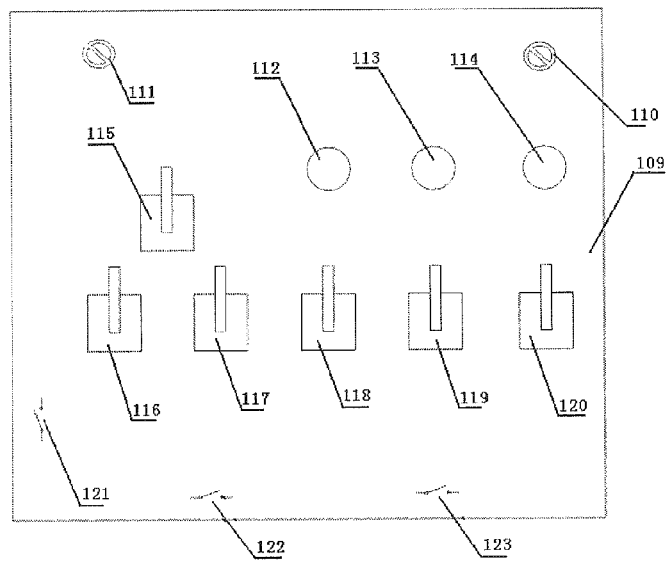
FIG. 6 is a structural schematic diagram of the control panel of the remote console.
Figure 7:
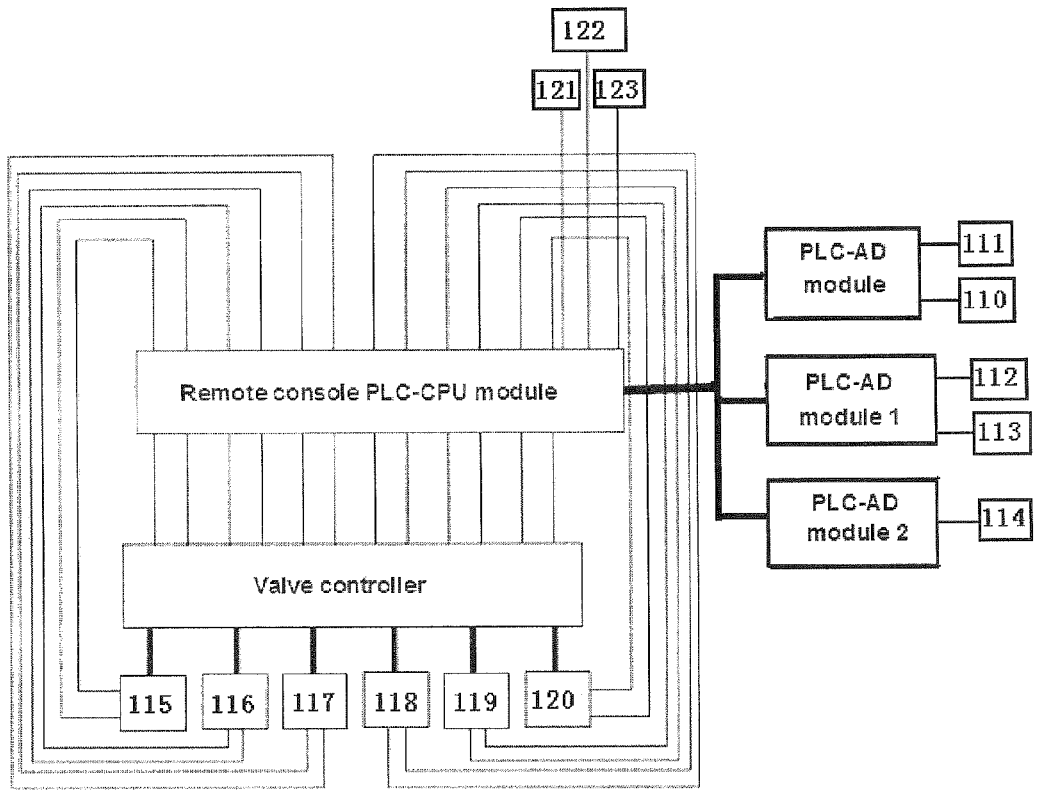
FIG. 7 is a diagram of the connection relationship between the internal control plate of the remote console and major components on the control panel.

As shown in FIG. 6, the remote console 105 comprises a chassis and an internal control plate. The front face of the chassis is provided with a remote console control panel 109. The remote console control panel 109 is provided with a ring oil pressure regulating valve 110, a manifold pressure regulating valve 111, a manifold pressure gauge 112, an accumulator pressure gauge 113, a ring oil pressure gauge 114, a bypass valve 115, a blowout preventer valve 116, a pipe ram control valve 117, a blind ram control valve 118, a shear ram control valve 119, a ring ram control valve 120, an accumulator main switch 121, a left-path accumulator switch 122, and a right-path accumulator switch 123. The internal control plate comprises a remote console programmable logic controller PLC and a valve controller. The remote console programmable logic controller PLC2 is SIEMENS S7-200. As shown in FIG. 7, a CPU module of the remote console programmable logic controller PLC is connected with the manifold pressure regulating valve 111 and the ring oil pressure regulating valve 110 via the AD module respectively. The CPU module of the remote console programmable logic controller PLC is also connected with the manifold pressure gauge 112 and the accumulator pressure gauge 113 via the DA module 1. The CPU module of the remote console programmable logic controller PLC is further connected with the ring oil pressure gauge 114 via the DA module 2. The CPU module of the remote console programmable logic controller PLC is further connected with the accumulator main switch 121, the left-path accumulator switch 122 and the right-path accumulator switch 123 via the switch quantity input port thereof. The CPU module of the remote console programmable logic controller PLC is further connected with a control input end of the valve controller via twelve switch quantity outputs (the twelve switch quantity outputs are respectively used as a bypass valve startup control signal, a bypass on or off control signal, a blowout preventer valve startup control signal, a blowout preventer valve on or off control signal, a pipe ram control valve startup control signal, a pipe ram control valve on or off control signal, a blind ram control valve startup control signal, a blind ram control valve on or off control signal, a shear ram control valve startup control signal, a shear ram control valve on or off control signal, a ring ram control valve startup control signal, and a ring ram control valve on or off control signal). The output of the valve controller is connected with the bypass valve 115, the blowout preventer valve 116, the pipe ram control valve 117, the blind ram control valve 118, the shear ram control valve 119, and the ring ram control valve 120 respectively. The bypass valve 115, the blowout preventer valve 116, the pipe ram control valve 117, the blind ram control valve 118, the shear ram control valve 119, and the ring ram control valve 120 are accessed to twelve switch quantity input ports (the twelve switch quantity inputs are respectively used as a bypass valve on/off feedback signal, a blowout preventer valve on/off feedback signal, a pipe ram control valve on/off feedback signal, a blind ram control valve on/off feedback signal, a shear valve control valve on/off feedback signal and a ring ram control valve on/off feedback signal) of the remote console programmable logic controller PLC respectively via feedback signal wires.

In which, the manifold pressure regulating valve is used for regulating manifold pressure. The ring oil pressure regulating valve is used for regulating ring oil pressure. The manifold pressure gauge is used for displaying manifold pressure value. The accumulator pressure gauge is used for displaying accumulator pressure value. The ring oil pressure gauge is used for displaying ring oil pressure value. The bypass valve is used for opening or closing a bypass pipeline and feeding back the on/off state of a bypass ram. The blowout preventer valve is used for opening or closing blowout preventer pipelines and feeding back the on/off state of the blowout preventer valve. The accumulator main switch is used for opening or closing an accumulator main pipeline.

Figure 21:
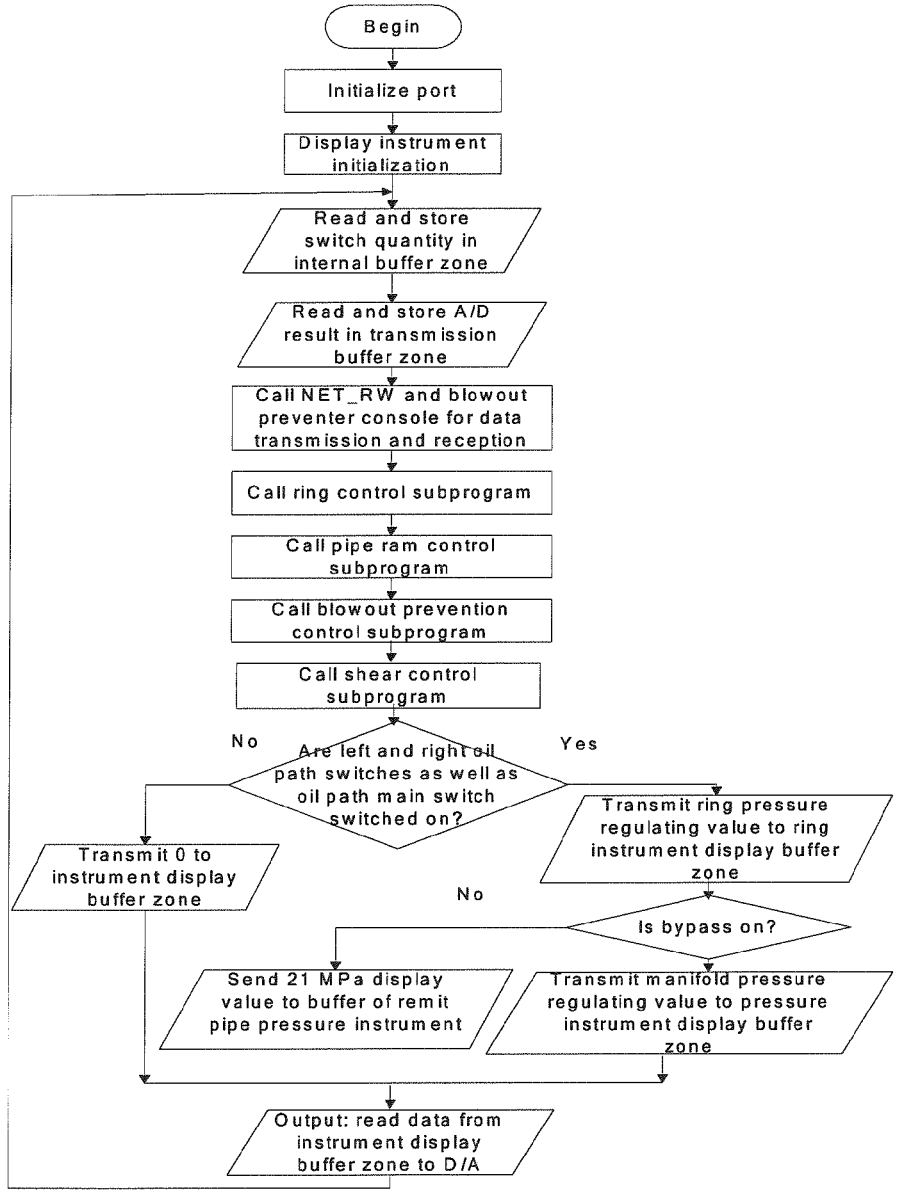
FIG. 21 is a control flow chart of the remote console.

FIG. 21 is a control flow chart of the remote console. Its working flow is approximately as follows. When the control program is initiated, the port Port1 of the PLC is initialized by the initialization port to realize point-to-point communication with the blowout preventer, and simultaneously, instrument initialization is displayed. Switch quantity is read and stored in an internal buffer zone for subsequent processing. The A/D result is then read and stored in the transmission buffer zone. NET_RW and the blowout preventer console are called for data transmission and reception. Ring, pipe ram, blowout prevention and shear control subprograms are called. The rotation of the stepping motor is controlled according to the operation of a blowout preventer handle in order to switch on the control oil path of the blowout preventer, so that the blowout preventer is controlled to be on or off. If the left and right oil path switches and the oil path main switch are switched on. A ring pressure regulating value is transmitted to a ring instrument display buffer zone. If a bypass is selected to be on, a manifold pressure regulating value is transmitted to a manifold pressure instrument display buffer zone. Otherwise, a 21 MPa display value is transmitted to the instrument display buffer zone. If the left and right oil path switches and the oil path main switch are not switched on, 0 value is transmitted to the instrument display buffer zone. Then, data are read from the instrument display buffer zone to the D/A. Finally, return is performed to read and store the switch quantity in the internal buffer zone, and the above steps are cycled.

Figure 22:
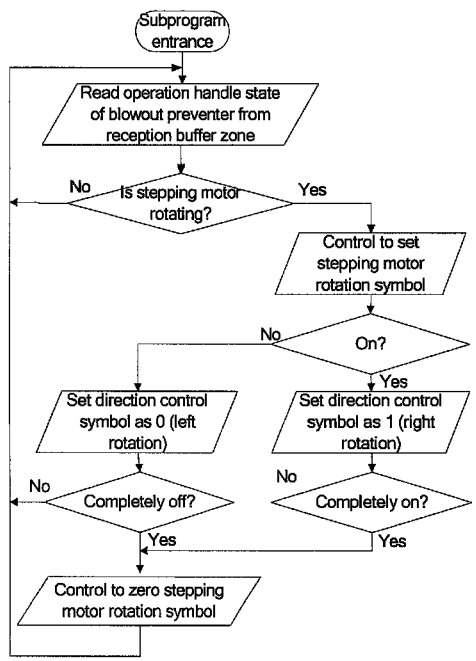
FIG. 22 is a flow chart of the remote console control subprogram.

FIG. 22 is a flow chart of the remote console control subprogram. Its working flow is approximately as follows. The sub-program begins running to read the state of the blowout preventer operation handle from the reception buffer zone in order to judge whether the blowout preventer operation handle operates. The stepping motor rotates only if the blowout preventer operation handle operates. If the stepping motor does not rotate, the beginning state is returned. Otherwise, the stepping motor rotation symbol is controlled to be set. The rotation direction of the stepping motor is selected based upon ON or OFF. In the case of ON, the direction control symbol is set as 0 (indicating left rotation). In the case of complete OFF, the stepping motor rotation symbol is controlled to be zeroed. Then, the beginning state is returned, and in the case of incomplete OFF, return is also performed. In the case of OFF, the direction control symbol is set as 1 (indicating right rotation). In the case of complete on, the stepping motor rotation symbol is controlled to be zeroed. Then, the beginning state is returned. In the case of incomplete ON, return is also performed, and the above steps are cycled.

Figure 8:
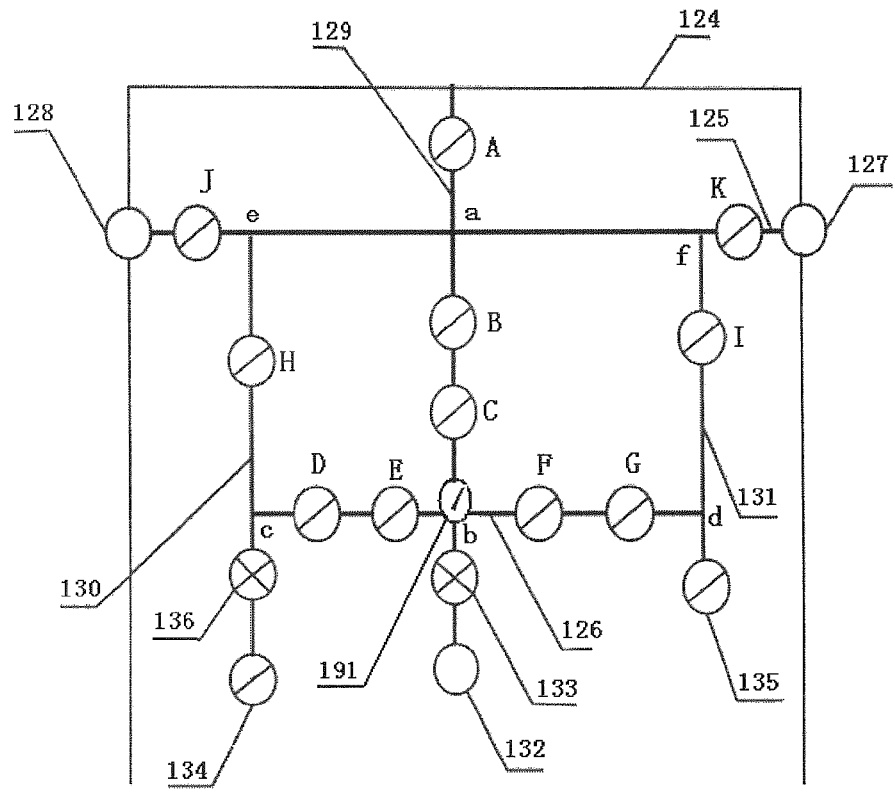
FIG. 8 is a structural schematic diagram of the choke manifold.

As shown in FIG. 8, the choke manifold 101 comprises a choke tube and a valve installed on the choke tube. The choke tube is installed on a choke manifold frame 124 and is featured by vertical and crossed distribution of transverse tubes and vertical tubes. A plurality of flat valves is arranged on the transverse tubes and the vertical tubes. The transverse tubes comprise a choke manifold upper transverse tube 125 and a choke manifold lower transverse tube 126. The two ends of the choke manifold upper transverse tube 125 are fixedly connected to the choke manifold frame 124. One end of the choke manifold upper transverse tube 125 is provided with a separator outlet 127 while the other end thereof is provided with a backup outlet 128. The vertical tubs comprise an overflow inlet tube 129, a hydraulic choke tube 130 and a manual choke tube 131. The lower ends of the overflow inlet tube 129, the hydraulic choke tube 130 and the manual choke tube 131 are provided with an overflow inlet 132, a hydraulic choke valve 134 and a manual choke valve 135 respectively. The upper end of the overflow inlet tube 129 is fixedly connected to the choke manifold frame 124.

In which, the overflow inlet tube 129 is connected with the choke manifold upper transverse tube 125 and with the choke manifold lower transverse tube 126 respectively in a crosswise manner to form a crossing point a and a crossing point b. The flat valve A is installed on the overflow inlet tube 129 at the upper part of the crossing point a. The flat valve b and the flat valve c are sequentially installed on the overflow inlet tube 129 between the crossing point a and the crossing point b. The pressure gauge 191 is arranged at the crossing point b. A blowout preventer valve on/off indicator 133 is installed on the overflow inlet tube 129 at the lower part of the crossing point b. The two ends of the choke manifold lower transverse tube 126 are fixedly connected to the hydraulic choke tube 130 and the manual choke tube 131 respectively to form a nodal point c and a nodal point d. The flat valve D and the flat valve E are installed on the choke manifold lower transverse tube 126 between the crossing point b and the crossing point c. The flat valve F and the flat valve G are installed on the choke manifold lower transverse tube 126 between the crossing point b and the crossing point d. The upper ends of the hydraulic choke tube 130 and the manual choke tube 131 are connected with the choke manifold upper transverse tube 125 respectively to form a nodal point e and a nodal point f. The flat valve H is installed on the hydraulic choke tube 130 between the nodal point c and the nodal point e. A hydraulic indicator 136 is installed on the manual choke tube 131 at the lower part of the nodal point c. The end part of the manual choke tube is provided with the hydraulic choke valve 134. The flat valve I is installed on the manual choke tube 131 between the nodal point d and the nodal point f. The manual choke valve 135 is arranged at the end part of the manual choke tube 131 at the lower part of the nodal point d. The flat valve J is arranged on the choke manifold upper transverse tube 125 between the nodal point e and the backup outlet 128.

The flat valve K is arranged on the choke manifold upper transverse tube 125 between the nodal point f and the separator outlet 127.

Figure 23:
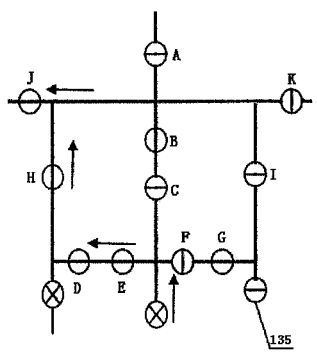
FIG. 23 is a schematic diagram of on/off state of the flat valves under the hydraulic mode of the choke manifold.

The working principle of the choke manifold is as follows. When all the operations begin, the choke manifold is set to be in a half-on state. On the choke console, if the hydraulic choke mode is selected: as shown in FIG. 23, the flat valves D, E, H, G, B and J are opened. The needle valve, the flat valves F, C, I, A and K, and the manual choke valve 12 are closed.

Figure 24:
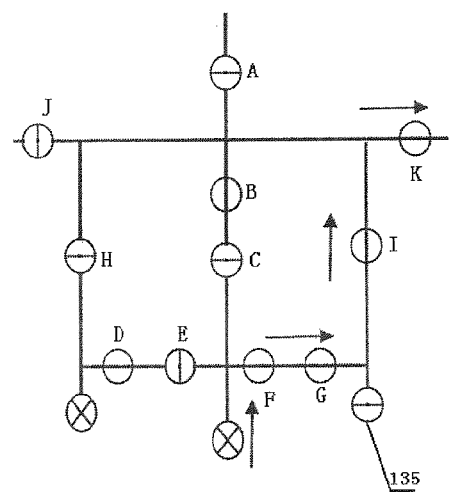
FIG. 24 is a schematic diagram of on/off state of the flat valves under the manual mode of the choke manifold.

On the choke console, if the manual choke mode is selected: as shown in FIG. 24, the flat valves F, G, I, K, B and D, and the manual choke valve 12 are opened, and that the flat valves E, H, C, A and J are closed.

Figure 9:
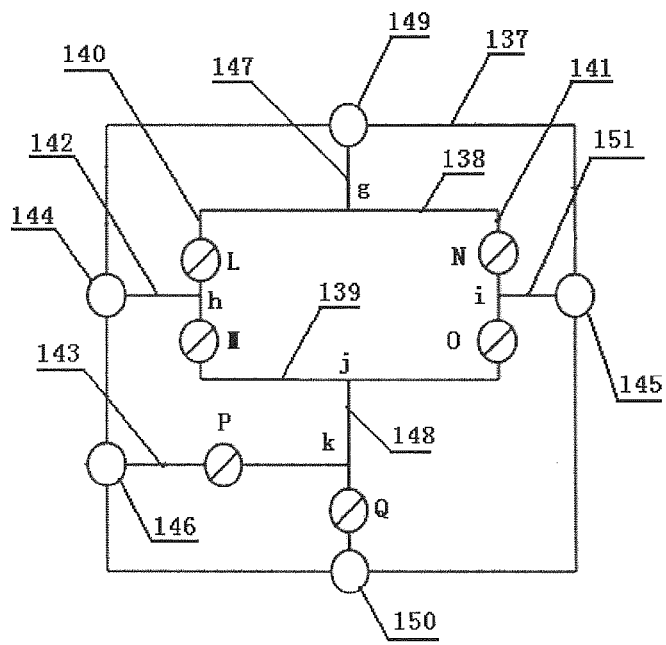
FIG. 9 is a structural schematic diagram of the high pressure manifold.

As shown in FIG. 9, the high pressure manifold 102 comprises a high pressure tube and a valve installed on the high pressure valve. The high pressure tube is installed on a high pressure manifold frame 137 and is featured by vertical connection and distribution of transverse tubes and vertical tubes. A high pressure manifold upper transverse tube 138, a high pressure manifold lower transverse tube 139, a left vertical tube 140, and a right vertical tube 141 are jointed at the middle of the high pressure tube to form a rectangle. A plurality of flat valves is arranged on the transverse tubes and the vertical tubes. The transverse tubes further comprise a left mud inlet tube 142, a right mud inlet tube 143 and a grouting outlet tube 143. The left end of the left mud inlet tube 142 is fixedly connected to the high pressure manifold frame 137. The left end part of the left mud inlet tube 142 is provided with a mud inlet I 144. The right end of the right mud inlet tube 151 is fixedly connected to the high pressure manifold frame 137. The right end part of the right mud inlet tube 151 is provided with a mud inlet II 145. The left end of the grouting outlet tube 143 is fixedly connected to the high pressure manifold frame 137. The left end part of the grouting outlet tube 143 is provided with a grouting outlet 146. The vertical tubes further comprise an upper vertical tube 147, and a lower vertical tube 148. The upper end of the upper vertical tube 147 is fixedly connected to the high pressure manifold frame 137. The upper end part of the upper vertical tube 147 is provided with a backup inlet 149. The lower end of the lower vertical tube 148 is fixedly connected to the high pressure manifold frame 137. The lower end part of the lower vertical tube 148 is provided with a vertical tube outlet 150.

In which, the left mud inlet tube 142 and the right mud inlet tube 151 of the high pressure manifold 102 are in T-shaped connection with the rectangular left vertical tube 140 and the rectangular right vertical tube 141 respectively to form a nodal point h and a nodal point i. The flat valve L is installed on the left vertical tube 140 at the upper part of the nodal point h. The flat valve M is installed on the left vertical tube 140 at the lower part of the nodal point h. The flat valve N is installed on the right vertical tube 141 at the upper part of the nodal point i. The flat valve O is installed on the right vertical tube 141 at the lower part of the nodal point i. The upper vertical tube 147 and the lower vertical tube 148 are in T-shaped connection with the rectangular high pressure manifold upper transverse tube 138 and the rectangular high pressure manifold lower transverse tube 139 respectively to form a nodal point g and a nodal point j. The grouting outlet tube 143 is in T-shaped connection with the lower vertical tube 148 to form a nodal point k. The flat valve P is installed on the grouting outlet tube 143. The flat valve Q is installed on the lower vertical tube 148 at the lower part of the nodal point k.

Figure 25:
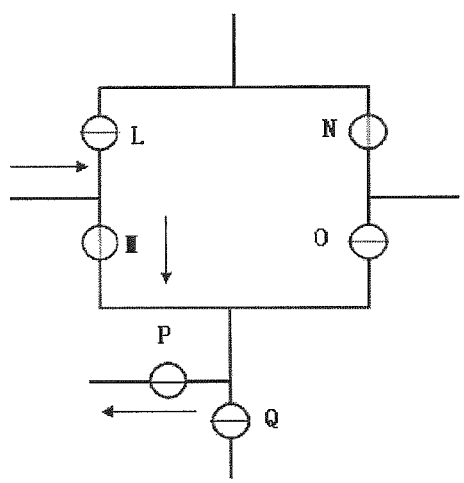
FIG. 25 is a schematic diagram of on/off state of the flat valves under the grouting mode in the case that No. 1 pump is selected by the high pressure manifold.
Figure 26:
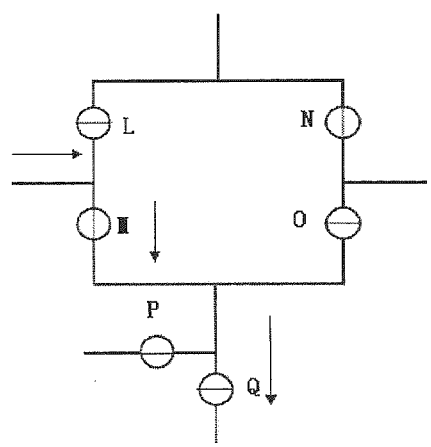
FIG. 26 is a schematic diagram of on/off state of the flat valves under the circulating mode in the case that No. 1 pump is selected by the high pressure manifold.

The working principle of the high pressure manifold is as follows. When all the operations begin, the high pressure manifold is set to be in a corrective grouting or circulating state. On the choke console, if the No. 1 pump is selected, the state is set as the grouting state, wherein as shown in FIG. 25, the flat valves M, P and N are opened and the flat valves L, O and Q are closed. The state is set as the circulating state, wherein as shown in FIG. 26, the flat valves M, Q and N are opened and the flat valves L, O and P are closed.

Figure 27:
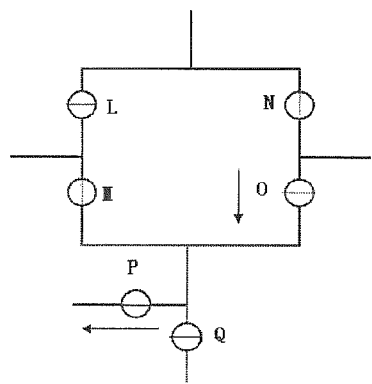
FIG. 27 is a schematic diagram of on/off state of the flat valves under the grouting mode in the case that No. 2 pump is selected by the high pressure manifold.
Figure 28:
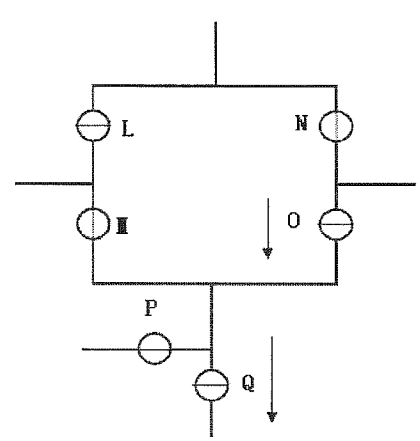
FIG. 28 is a schematic diagram of on/off state of the flat valves under the circulating mode in the case that No. 2 pump is selected by the high pressure manifold.

On the choke console, if the No. 2 pump is selected, the state is set as the grouting state, wherein as shown in FIG. 27, the flat valves O, P and L are opened and the flat valves M, N and Q are closed. The state is set as the circulating state, wherein as shown in FIG. 28, the flat valves O, Q and L are opened and the flat valves M, N and P are closed.

Figure 29:
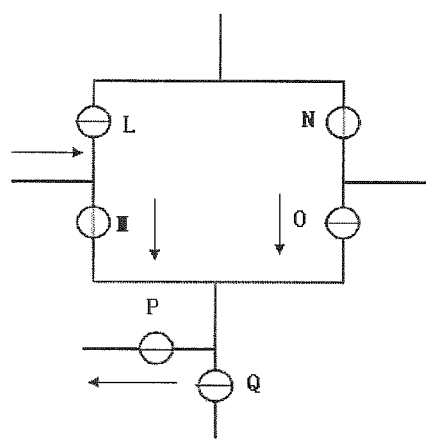
FIG. 29 is a schematic diagram of on/off state of the flat valves under the grouting mode in the case that dual pumps are selected by the high pressure manifold.
Figure 30:
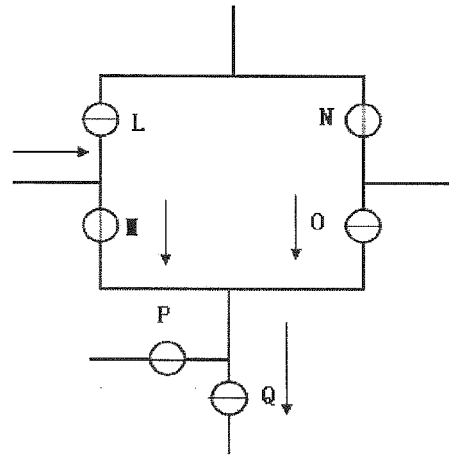
FIG. 30 is a schematic diagram of on/off state of the flat valves under the circulating mode in the case that dual pumps are selected by the high pressure manifold.

On the choke console, if the dual pumps are selected, the state is set as the grouting state, wherein as shown in FIG. 29, the flat valves M, O and P are opened and the flat valves L, N and Q are closed. The state is set as the circulating state, wherein as shown in FIG. 30, the flat valves M, O and Q are opened and the flat valves L, N and P are closed.

Figure 10:
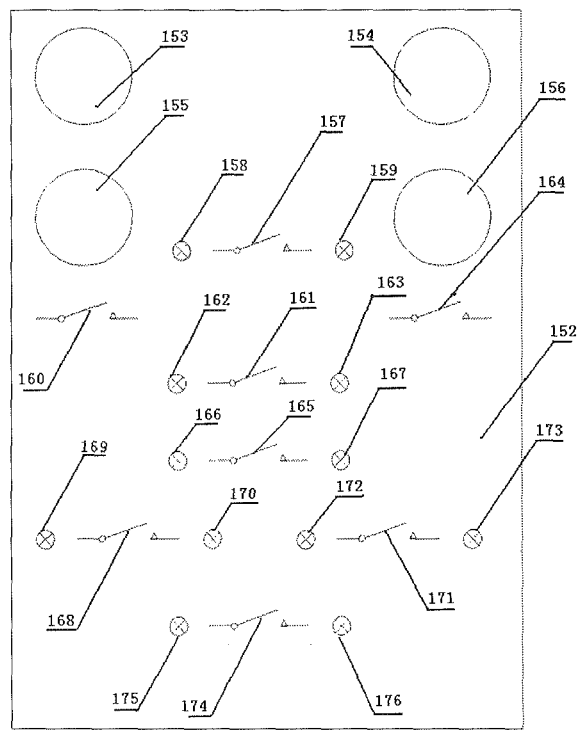
FIG. 10 is a structural schematic diagram of the blowout preventer control panel.
Figure 11:
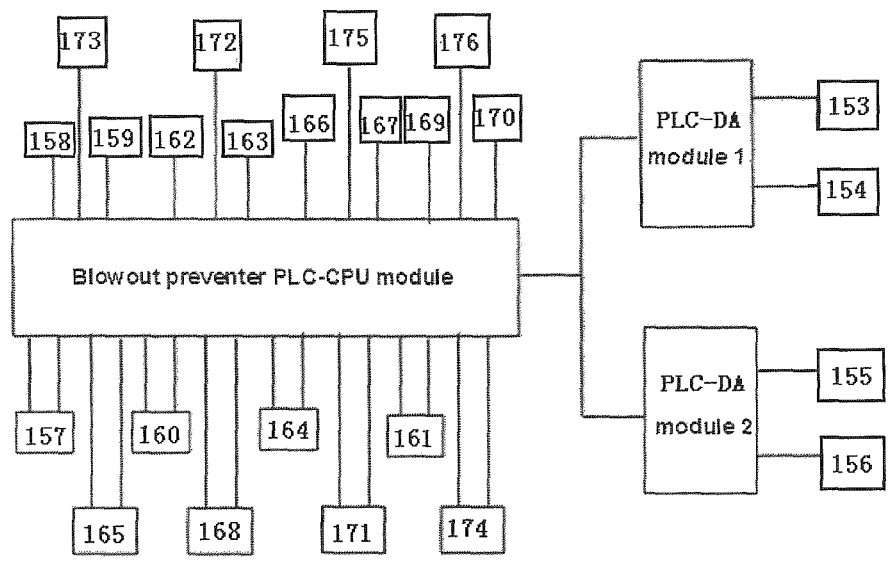
FIG. 11 is a diagram of the connection relationship between the internal control plate of the blowout preventer console and major components on the control panel.

As shown in FIG. 10, the blowout preventer console 103 is characterized by comprising a chassis and an internal control plate. The front face of the chassis is provided with a blowout preventer control panel 152. The blowout preventer control panel 152 is provided with an accumulator pressure gauge 153, a ring blowout preventer oil pressure gauge 154, a gas source pressure gauge 155, a manifold pressure gauge 156, a ring ram switch 157, a ring ram on indicator 158, a ring ram off indicator 159, a gas source switch 160, a bypass ram switch 164, an upper pipe ram switch 161, an upper pipe ram on indicator 162, an upper pipe ram off indicator 163, a blind ram switch 165, a blind ram on indicator 166, a blind ram off indicator 167, a kill manifold ram switch 168, a kill manifold on indicator 169, a kill manifold off indicator 170, a blowout preventer valve switch 171, a blowout preventer valve off indicator 172, a blowout preventer valve on indicator 173, a lower pipe ram switch 174, a lower pipe ram on indicator 175, and a lower pipe ram off indicator 176. The internal control plate comprises a blowout preventer programmable logic controller PLC. A CPU module of the blowout preventer programmable logic controller PLC is connected with the accumulator pressure gauge 153 and the ring blowout preventer oil pressure gauge 154 via the DA module 1 respectively and connected with the gas source pressure gauge 155, and the manifold pressure gauge 156 via the DA module 2 respectively. The CPU module of the blowout preventer programmable logic controller PLC is further connected with the ring ram switch 157, the gas source switch 160, the bypass ram switch 164, the upper pipe ram switch 161, the blind ram switch 165, the kill manifold ram switch 168, the blowout preventer valve switch 171, and the lower pipe ram switch 174 respectively via the switch quantity input port thereof. The CPU module of the blowout preventer programmable logic controller PLC is further connected with the ring ram on indicator 158, the ring ram off indicator 159, the upper pipe ram on indicator 162, the upper pipe ram off indicator 163, the blind ram on indicator 166, the blind ram off indicator 167, the kill manifold on indicator 169, the kill manifold off indicator 170, the blowout preventer valve off indicator 172, the blowout preventer valve on indicator 173, the lower pipe ram on indicator 175, and the lower pipe ram off indicator 176 respectively via the switch quantity output port thereof. The CPU module of the blowout preventer programmable logic controller PLC is further connected, via the switch quantity input port thereof, with the flat valves L, M, N, O, P and Q installed on the high pressure tube in the high pressure manifold respectively.

Figure 31:
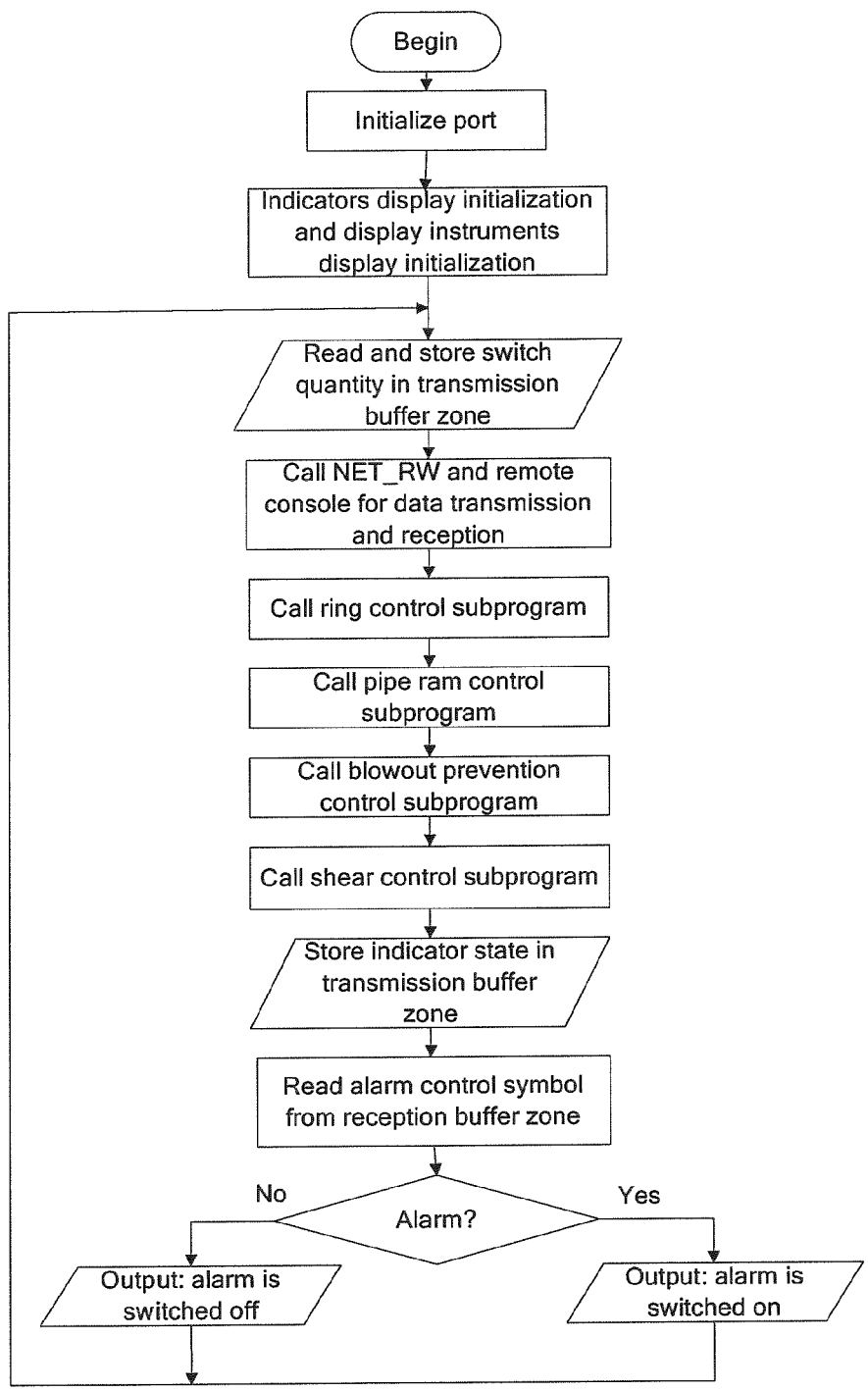
FIG. 31 is a control flow chart of the blowout preventer.

FIG. 31 is a control flow chart of the blowout preventer. Its working flow is approximately as follows. When the control program is initiated, the port Port1 of the PLC is initialized by the initialization port to realize point-to-point communication with the remote console, and simultaneously, initialization is displayed by both indicators and the display instruments. Switch quantity is read and stored in the internal buffer zone for being directly read by PC. The NET_RW and the remote console are called for data transmission and reception. Ring, pipe ram, blowout prevention and shear control subprograms are called to control the indicators according to the blowout preventer operation handle and the on/off time in order to display whether the blowout preventers are completely opened/closed. Afterwards, the state of the indicator (for indicating ON/OFF state of the blowout preventer) is stored in the transmission buffer zone. Then, an alarm control standard is read from the reception buffer zone. Alarm is switched on in the case of choosing to alarm and alarm is switched off in the case of choosing to not alarm. Finally, the step of reading and storing the switch quantity in the transmission buffer zone is returned, and the above steps are cycled.

Figure 32:
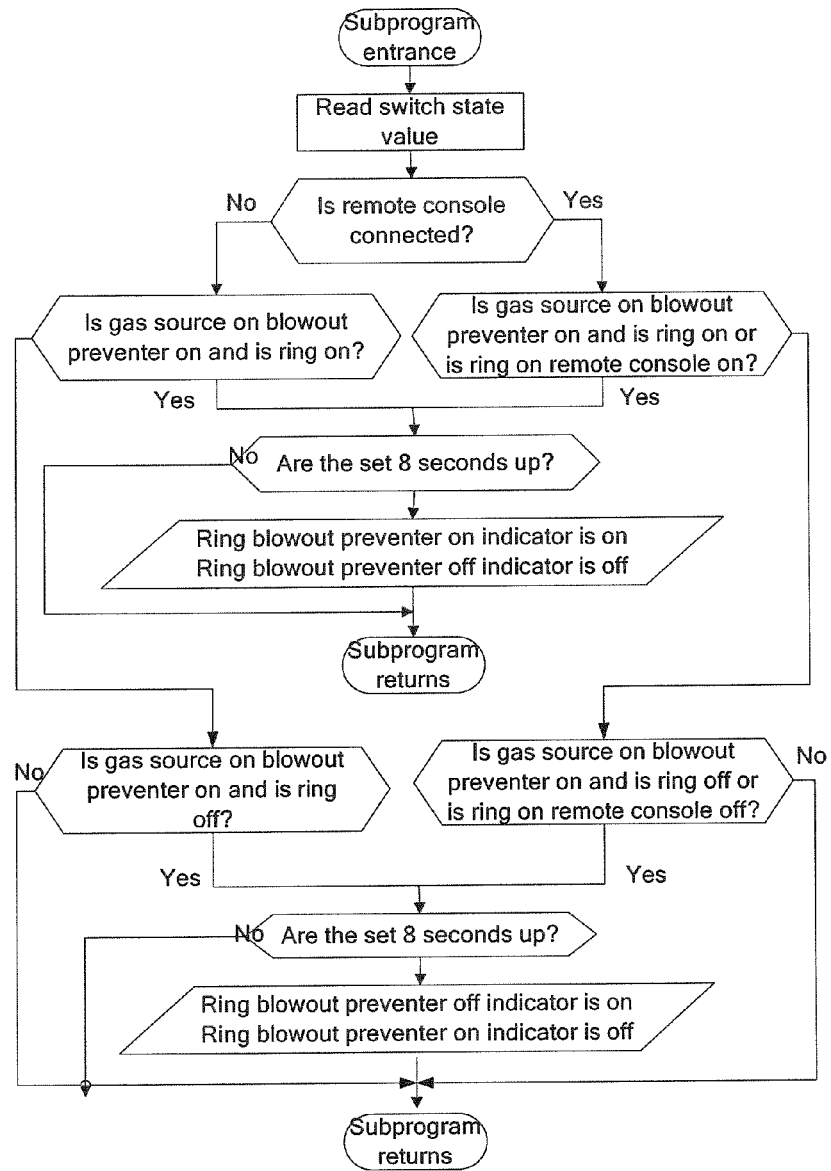
FIG. 32 is a flow chart of the blowout preventer control subprogram.
Figure 33:
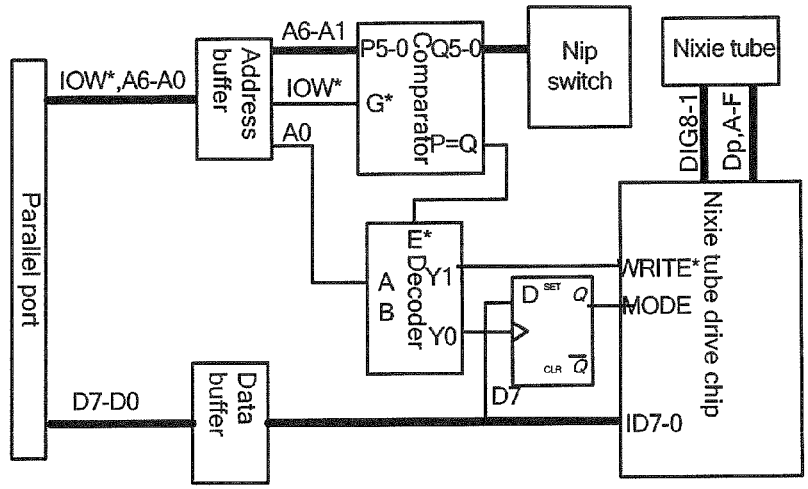
FIG. 33 is a schematic constitution diagram of the pump stroke display in the choke.

FIG. 32 is a flow chart of the ring blowout preventer control sub-program. Its working flow is approximately as follows. The sub-program begins running. The ON/OFF states including the operation handle state of the blowout preventer and the operation handle state of the remote console are read. In the case that the remote console is connected, if the gas source on the blowout preventer is chosen to be ON and the ring is ON or the ring on the remote console is ON, the time is set to be 8 seconds. The indicator is ON if the ring blowout preventer is on. The indicator is OFF if the ring blowout preventer is OFF. Then, the sub-program is returned. Otherwise, the sub-program is returned. If the gas source on the blowout preventer is chosen to be ON and the ring is OFF or the ring ON the remote console is OFF, the time is set to be 8 seconds. The indicator is ON if the ring blowout preventer is OFF. The indicator is OFF if the ring blowout preventer is ON. Then, the sub-program is returned. Otherwise, the sub-program is returned. In the case that no remote console is connected, if the gas source on the blowout preventer is ON and the ring is ON, the time is set to be 8 seconds. The indicator is ON if the ring blowout preventer is ON. The indicator is OFF if the ring blowout preventer is OFF, and then the sub-program is returned. If the time is not set to be 8 seconds, the sub-program is still returned. If the gas source on the blowout preventer is ON and the ring is OFF, the time is set to be 8 seconds. The indicator is ON if the ring blowout preventer is OFF. The indicator is OFF if the ring blowout preventer is ON. Then, sub-program is returned, or otherwise, the subprogram is returned.

Figure 12:
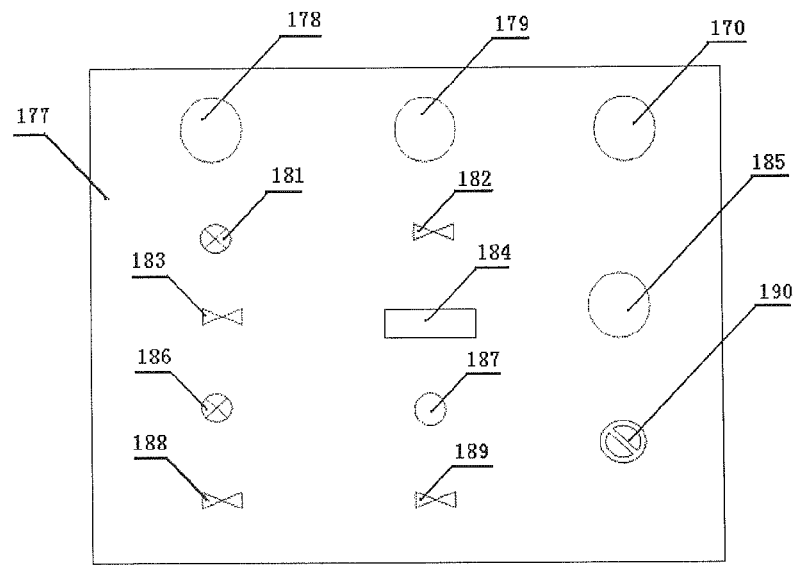
FIG. 12 is a structural schematic diagram of the choke control panel.
Figure 13:
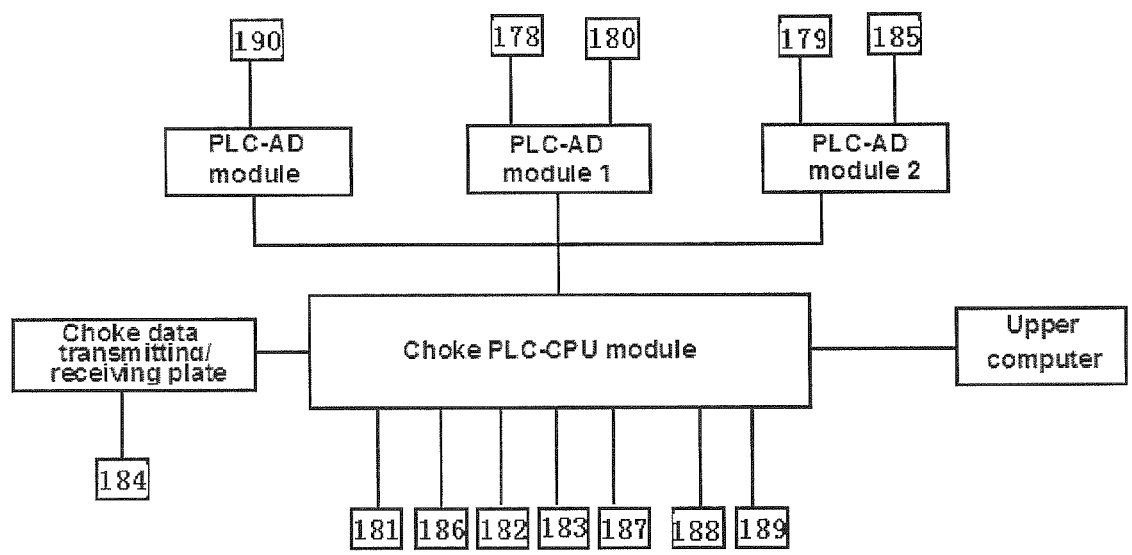
FIG. 13 is a diagram of the connection relationship between the internal control plate of the choke and major components on the control panel.

As shown in FIG. 12, the choke console 104 comprises a chassis and an internal control plate. The front face of the chassis is provided with a choke control panel 177. The choke control panel 177 is provided with a vertical tube pressure gauge 178, a pump speed gauge 179, a sleeve pressure gauge 180, a hydraulic choke valve selection indicator 181, a dual-pump selection switch 182, a choke valve selection switch 183, a pump stroke display 184, a choke valve opening gauge 185, a manual choke valve selection indicator 186, a reset button 187, a driller gas source switch 188, a choke control valve switch 189, and a choke valve speed adjusting knob 190. The internal control plate comprises a choke programmable logic controller PLC. A CPU module of the choke programmable logic controller PLC is connected with the choke valve speed adjusting knob 190 via the AD module. The CPU module of the choke programmable logic controller PLC is also connected with the vertical tube pressure gauge 178 and the sleeve pressure gauge 180 via the DA module 1. The CPU module of the choke programmable logic controller PLC is further connected with the pump speed gauge 179 and the choke valve opening gauge 185 via the DA module 2, and connected with a choke data transmitting/receiving plate via a serial port. The choke data transmitting/receiving plate is connected with a pump stroke display 184 via a parallel port. The CPU module of the choke programmable logic controller PLC is further connected with the hydraulic choke valve selection indicator 181 and the manual choke valve selection indicator 186 via the switch quantity output port thereof respectively, and connected with the dual-pump selection switch 182, the choke valve selection switch 183, the reset button 187, the driller gas source switch 188 and the choke control valve switch 189 via the switch quantity input port thereof respectively. The CPU module of the choke programmable logic controller PLC is further connected, via the switch quantity input port thereof, with the flat valves A, B, C, D, E, F, G, H, I, J and K installed on the choke tube in the choke manifold respectively. The CPU module of the choke programmable logic controller PLC is further connected with the manual choke valve 135 in the choke manifold via the AD module and with a pressure gauge 191 via the DA module 1.

Figure 36:
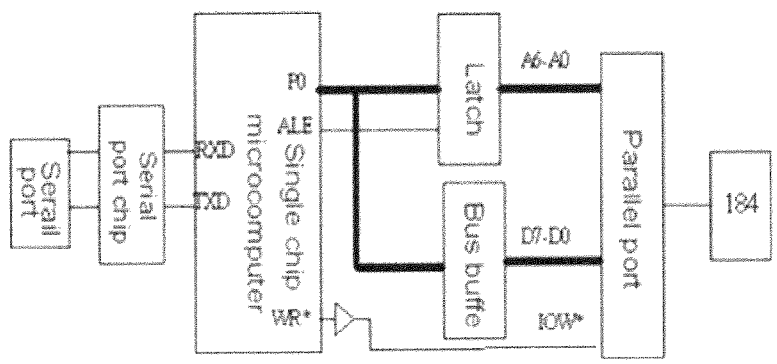
FIG. 36 is a schematic constitution diagram of the choke data transmitting/receiving plate.

As shown in FIG. 36, the choke data transmitting/receiving plate comprises a serial port chip, a single chip microcomputer, a latch and a bus buffer. The input end of the serial port chip is connected with the serial port of the choke programmable logic controller PLC via the serial port. The output end of the serial port chip is connected with the transmitting data line and the receiving data line of the single chip microcomputer respectively. The single chip microcomputer is further connected with the latch and the bus buffer via buses respectively. The output ports of the latch and the bus buffer are connected with the pump stroke display 184 via the parallel ports. The pump stroke display 184 comprises an address buffer, a data buffer, a comparator, a decoder, a dip switch, a nixie tube drive chip, and a nixie tube. The input ports of the address buffer and the data buffer are both connected with the parallel port. The output port of the data buffer is connected with the nixie tube drive chip. The output port of the address buffer is connected with one input end of the comparator and the decoder respectively. The other input end of the comparator is connected with the dip switch. The output port is connected with the enabling end of the decoder. The output end of the decoder is connected with the nixie tube drive chip. The output end of the nixie tube drive chip is connected with the nixie tube.

Figure 34:
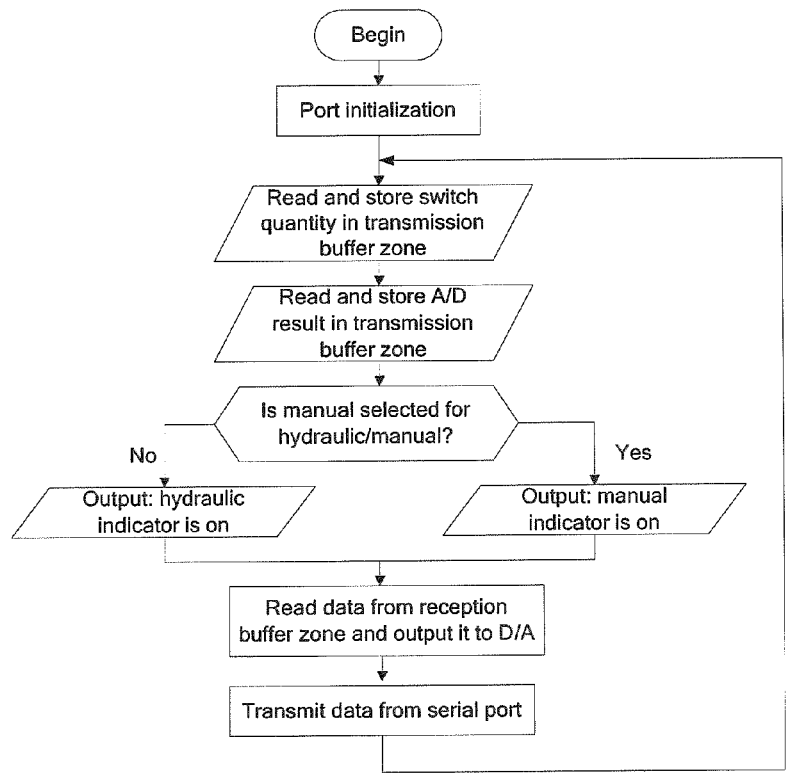
FIG. 34 is a flow chart of the choke control program.

FIG. 34 is a flow chart of the choke control program. Its working flow is approximately as follows. When the control program is initiated, the port Port1 of the PLC is initialized by the initialization port to realize data communication with the LED display control plate. Then, switch quantities (including switch quantity inputs of the dual-pump selection switch, the choke valve selection switch, the reset switch, the driller gas source switch and the choke valve control switch) are read and stored in the transmission buffer zone for being directly read by PC communication. The A/D result I is then read and stored in the transmission buffer zone for being directly read by PC communication. Whether a hydraulic mode or a manual mode is selected is judged, wherein if the hydraulic mode is selected, the hydraulic indicator is turned on, and if the manual mode is selected, the manual indicator is turned on. Afterwards, data are read from the reception buffer zone and output to the D/A in order to control the display of instruments for displaying vertical tube pressure, sleeve pressure, pumps speed and chokes speed. The data are then transmitted to the LED display control plate via the serial port. The switch quantities are read again and stored in the transmission buffer zone, and the above steps are cycled. In addition, the entire system is a bus-type network including one PC serving as a master station and a plurality of PLCs serving as a slave station. Every communication is initiated by the master station, the slave station monitors and judges whether transmission and reception requests about the slave station is present.

Figure 35:
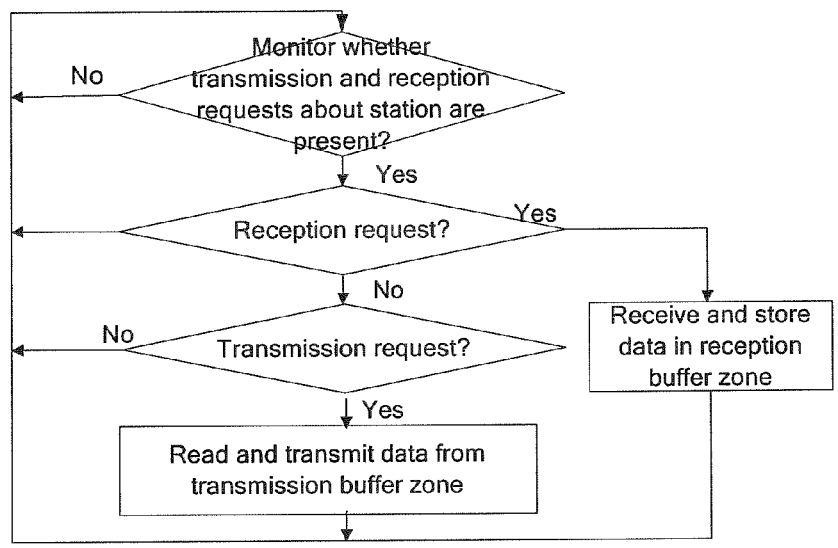
FIG. 35 is a flow chart of the communication between the choke and the PC.

FIG. 35 is a flow chart of the communication between the choke and the PC. Its working flow is approximately as follows. The master station transmits a signal, wherein if the slave station monitors the transmission and reception requests about the slave station, the slave station agrees with the reception of the requests so that the data is received and stored in the reception buffer zone. Afterwards, the slave station returns to continue monitoring, wherein if the slave station does not monitor the transmission and reception requests about the slave station and does not receive and transmit the requests, the slave station returns to monitor, and if the slave station does not receive the request, but agrees with the reception of the requests, in this case, the data are read from the transmission buffer zone and transmitted. Then, the slave station returns to monitor, and the above steps are cycled.

Figure 60:
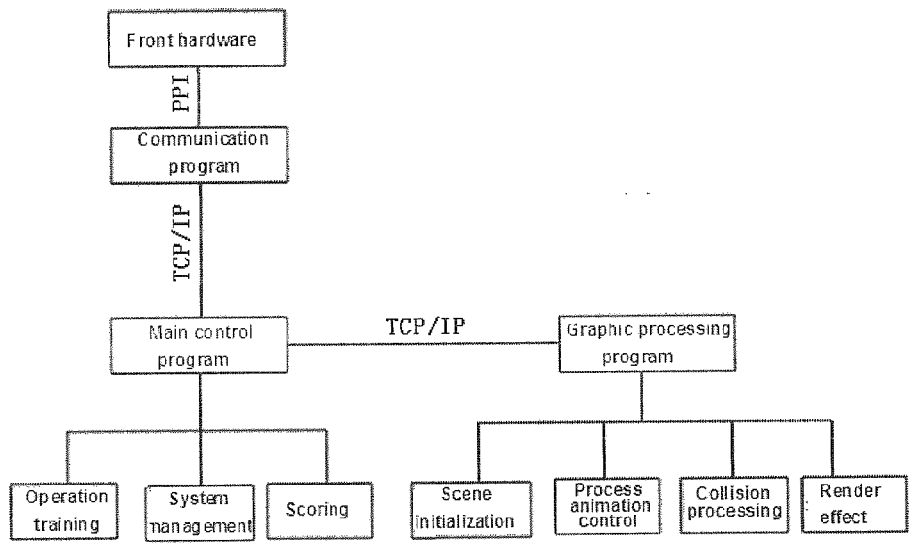
FIG. 60 is a constitution diagram of the applications of the distributed drilling simulator.

As shown in FIG. 60, the main control computer comprises one or more than one general computers as well as a communication program and a main control program running thereon. The graphic computer comprises one general computers as well as a graphic processing program running thereon. The communication program is connected with front end hardware via the PPI protocol, wherein the front end hardware comprises the blowout preventer console, the choke console, the remote console and the driller console. The main control program is connected with the communication program and the graphic processing program via the TCP/IP protocol respectively.

The main control program comprises an operation training module, a system management module and a scoring and management module. The program is communicated with front end hardware equipment via the communication program to obtain the state of the hardware equipment in real-time. The a plurality of typical drilling processes is simulated by means of relevant mathematical models to finish the following tasks. 1. A control command is sent to the graphic processing program via the TCP/IP protocol, in order to control graphic actions. 2. An intelligent scoring system is realized. 3. A signal is fed back to the front end hardware, enabling the parameter display of front end instruments to accord with onsite situation.

System management module comprises hardware self-inspection, user management and killing scheme management. It is mainly used for completing management and configuration for software system. The functions like system self-inspection and user management can be completed using this module. Meanwhile, some parameters in the system are changed so as to change the operation mode of the main control program. In this way, different demands are met.

Figure 61:
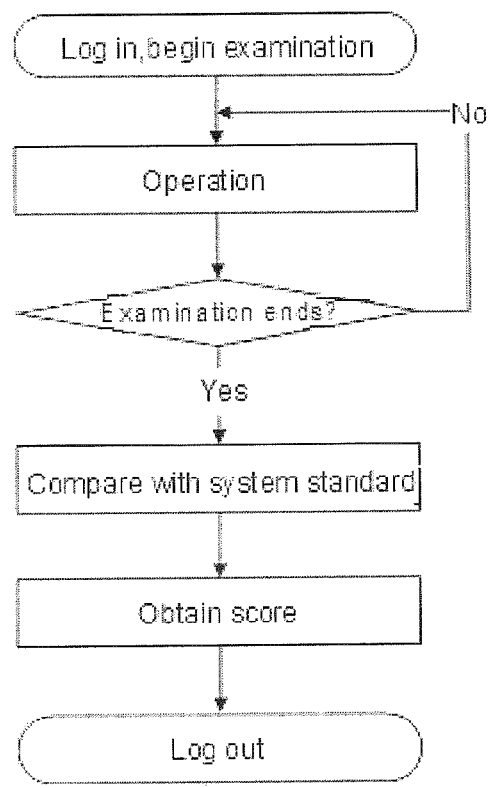
FIG. 61 is a flow chart of scoring.

The scoring module is mainly used for automatically scoring the training process and simultaneously providing perfect score management function. Scoring is related mainly to two factors: 1. Operating Flow: All the operating flow of trainees is recorded in the system, wherein the operating flow of trainee is compared with a preset operating flow in the system upon the completion of trainee examination to evaluate the accordance of the two flows and score the operating flow of trainees on this basis. 2. Operating Level: In addition to the grasp of corrective operating flow by trainees, their operating flow shall be taken into consideration in comprehensively evaluating the technical level of trainees, e.g. whether the selection for weight on bit during drilling in is appropriate and whether drilling is even. For the problem whether the control for pressure during killing meets the demand of killing constructor, the system determines the operating level score by adopting a method for recording relevant data curves in the operating flow and comparing the data curves with standard curves afterwards. As shown in FIG. 61, the scoring process is as follows: a trainee logs in the system, begins examination and completes corresponding operations. Then, the system scores automatically based upon relevant standards to obtain a final score.

The graphic processing program comprises a scene initialization module, a process animation control module, a collision processing module, and a render effect module. A vivid, virtual drilling environment is created by means of full three-dimensional animation so that trainees feel as if they were in a real drilling environment, and thus the mental resilience of trainees in accident handling is improved and better training effect is obtained. The four modules have the following functions:

Scene initialization: The current scene of every operation differs owing to the complexity of drilling process and the operability of virtual training. Before a new operation begins, the graphic program initializes the current scene after receiving an operation command sent from the control computer, for example the current number, state and position of operating components on a drilling platform.

Process animation control: In the process of completing the specified process operation, every action from drilling console is converted into a digital signal, wherein the digital signal is transmitted to the main control computer, the protocol data are then sent to the graphic program by the main control computer, and the graphic program gives a specific response after the acquisition of parameters. Motion parameters, specific motions and view selection (including aboveground visual angle, underground visual angle, blowout preventer visual angle, multi-view display, etc.) of various control systems on drilling platform are reflected on a graphic machine.

Collision processing: The situation of 'wall through' is not allowed in the motion simulation process of three-dimensional graphics. Therefore, collision detection shall be performed on motion objects. To cause model motion to be realistic, a drilling simulator visual simulating system certainly includes collision detecting and processing parts.

Render effect: Simulation for flame, bubble, liquid jetting effects is realized, wherein movie-level illumination effect is accomplished using GLSL, and illumination modes like daylight, night and searchlight can be simulated respectively. Thus, greatly improving graphic effect and sense of reality.

The operation training module comprises an RIH sub-module, a POOH sub-module, a drill-in sub-module, an accident and complex situation handling sub-module, a shut in sub-module, and a killing sub-module. The operation training module provides the training about 23 common technological processes and event drive processes in the drilling process. Accordingly, it is the most important module in the main control program. Event drive training has no limitation to trainees, who therefore can operate the simulator randomly. The graphic system will reflect reasonable mechanical motions and simultaneously give a voice prompt with regard to erroneous operations. The module is mainly used for cognitive training of new trainees about drilling site and drilling machinery. In technical process training, trainees are required to operate the simulator per its technical process, in order to intensify the comprehension of trainees on the technical process and make trainees master the operation process of the simulator.

Among all the sub-modules, the top driving event drive sub-module is used for operation simulation based on real top driver. The simulation includes control logic contents like internal blowout preventer, locking of rotary head, rotation of elevator links, inclination of elevator links, backup tongs, drilling well or rotary makeup or torque, reversal rotation or stoppage or positive rotation, and etc.

Figure 37:
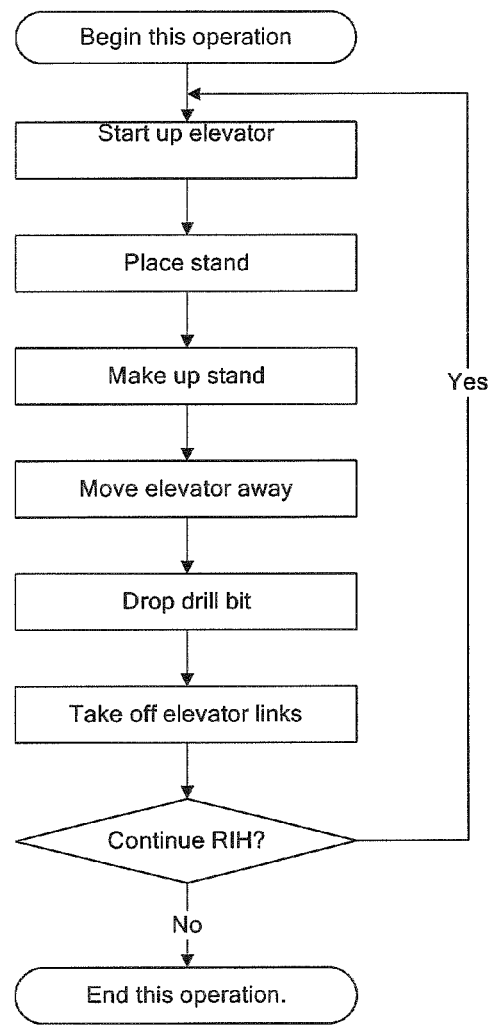
FIG. 37 is a flow chart of normal RIH.

FIG. 37 is a flow chart of normal RIH. Its working flow is approximately as follows: begin this operation, start up an elevator, then place and make up a stand, move the elevator away, drop a drill bit, take off elevator links, and judge whether RIH is performed, wherein if so, return to start up the elevator, or otherwise, end this operation.

Figure 38:
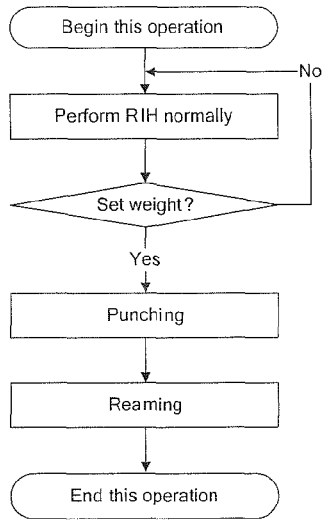
FIG. 38 is a flow chart of set weight.

FIG. 38 is a flow chart of set weight. Its working flow is approximately as follows: begin this operation, perform RIH normally, perform punching and reaming in the event of set weight, end this operation, and return if set weight does not occur.

Figure 39:
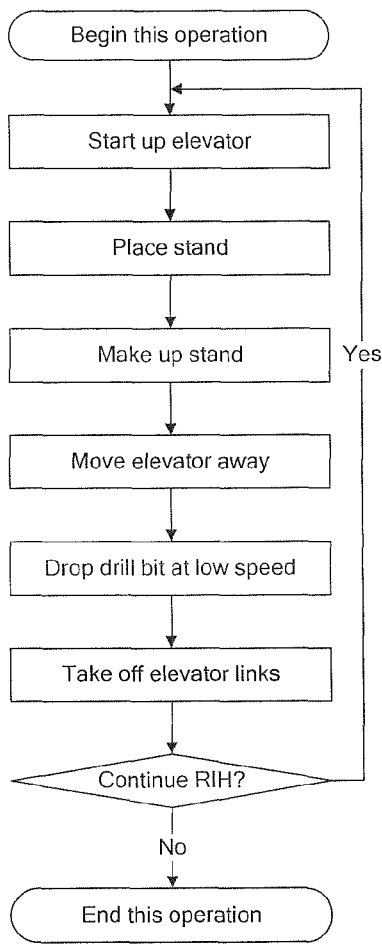
FIG. 39 is a flow chart of fluctuation pressure controlling RIH.

FIG. 39 is a flow chart of fluctuation pressure controlling RIH. Its working flow is approximately as follows: begin this operation, start up an elevator, then place and make up a stand, move the elevator away, drop a drill bit at low speed, press corresponding button to take off elevator links, and judge whether RIH is continued, wherein if so, return to begin this operation, or otherwise, end this operation.

Figure 40:
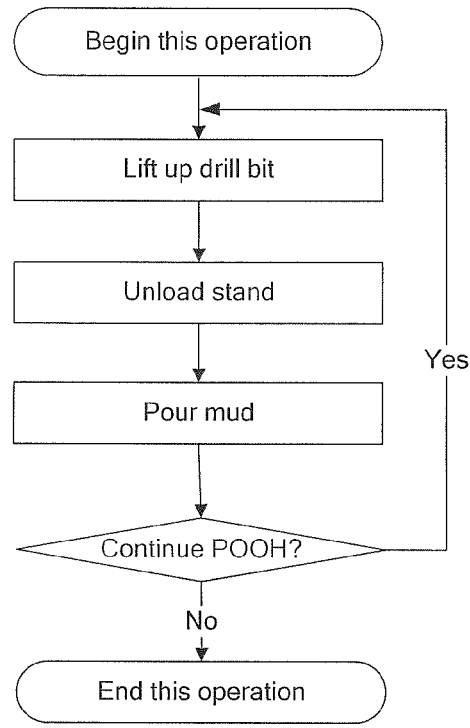
FIG. 40 is a flow chart of normal POOH.

FIG. 40 is a flow chart of normal POOH. Its working flow is approximately as follows: begin this operation, lift up a drill bit, unload a stand, pour mud, and judge whether POOH is performed, wherein if so, return to begin this operation, or otherwise, end this operation.

Figure 41:
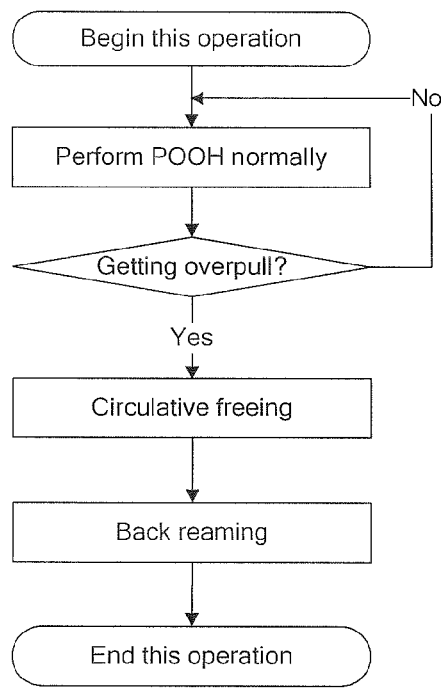
FIG. 41 is a flow chart of getting overpull.

FIG. 41 is a flow chart of getting overpull. Its working flow is approximately as follows: begin this operation, perform POOH normally, perform circulative freeing in the event of getting overpull, perform back reaming, end this operation, and return to normal POOH in the case of being unstuck.

Figure 42:
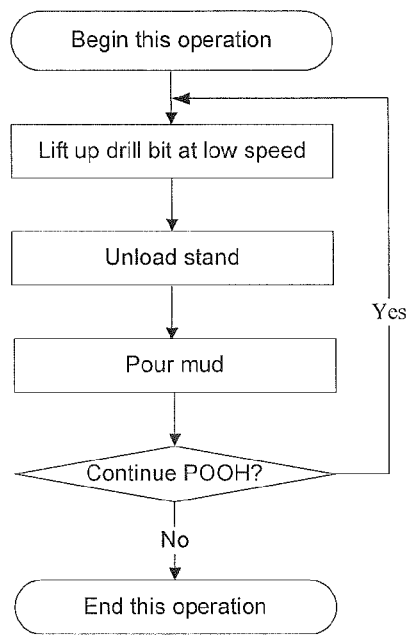
FIG. 42 is a flow chart of suction pressure controlling POOH.

FIG. 42 is a flow chart of suction pressure controlling POOH. Its working flow is approximately as follows: begin this operation, lift the drill bit at low speed, unload the stand, pour the mud, and judge whether POOH is continued, wherein if so, return to lift the drill bit at low speed, or otherwise, end this operation.

Figure 43:
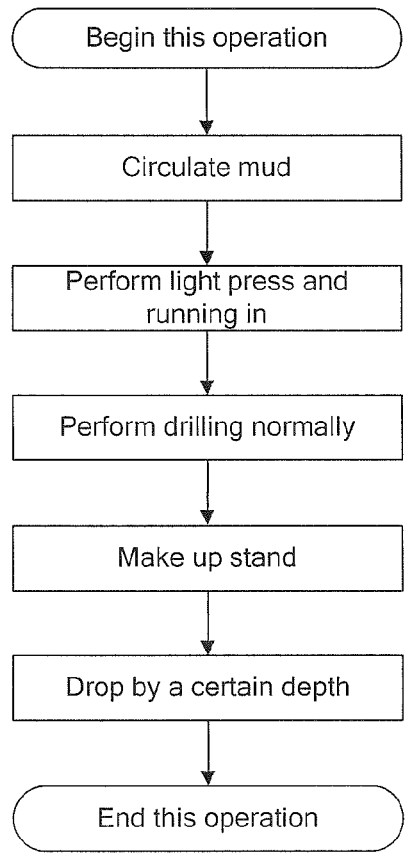
FIG. 43 is a flow chart of normal drilling and stand makeup.

FIG. 43 is a flow chart of normal drilling and stand makeup. Its working flow is approximately as follows: begin this operation, circulate mud, perform light press and running in, perform drilling normally, make up the stand, and drop by a certain depth to end this operation.

Figure 44:
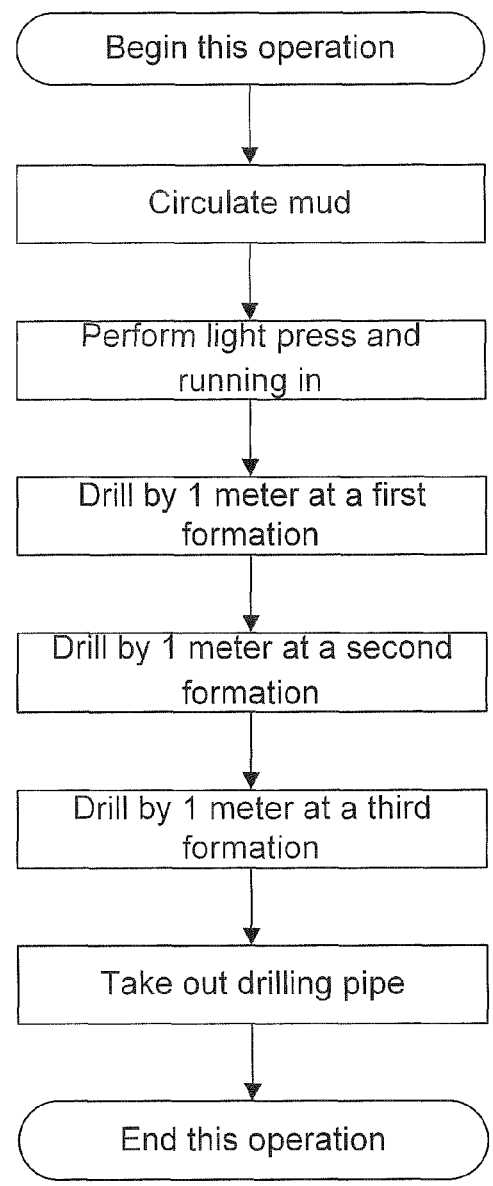
FIG. 44 is a flow chart of drilling under different formation drillabilities.

FIG. 44 is a flow chart of drilling under different formation drillabilities. Its working flow is approximately as follows: begin this operation, circulate mud, perform light press and running in, drill by 1 meter at a first formation, drill by 1 meter at a second formation, drill by 1 meter at a third formation, take out drilling pipe, and end this operation.

Figure 45:
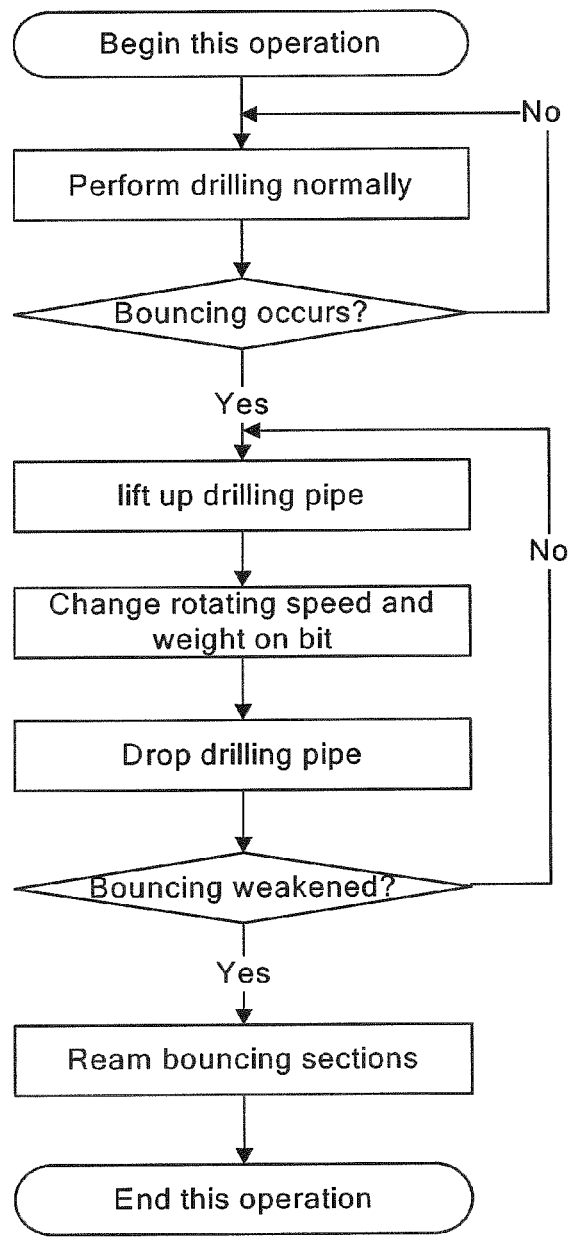
FIG. 45 is a flow chart of drilling under bouncing.

FIG. 45 is a flow chart of drilling under bouncing. Its working flow is approximately as follows: begin this operation, perform drilling normally if not bouncing occurs, lift up drilling pipe if bouncing occurs, change rotating speed and weight on bit, drop drilling pipe, judge whether bouncing is reduced, wherein return to lift up drilling pipe if bouncing is not reduced, circulate the operation until bouncing is reduced, then ream bouncing sections, and end this operation.

Figure 46:
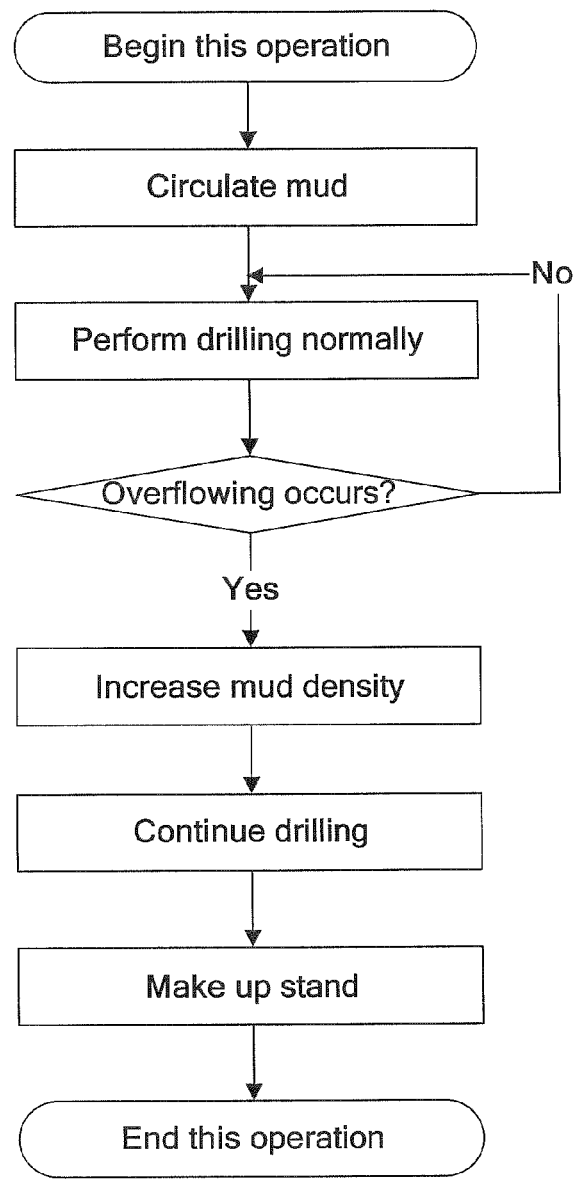
FIG. 46 is a flow chart of high-pressure formation drilling.

FIG. 46 is a flow chart of high-pressure formation drilling. Its working flow is approximately as follows: begin this operation, circulate mud, perform drilling normally, judge whether overflowing occurs, wherein perform drilling normally if not overflowing occurs, or otherwise, increase mud density, continue drilling, make up the stand, and, finally, end this operation.

Figure 47:
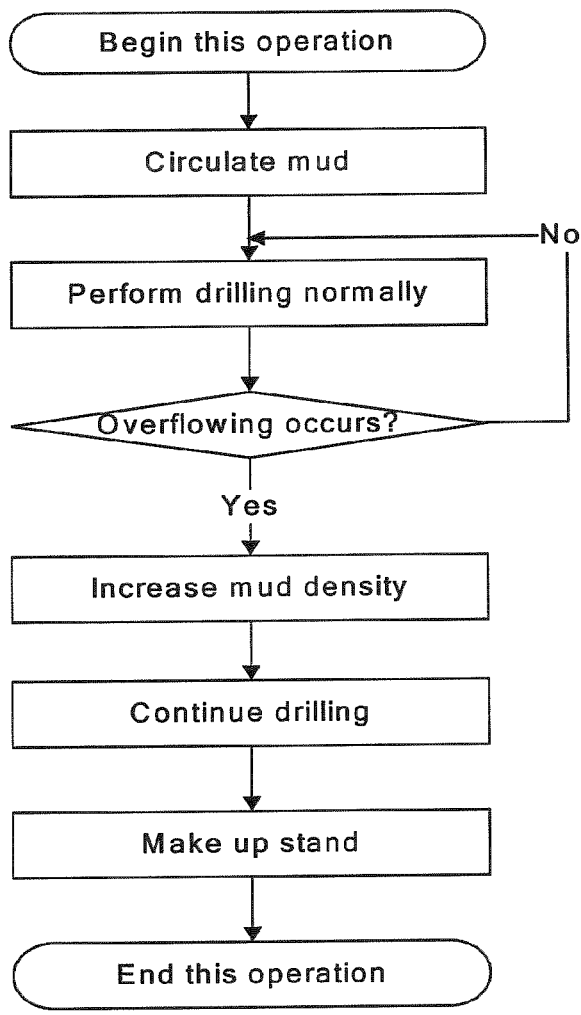
FIG. 47 is a flow chart of low-pressure formation drilling.

FIG. 47 is a flow chart of low-pressure formation drilling. Its working flow is approximately as follows: begin this operation, circulate mud, perform drilling normally, judge whether leakage occurs, perform drilling normally if not leakage occurs, otherwise, increase mud density, continue drilling, make up the stand, and, finally, end this operation.

Figure 48:
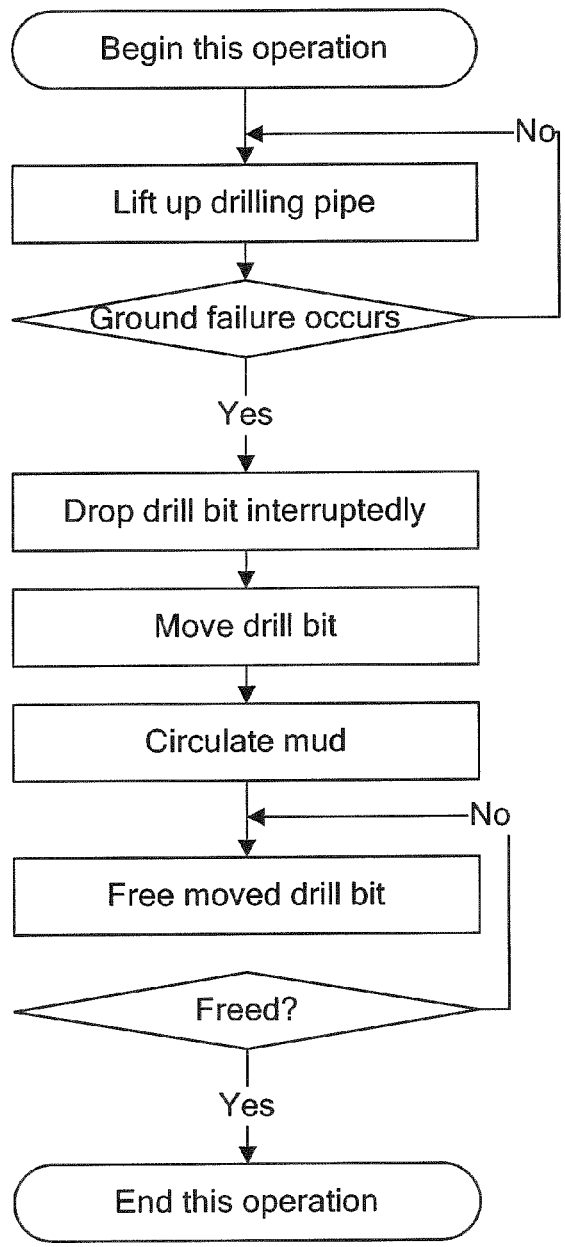
FIG. 48 is a flow chart of adhesion sticking judging and handling.

FIG. 48 is a flow chart of adhesion sticking judging and handling. Its working flow is approximately as follows: begin this operation, lift up the drilling pipe, judge whether there is a ground failure, continue lifting up the drilling pipe if there is no failure, drop the drill bit interruptedly if there is a failure, move the drill bit, circulate mud, free the moved drill bit, then judge whether the moved drill bit has been freed, wherein if not, return to continue freeing until freeing is completed, and end this operation.

Figure 49:
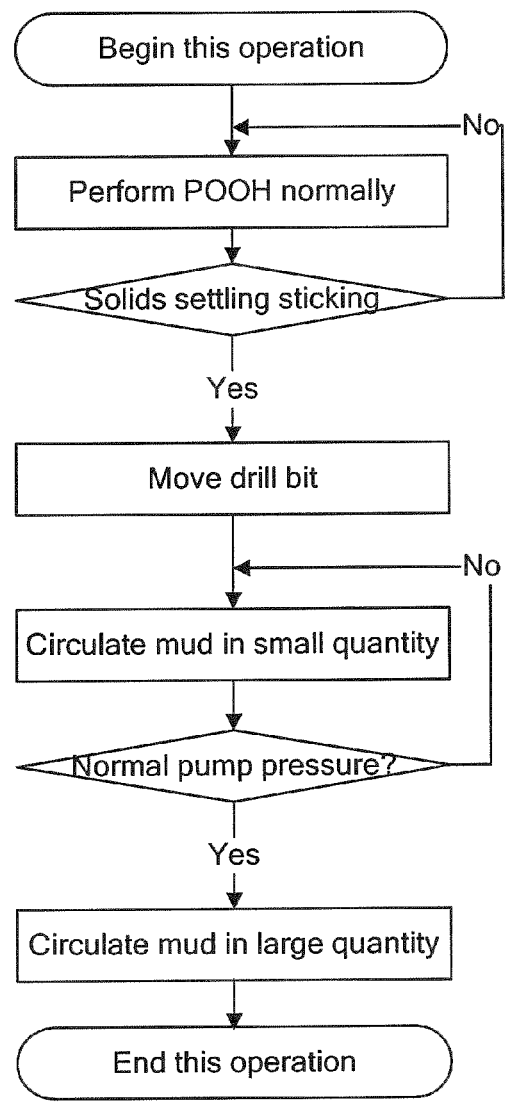
FIG. 49 is a flow chart of solids settling sticking judging and handling.

FIG. 49 is a flow chart of solids settling sticking judging and handling. Its working flow is approximately as follows: begin this operation, perform POOH normally, judge whether there is solids settling sticking, wherein if not, return to normal POOH, move the drill bit if there is solids settling sticking, circulate mud in small quantity, judge whether pump pressure is normal, wherein if not, return to circulate mud, and if so, circulate mud in large quantity, and, finally, end this operation.

Figure 50:
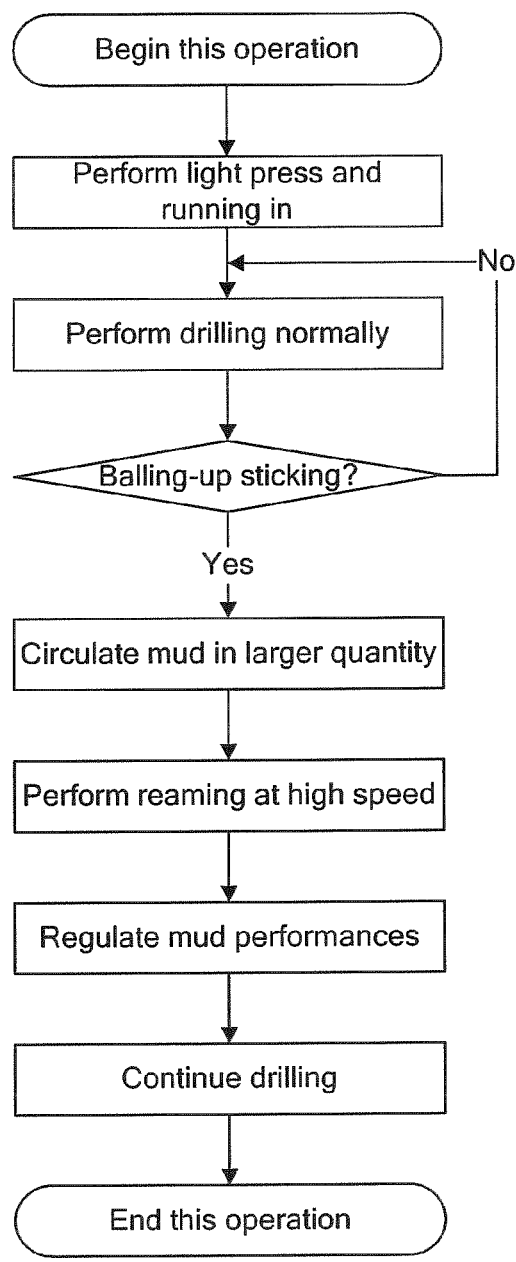
FIG. 50 is a flow chart of balling-up sticking judging and handling.

FIG. 50 is a flow chart of balling-up sticking judging and handling. Its working flow is approximately as follows: begin this operation, perform light press and running in, perform drilling, judge whether there is balling-up sticking, wherein if not, return to normal POOH, and if so, circulate mud in larger quantity, perform reaming at high speed, regulate mud performances, continue drilling, and, finally, end this operation.

Figure 51:
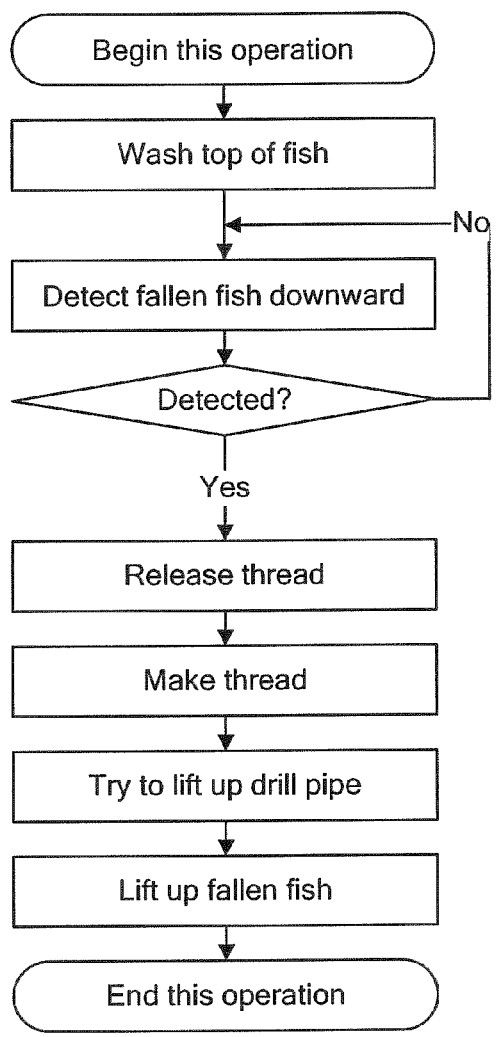
FIG. 51 is a flow chart of taper tap fishing.

FIG. 51 is a flow chart of taper tap fishing. Its working flow is approximately as follows: begin this operation, wash top of fish, detect fallen fish downwards, judge whether the fallen fish is detected, wherein if not, return to continue downward detection, and if so, release thread, make thread, try to lift up the drill pipe, lift up the fallen fish, and, finally, end this operation.

Figure 52:
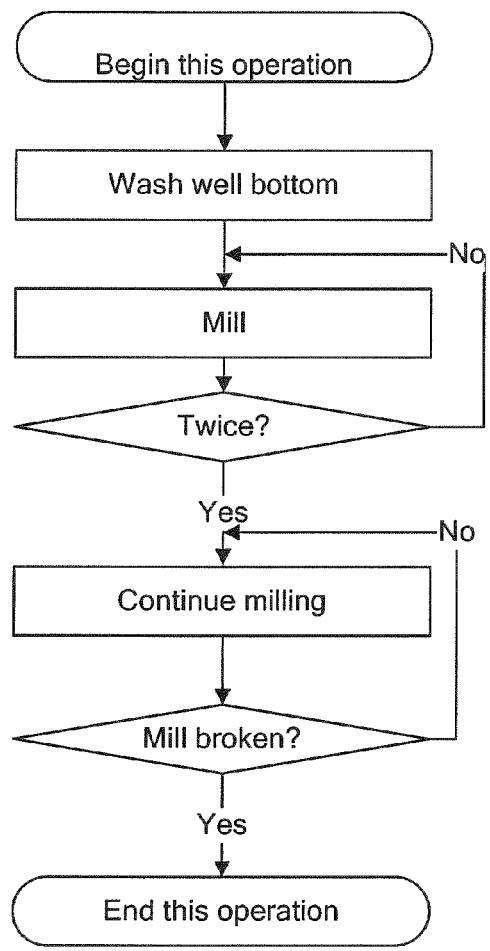
FIG. 52 is a flow chart of junk milling.

FIG. 52 is a flow chart of junk milling. Its working flow is approximately as follows: begin this operation, wash well bottom, mill twice, continue milling until the mill is broken, and end this operation.

Figure 53:
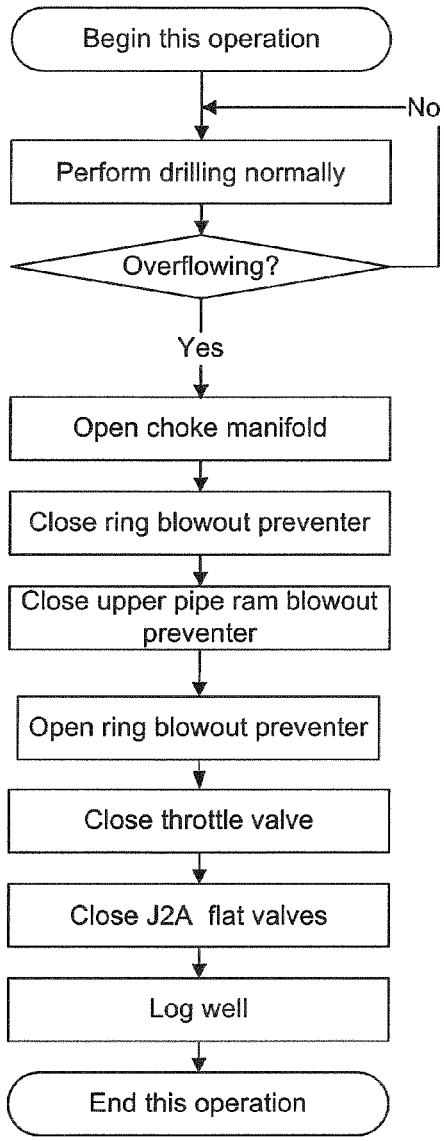

FIG. 53 is a flow chart of normal drilling and shutting in. Its working flow is approximately as follows: begin this operation, perform drilling normally, judge whether overflowing occurs, wherein if not, perform drilling normally, and if so, open the choke manifold and close ring blowout preventer, upper pipe ram blowout preventer, throttle valve and J2A flat valves, then log well and end this operation.

Figure 54:
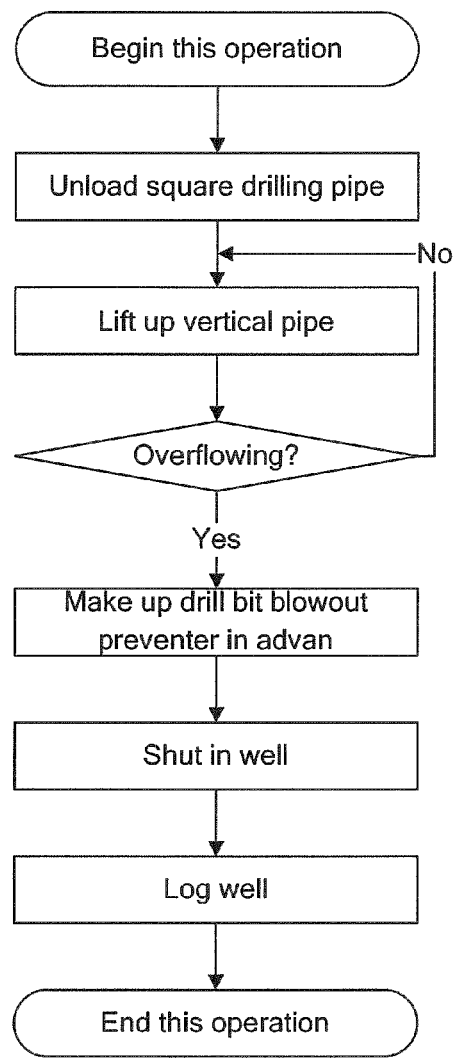

FIG. 54 is a flow chart of POOH and shutting in. Its working flow is approximately as follows: begin this operation, unload a square drilling pipe, lift up a vertical pipe, judge whether overflowing occurs, wherein if not, return to lift up the vertical pipe, and if so, make up a drill bit blowout preventer in advance, shut in well, log well, and end this operation.

Figure 55:
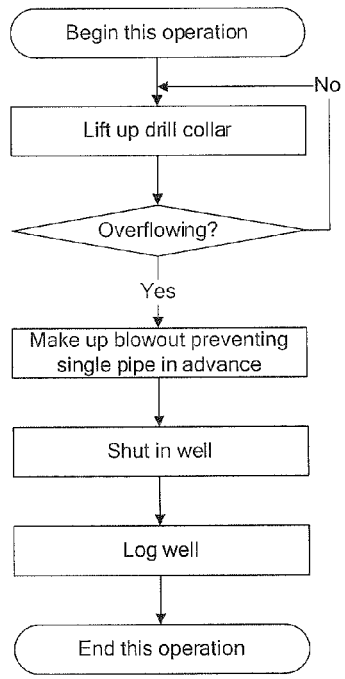

FIG. 55 is a flow chart of drill collar lifting and shutting in. Its working flow is approximately as follows: begin this operation, lift up a drill collar, judge whether overflowing occurs, wherein if not, return to lift up the drill collar, and if so, make up a blowout preventing single pipe in advance, shut in well, log well, and end this operation.

Figure 56:
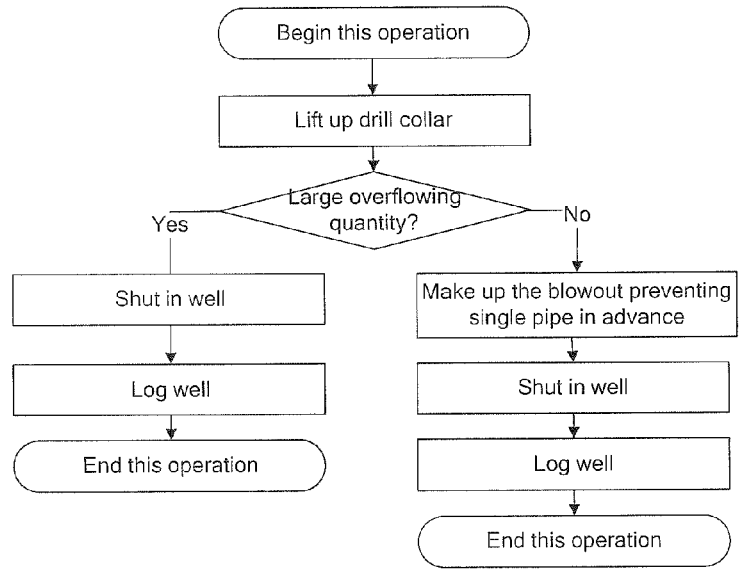

FIG. 56 is a flow chart of emptying and shutting in. Its working flow is approximately as follows: begin this operation, judge whether the overflowing quantity is large after the drill collar is lifted up, wherein if so, shut in well and log well and finally end this operation, and if not, make up the blowout preventing single pipe in advance, shut in well, log well, and finally end this operation.

Figure 57:
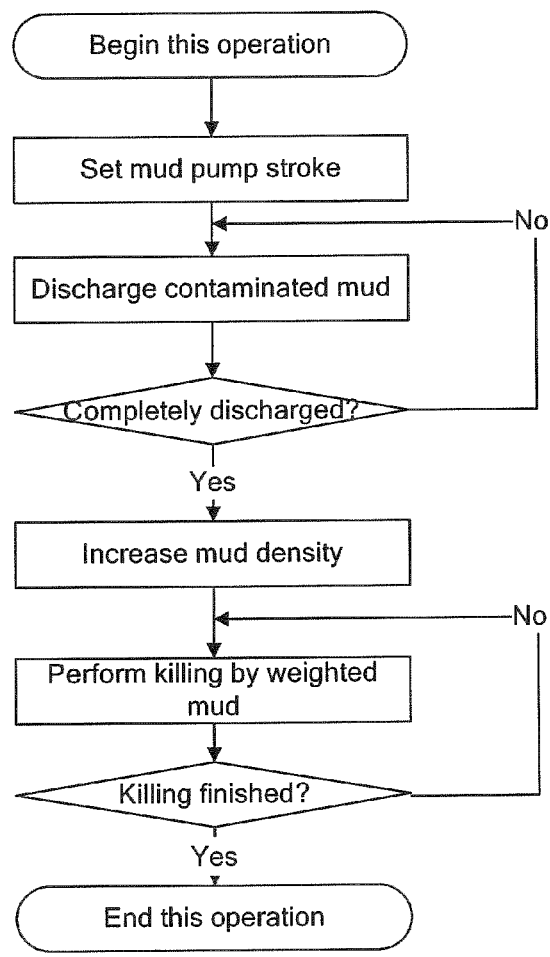
FIG. 57 is a flow chart of killing by driller's method.

FIG. 57 is a flow chart of killing by driller's method. Its working flow is approximately as follows: begin this operation, set mud pump stroke, discharge contaminated mud, judge whether the contaminated mud is completely discharged, wherein if not, return to discharge the contaminated mud completely, and if so, increase mud density, perform killing by weighted mud, judge whether killing is finished, wherein if not, return to continue killing, and if so, end this operation.

Figure 58:
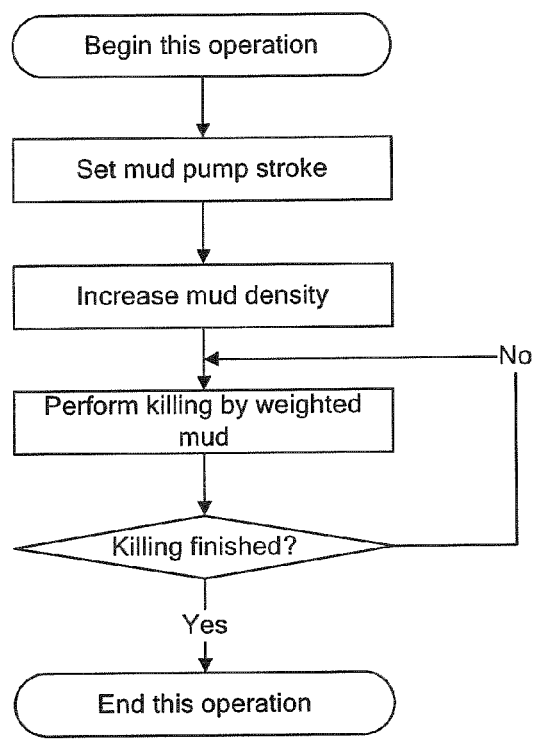
FIG. 58 is a flow chart of killing by engineer's method.

FIG. 58 is a flow chart of killing by engineer's method. Its working flow is approximately as follows: begin this operation, set mud pump stroke, increase mud density, then perform killing by weighted mud, and judge whether killing is finished, wherein if not, return to continue killing, and if so, end this operation.

Figure 59:
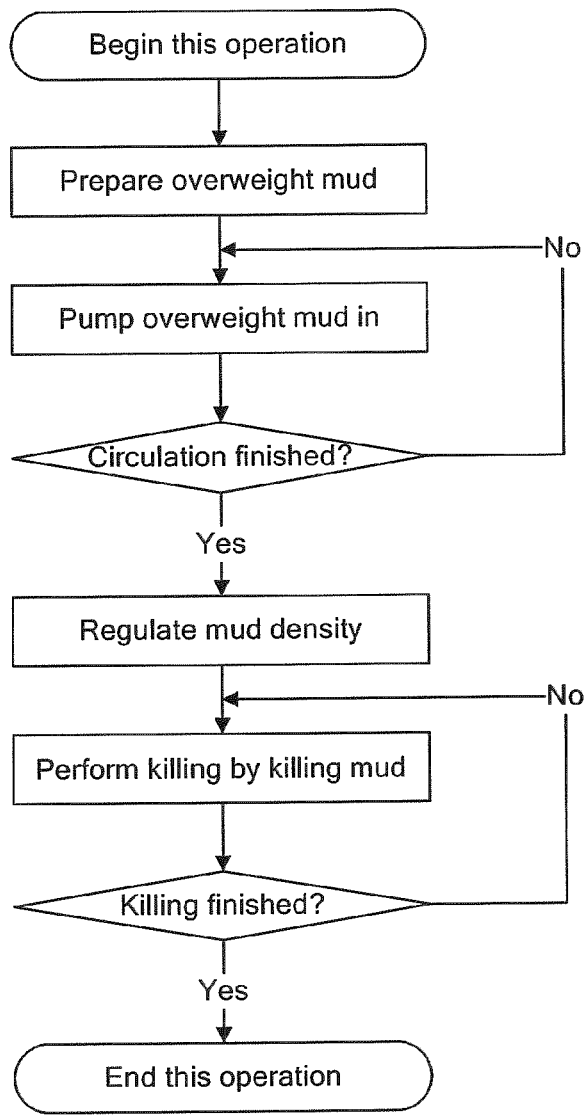
FIG. 59 is a flow chart of killing by overweight mud driller's method.

FIG. 59 is a flow chart of killing by overweight mud driller's method. Its working flow is approximately as follows: begin this operation, prepare overweight mud, pump the overweight mud in, judge whether circulation is finished, wherein if so, regulate mud density, perform killing by killing mud, and judge whether killing is finished, wherein if not, return to continue killing, and if so, end this operation.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A distributed drilling simulation system, comprising a choke manifold, a high pressure manifold, a blowout preventer console, a choke console, a remote console, a driller console, a teacher console, and a graphic projecting unit; the teacher console comprising a main control computer and a graphic computer, the driller console, the main control computer and the graphic computer being interconnected via a TCP/IP protocol (Transmission Control Protocol/Internet Protocol), the graphic projecting unit being connected with the graphic processing computer; the driller console, the remote console, the blowout preventer console and the choke console being interconnected with a PPI protocol (point to point interface protocol), the teacher console being interconnected with the PPI protocol via a PPI interface (point to point interface), the choke manifold being connected with the choke console, and the high pressure manifold being connected with the blowout preventer console; the driller console comprising a driller console chassis and an internal control plate, the front face of the driller console chassis being provided with a driller console front face control panel, the side face of the driller console chassis being provided with a driller console side face control panel, wherein the driller console front face control panel is provided with a pressure gauge set, a weight indicator, a rotary table torque indicator, a backup gauge, a switch set, a button set A, a display set, a winch speed adjusting handle, and a brake handle, the pressure gauge set comprising a gas source pressure gauge, a cooling water pressure gauge, a winch oil pressure gauge, a rotary table oil pressure gauge, a cathead pressure gauge, a pump pressure gauge, a tongs pressure gauge, a left tongs pressure gauge, a right tongs pressure gauge, and a safety tongs pressure gauge, the switch set comprising a left cathead switch, a right cathead switch, a hydraulic station unloading switch, a protective reset switch, an air horn switch, a rotary table inertial brake switch, a pneumatic inching switch, a backup switch, an emergency brake switch, and a parking brake switch, the button set A comprising a No. 1 button, a No. 2 button, a No. 3 button, a No. 4 button, a No. 5 button, a No. 6 button, a No. 7 button, a No. 8 button, a No. 9 button, a No. 10 button, a No. 11 button, a No. 12 button, a No. 13 button, and a No. 14 button, the display set comprising a parameter display, a mud density display, a mud viscosity display, and a mud fluid loss display; the internal control plate of the driller console comprising a driller console programmable logic controller PLC1 and a driller console programmable logic controller PLC2; a CPU (central processing unit) module of the driller console programmable logic controller PLC1 being connected with the winch speed adjusting handle and the brake handle via an AD (analog to digital) module respectively, the CPU module of the driller console programmable logic controller PLC1 being connected with the gas source pressure gauge, the cooling water pressure gauge, the winch oil pressure gauge, the rotary table oil pressure gauge, the cathead pressure gauge, the rotary table torque indicator, the pump pressure gauge, the tongs pressure gauge, the backup gauge, the left tongs pressure gauge, the right tongs pressure gauge, and the safety tongs pressure gauge via a DA (digital to analog) module, the CPU module of the driller console programmable logic controller PLC1 being connected with the weight indicator, the emergency brake switch and the parking brake switch via a digital input/output extension module, the CPU module of the driller console programmable logic controller PLC1 being connected, via a switch quantity output port thereof, with the input end of a weight indicator controller the output end of which is connected with the weight indicator, the CPU module of the driller console programmable logic controller PLC1 being connected with the left cathead switch, the right cathead switch, the hydraulic station unloading switch, the protective reset switch, the air horn switch, the rotary table inertial brake switch, the pneumatic inching switch, the backup switch, the No. 1 button, the No. 2 button, the No. 3 button, the No. 4 button, the No. 5 button, the No. 6 button, the No. 7 button, the No. 8 button, the No. 9 button, the No. 10 button, the No. 11 button, the No. 12 button, the No. 13 button and the No. 14 button via a switch quantity input port thereof, and simultaneously connected with the No. 1 button, the No. 2 button, the No. 3 button, the No. 4 button, the No. 5 button, the No. 6 button, the No. 7 button and the No. 8 button via the switch quantity output port, the CPU module of the driller console programmable logic controller PLC1 being further connected with a driller console data transmitting/receiving plate via a serial port, the driller console data transmitting/receiving plate being connected with the mud density display, the mud viscosity display and the mud fluid loss display via parallel ports; the driller console side face control panel comprising an indicator set, a selector valve set, a button set B, a regulating valve set, a torque indicator, and a tachometer, the indicator set comprising a programmable logic controller PLC1 indicator, a programmable logic controller PLC2 indicator, a power generator 1 indicator, a power generator 2 indicator, a power generator 3 indicator, a power generator 4 indicator, a mud pump A indicator, a mud pump B indicator, a mud pump C indicator, a winch A indicator, a winch B indicator, a drill table indicator, a constant-speed drilling or constant-pressure drilling indicator, an internal blowout preventer indicator, a hydraulic pump operation indicator, a rotary head locking indicator, a brake indicator, a fault alarm indicator, and an in-position indicator; the selector valve set comprising a PLC working selector valve, a motor working selector valve, a winch working selector valve, a mud pump A working selector valve, a mud pump B working selector valve, a mud pump C working selector valve, a rotary table working selector valve, a winch constant-speed drilling or constant-pressure drilling working selector valve, an elevator link rotation selector valve, an internal blowout preventer working selector valve, a hydraulic pump selector valve, a rotary head locking selector valve, a backup tongs working selector valve, an elevator link inclination selector valve, a brake working mode selector valve, an auxiliary operation selector valve, a fan working selector valve, a motor selector valve, an operating mode selector valve, and a rotating direction selector valve; the button set B comprising a machine emergency stop button, a variable-frequency emergency stop button, a drill table torque adjusting knob, a mud pump A adjusting knob, a mud pump B regulating knob, a mud pump C regulating knob, a rotary table rotating speed adjusting knob, a constant-pressure drilling weight-on-bit adjusting knob, an elevator link middle position button, a mute button, and an emergency stop button; the regulating valve set comprising a makeup torque limiting regulating valve, a drilling well torque limiting regulating valve and a rotating speed setting regulating valve; a CPU module of the driller console programmable logic controller PLC2 being connected with the drill table torque adjusting knob, the mud pump A adjusting knob, the mud pump B regulating knob, the mud pump C regulating knob, the rotary table rotating speed adjusting knob, the constant-pressure drilling weight-on-bit adjusting knob, the makeup torque limiting regulating valve, the drilling well torque limiting regulating valve, and the rotating speed setting regulating valve via the AD module respectively, the CPU module of the driller console programmable logic controller PLC2 being connected with the torque indicator and the tachometer via the DA module, the CPU module of the driller console programmable logic controller PLC2 being connected with the brake indicator, the fault alarm indicator, the in-position indicator, the mute button, the emergency stop button, the brake working mode selector valve, the auxiliary operation selector valve, the fan working selector valve, the motor selector valve, the operating mode selector valve, and the rotating direction selector valve via the digital input/output extension module, the CPU module of the driller console programmable logic controller PLC2 being connected with the PLC1 indicator, the PLC2 indicator, the power generator 1 indicator, the power generator 2 indicator, the power generator 3 indicator, the power generator 4 indicator, the mud pump A indicator, the mud pump B indicator, the mud pump C indicator, the winch A indicator, the winch B indicator, the drill table indicator, the constant-speed drilling or constant-pressure drilling indicator, the internal blowout preventer indicator, the hydraulic pump operation indicator, and the rotary head locking indicator via the switch quantity output port thereof, the CPU module of the driller console programmable logic controller PLC2 being connected with the PLC working selector valve, the motor working selector valve, the winch working selector valve, the machine emergency stop button, the variable-frequency emergency stop button, the mud pump A working selector valve, the mud pump B working selector valve, the mud pump C working selector valve, the rotary table working selector valve, the winch constant-speed drilling or constant-pressure drilling working selector valve, the elevator link rotation selector valve, the elevator link middle position button, the internal blowout preventer working selector valve, the hydraulic pump selector valve, the rotary head locking selector valve, the backup tongs working selector valve, and the elevator link inclination selector valve via the switch input port thereof; the remote console comprising a remote console chassis and an internal control plate, the front face of the remote console chassis being provided with a remote console control panel, the remote console control panel is provided with a ring oil pressure regulating valve, a manifold pressure regulating valve, a manifold pressure gauge, an accumulator pressure gauge, a ring oil pressure gauge, a bypass valve, a blowout preventer valve, a pipe ram control valve, a blind ram control valve, a shear ram control valve, a ring ram control valve, an accumulator main switch, a left-path accumulator switch, and a right-path accumulator switch; the internal control plate comprising a remote console programmable logic controller PLC and a valve controller, a CPU module of the remote console programmable logic controller PLC being connected with the manifold pressure regulating valve and the ring oil pressure regulating valve via the AD module respectively, the CPU module of the remote console programmable logic controller PLC being connected with the manifold pressure gauge and the accumulator pressure gauge via a DA module 1, the CPU module of the remote console programmable logic controller PLC being connected with the ring oil pressure gauge via a DA module 2, the CPU module of the remote console programmable logic controller PLC being connected with the accumulator main switch, the left-path accumulator switch and the right-path accumulator switch via the switch quantity input port thereof; the CPU module of the remote console programmable logic controller PLC being further connected with a control input end of the valve controller via twelve switch quantity outputs, the output of the valve controller being connected with the bypass valve, the blowout preventer valve, the pipe ram control valve, the blind ram control valve, the shear ram control valve and the ring ram control valve respectively; the bypass valve, the blowout preventer valve, the pipe ram control valve, the blind ram control valve, the shear ram control valve, and the ring ram control valve being accessed to twelve switch quantity input ports of the remote console programmable logic controller PLC respectively via feedback signal wires; the choke manifold comprising a choke tube and a valve installed on the choke tube, the choke tube being installed on a choke manifold frame and being featured by vertical and crossed distribution of transverse tubes and vertical tubes, a plurality of flat valves A, B, C, D, E, F, G, H, I, J, K, L, M, N, O, P and Q being arranged on the transverse tubes and the vertical tubes, the transverse tubes comprising a choke manifold upper transverse tube and a choke manifold lower transverse tube, the two ends of the choke manifold upper transverse tube being fixedly connected to the choke manifold frame, one end of the choke manifold upper transverse tube being provided with a separator outlet while the other end thereof is provided with a backup outlet; the vertical tubs tubes comprising an overflow inlet tube, a hydraulic choke tube and a manual choke tube; the lower ends of the overflow inlet tube, the hydraulic choke tube and the manual choke tube being provided with an overflow inlet, a hydraulic choke valve and a manual choke valve respectively, the upper end of the overflow inlet tube being fixedly connected to the choke manifold frame (124); the high pressure manifold comprising a high pressure tube and a valve installed on the high pressure valve, the high pressure tube being installed on a high pressure manifold frame and being featured by vertical connection and distribution of transverse tubes and vertical tubes; a high pressure manifold upper transverse tube, a high pressure manifold lower transverse tube, a left vertical tube, and a right vertical tube being jointed at the middle of the high pressure tube to form a rectangle, a plurality of flat valves being arranged on the transverse tubes and the vertical tubes, the transverse tubes further comprising a left mud inlet tube, a right mud inlet tube and a grouting outlet tube, the left end of the left mud inlet tube being fixedly connected to the high pressure manifold frame, the left end part of the left mud inlet tube being provided with a mud inlet I, the right and of the right mud inlet tube being fixedly connected to the high pressure manifold frame, the right end part of the right mud inlet tube being provided with a mud inlet II, the left end of the grouting outlet tube being fixedly connected to the high pressure manifold frame, the left end part of the grouting outlet tube being provided with a grouting outlet; the vertical tubes further comprising an upper vertical tube and a lower vertical tube, the upper end of the upper vertical tube being fixedly connected to the high pressure manifold frame, the upper end part of the upper vertical tube being provided with a backup inlet, the lower end of the lower vertical tube being fixedly connected to the high pressure manifold frame, the lower end part of the lower vertical tube being provided with a vertical tube outlet; the blowout preventer console comprising a blowout preventer console chassis and an internal control plate, the front face of the blowout preventer console chassis being provided with a blowout preventer control panel, the blowout preventer control panel is provided with an accumulator pressure gauge, a ring blowout preventer oil pressure gauge, a gas source pressure gauge, a manifold pressure gauge, a ring ram switch, a ring ram on indicator, a ring ram off indicator, a gas source switch, a bypass ram switch, an upper pipe ram switch, an upper pipe ram on indicator, an upper pipe ram off indicator, a blind ram switch, a blind ram on indicator, a blind ram off indicator, a kill manifold ram switch, a kill manifold on indicator, a kill manifold off indicator, a blowout preventer valve switch, a blowout preventer valve off indicator, a blowout preventer valve on indicator, a lower pipe ram switch, a lower pipe ram on indicator, and a lower pipe ram off indicator; the internal control plate comprising a blowout preventer programmable logic controller PLC, a CPU module of the blowout preventer programmable logic controller PLC being connected with the accumulator pressure gauge and the ring blowout preventer oil pressure gauge via the DA module 1 respectively and connected with the gas source pressure gauge and the manifold pressure gauge via the DA module 2 respectively; the CPU module of the blowout preventer programmable logic controller PLC being further connected with the ring ram switch, the gas source switch, the bypass ram switch, the upper pipe ram switch, the blind ram switch, the kill manifold ram switch, the blowout preventer valve switch, and the lower pipe ram switch respectively via the switch quantity input port thereof, the CPU module of the blowout preventer programmable logic controller PLC being connected with the ring ram on indicator, the ring ram off indicator, the upper pipe ram on indicator, the upper pipe ram off indicator, the blind ram on indicator, the blind ram off indicator, the kill manifold on indicator, the kill manifold off indicator, the blowout preventer valve off indicator, the blowout preventer valve on indicator, the lower pipe ram on indicator, and the lower pipe ram off indicator respectively via the switch quantity output port thereof; the CPU module of the blowout preventer programmable logic controller PLC being further connected, via the switch quantity input port thereof, with the flat valves L, M, N, O, P and Q installed on the high pressure tube in the high pressure manifold respectively; the choke console comprising a choke console chassis and an internal control plate, the front face of the choke console chassis being provided with a choke control panel, the choke control panel being provided with a vertical tube pressure gauge, a pump speed gauge, a sleeve pressure gauge, a hydraulic choke valve selection indicator, a dual-pump selection switch, a choke valve selection switch, a pump stroke display, a choke valve opening gauge, a manual choke valve selection indicator, a reset button, a driller gas source switch, a choke control valve switch, and a choke valve speed adjusting knob; the internal control plate comprising a choke programmable logic controller PLC, a CPU module of the choke programmable logic controller PLC being connected with the choke valve speed adjusting knob via the AD module, the CPU module of the choke programmable logic controller PLC being connected with the vertical tube pressure gauge and the sleeve pressure gauge via the DA module 1, CPU module of the choke programmable logic controller PLC being connected with the pump speed gauge and the choke valve opening gauge via the DA module 2, CPU module of the choke programmable logic controller PLC being connected with a choke data transmitting/receiving plate via a serial port, the choke data transmitting/receiving plate being connected with a pump stroke display via a parallel port; the CPU module of the choke programmable logic controller PLC being further connected with the hydraulic choke valve selection indicator and the manual choke valve selection indicator via the switch quantity output port thereof respectively, the CPU module of the choke programmable logic controller PLC being connected with the dual-pump selection switch, the choke valve selection switch, the reset button, the driller gas source switch, and the choke control valve switch via the switch quantity input port thereof respectively; the CPU module of the choke programmable logic controller PLC being further connected, via the switch quantity input port thereof, with the flat valves A, B, C, D, E, F, G, H, I, J and K installed on the choke tube in the choke manifold respectively, the CPU module of the choke programmable logic controller PLC being connected with the manual choke valve in the choke manifold via the AD module and with a pressure gauge via the DA module 1; the main control computer comprising one or more than one general computers as well as a communication program and a main control program running thereon, the graphic computer comprising one or more than one general computers as well as a graphic processing program running thereon, the main control program comprising an operation training module, a system management module and a scoring and management module, the operation training module comprising a top driving event drive sub-module, an RIH (Run In Hole) sub-module, a POOH (Pull Out Of Hole) sub-module, a drill-in sub-module, an accident and complex situation handling sub-module, a shut in sub-module, and a killing sub-module; the system management module comprising a hardware self-inspection sub-module, a user management sub-module and a killing scheme management sub-module, the scoring and management module comprising an automatic scoring sub-module; the graphic processing program comprising a scene initialization module, a process animation control module, a collision processing module, and a render effect module; the communication program being connected with front end hardware via the PPI protocol, the main control program being connected with the communication program and the graphic processing program via the TCP/IP protocol respectively, the front end hardware comprising the blowout preventer console, the choke console, the remote console, and the driller console.

2. The distributed drilling simulation system according to claim 1, wherein the driller console data transmitting/receiving plate comprises a serial port chip, a single chip microcomputer, a latch and a bus buffer, the input end of the serial port chip being connected with the serial port of the driller console programmable logic controller PLC1 via the serial port, the output end of the serial port chip being connected with the transmitting data line and the receiving data line of the single chip microcomputer respectively, the single chip microcomputer being further connected with the latch and the bus buffer via buses respectively, the output ports of the latch and the bus buffer being connected with the mud density display, the mud viscosity display and the mud fluid loss display via the parallel ports.

3. The distributed drilling simulation system according to claim 2, wherein each of the mud density display, the mud viscosity display and the mud fluid loss display comprises an address buffer, a data buffer, a comparator, a decoder, a dip switch, a nixie tube drive chip, and a nixie tube, wherein the input ports of the address buffer and the data buffer are both connected with the parallel port, wherein the output port of the data buffer is connected with the nixie tube drive chip, wherein the output port of the address buffer is connected with one input end of the comparator and the decoder respectively, wherein the other input end of the comparator is connected with the dip switch, wherein the output port is connected with the enabling end of the decoder, wherein the output and of the decoder is connected with the nixie tube drive chip, wherein the output end of the nixie tube drive chip is connected with the nixie tube.

4. The distributed drilling simulation system according to claim 1, wherein the choke data transmitting/receiving plate comprises a serial port chip, a single chip microcomputer, a latch and a bus buffer, wherein the input end of the serial port chip is connected with the serial port of the choke programmable logic controller PLC via the serial port, wherein the output end of the serial port chip is connected with the transmitting data line and the receiving data line of the single chip microcomputer respectively, wherein the single chip microcomputer is further connected with the latch and the bus buffer via buses respectively, wherein the output ports of the latch and the bus buffer are connected with the pump stroke display via the parallel ports.

5. The distributed drilling simulation system according to claim 4, wherein the pump stroke display comprises an address buffer, a data buffer, a comparator, a decoder, a dip switch, a nixie tube drive chip, and a nixie tube, wherein the input ports of the address buffer and the data buffer are both connected with the parallel port, wherein the output port of the data buffer is connected with the nixie tube drive chip, wherein the output port of the address buffer is connected with one input end of the comparator and the decoder respectively, wherein the other input and of the comparator is connected with the dip switch, wherein the output port is connected with the enabling end of the decoder, wherein the output and of the decoder is connected with the nixie tube drive chip, wherein the output and of the nixie tube drive chip is connected with the nixie tube.

6. The distributed drilling simulation system according to claim 1, wherein the pump stroke display comprises an address buffer, a data buffer, a comparator, a decoder, a dip switch, a nixie tube drive chip, and a nixie tube, wherein the input ports of the address buffer and the data buffer are both connected with the parallel port, wherein the output port of the data buffer is connected with the nixie tube drive chip, wherein the output port of the address buffer is connected with one input end of the comparator and the decoder respectively, wherein the other input end of the comparator is connected with the dip switch, wherein the output port is connected with the enabling end of the decoder, wherein the output end of the decoder is connected with the nixie tube drive chip, wherein the output end of the nixie tube drive chip is connected with the nixie tube.

7. The distributed drilling simulation system according to claim 1, wherein the overflow inlet tube of the choke manifold is connected with the choke manifold upper transverse tube and with the choke manifold lower transverse tube respectively in a crosswise manner to form a crossing point a and a crossing point b, wherein the flat valve A is installed on the overflow inlet tube at the upper part of the crossing point a, wherein the flat valve b and the flat valve c are sequentially installed on the overflow inlet tube between the crossing point a and the crossing point b, wherein the pressure gauge is arranged at the crossing point b, wherein a blowout preventer valve on/off indicator is installed on the overflow inlet tube at the lower part of the crossing point b, wherein the two ends of the choke manifold lower transverse tube are fixedly connected to the hydraulic choke tube and the manual choke tube respectively to form a nodal point c and a nodal point d, wherein the flat valve D and the flat valve E are installed on the choke manifold lower transverse tube between the crossing point b and the crossing point c, wherein the flat valve F and the flat valve G are installed on the choke manifold lower transverse tube between the crossing point b and the crossing point d, wherein the upper ends of the hydraulic choke tube and the manual choke tube are connected with the choke manifold upper transverse tube respectively to form a nodal point e and a nodal point f, wherein the flat valve H is installed on the hydraulic choke tube between the nodal point c and the nodal point e, wherein a hydraulic indicator is installed on the manual choke tube at the lower part of the nodal point c, wherein the end part of the manual choke tube is provided with the hydraulic choke valve, wherein the flat valve I is installed on the manual choke tube between the nodal point d and the nodal point f, wherein the manual choke valve is arranged at the and part of the manual choke tube at the lower part of the nodal point d, wherein the flat valve J is arranged on the choke manifold upper transverse tube between the nodal point e and the backup outlet, wherein the flat valve K is arranged on the choke manifold upper transverse tube between the nodal point f and the separator outlet.

8. The distributed drilling simulation system according to claim 1, wherein the left mud inlet tube and the right mud inlet tube of the high pressure manifold are in T-shaped connection with the rectangular left vertical tube and the rectangular right vertical tube respectively to form a nodal point h and a nodal point i, wherein the flat valve L is installed on the left vertical tube at the upper part of the nodal point h, wherein the flat valve M is installed on the left vertical tube at the lower part of the nodal point h, wherein the flat valve N is installed on the right vertical tube at the upper part of the nodal point i, wherein the flat valve O is installed on the right vertical tube at the lower part of the nodal point I, wherein the upper vertical tube and the lower vertical tube are in T-shaped connection with the rectangular high pressure manifold upper transverse tube and the rectangular high pressure manifold lower transverse tube respectively to form a nodal point g and a nodal point j, wherein the grouting outlet tube is in T-shaped connection with the lower vertical tube to form a nodal point k, wherein the flat valve P is installed on the grouting outlet tube, wherein the flat valve Q is installed on the lower vertical tube at the lower part of the nodal point k.

9. The distributed drilling simulation system according to claim 1, wherein the graphic projecting unit comprises one or more than one projectors and a large-size screen.

\* \* \* \* \*